US008472064B2

(12) United States Patent
Ishinaga et al.

(10) Patent No.: US 8,472,064 B2
(45) **Date of Patent: *Jun. 25, 2013**

(54) PRINT MODULE, INFORMATION PROCESSING DEVICE, PRINT SYSTEM, PRINT UNIT, INK SUPPLY UNIT, PRINT METHOD, AND PROGRAM

(75) Inventors: Hiroyuki Ishinaga, Tokyo (JP); Yoichi Sonobe, Matsudo (JP); Kazuo Haida, Yokohama (JP); Yuichi Takahashi, Tokyo (JP); Chiharu Yumoto, Tokyo (JP); Kenji Hatakeyama, Tokyo (JP)

(73) Assignee: Canon Finetech Inc., Misato-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/483,424

(22) Filed: May 30, 2012

(65) Prior Publication Data

US 2012/0242733 A1 Sep. 27, 2012

Related U.S. Application Data

(63) Continuation of application No. 11/913,615, filed as application No. PCT/JP2006/310931 on May 31, 2006, now Pat. No. 8,208,158.

(30) Foreign Application Priority Data

| | | | |
|---|---|---|---|
| Jun. 1, 2005 | (JP) | ................................ | 2005-161174 |
| Nov. 14, 2005 | (JP) | ................................ | 2005-328917 |
| Nov. 14, 2005 | (JP) | ................................ | 2005-328918 |
| Nov. 15, 2005 | (JP) | ................................ | 2005-330611 |
| May 26, 2006 | (JP) | ................................ | 2006-147445 |

(51) Int. Cl.

| | |
|---|---|
| *G06F 3/12* | (2006.01) |
| *G06K 15/10* | (2006.01) |
| *H04N 1/46* | (2006.01) |
| *H04N 1/034* | (2006.01) |
| *B41J 29/38* | (2006.01) |
| *B41J 29/393* | (2006.01) |
| *B41J 2/21* | (2006.01) |
| *B41J 2/14* | (2006.01) |

(52) U.S. Cl.
USPC ............. 358/1.15; 358/1.5; 358/1.8; 358/1.9; 358/502; 358/515; 347/3; 347/14; 347/44; 347/19; 347/47

(58) Field of Classification Search
None
See application file for complete search history.

(56) References Cited

U.S. PATENT DOCUMENTS

| | | | |
|---|---|---|---|
| 4,680,696 | A | 7/1987 | Ebinuma et al. |
| 5,682,140 | A | 10/1997 | Christensen et al. |

(Continued)

FOREIGN PATENT DOCUMENTS

| | | | |
|---|---|---|---|
| EP | 0878305 | A2 | 11/1998 |
| EP | 1270236 | A1 | 1/2003 |

(Continued)

OTHER PUBLICATIONS

European Search Report ("Communication")—Appln. No. 06756851.9-1251/1886815, European Patent Office, Aug. 10, 2010.

(Continued)

*Primary Examiner* — Hilina S Kassa
(74) *Attorney, Agent, or Firm* — Fitzpatrick, Cella, Harper & Scinto

(57) ABSTRACT

The present invention provides a print module, an information processing device, a print system, a print unit, an ink supply unit, a print method and program, all capable of quickly and easily meeting demands for a print medium size change, particularly to increased sizes, while at the same time coping with demands for faster printing speed. To this end, this invention constructs the print heads (811) in the form of print modules (M) so that their ink systems and signal systems are independent among the print modules. Each print module is set with identity information for its identification.

18 Claims, 70 Drawing Sheets

U.S. PATENT DOCUMENTS

| | | | | |
|---|---|---|---|---|
| 5,956,052 | A | 9/1999 | Udagawa et al. | |
| 6,505,926 | B1 | 1/2003 | Trafton et al. | |
| 6,646,756 | B2 * | 11/2003 | Moriyama et al. | 358/1.15 |
| 6,652,055 | B2 * | 11/2003 | Oikawa | 347/9 |
| 6,809,835 | B2 * | 10/2004 | Suzuki | 358/1.18 |
| 7,396,100 | B2 | 7/2008 | Hara | |
| 7,408,676 | B2 | 8/2008 | Yazawa et al. | |
| 7,474,425 | B2 * | 1/2009 | Sasama | 358/1.15 |
| 7,500,727 | B2 | 3/2009 | Takahashi | |
| 7,744,188 | B2 | 6/2010 | Izuo | |
| 7,832,836 | B2 | 11/2010 | Iwasaki et al. | |
| 2002/0113981 | A1 * | 8/2002 | Nakajima | 358/1.8 |
| 2003/0002080 | A1 | 1/2003 | Asauchi | |
| 2003/0002899 | A1 | 1/2003 | Furukawa et al. | |
| 2003/0016981 | A1 * | 1/2003 | Haug | 400/104 |
| 2003/0035016 | A1 | 2/2003 | Tanaka | |
| 2003/0085955 | A1 | 5/2003 | Akama et al. | |
| 2003/0146952 | A1 | 8/2003 | Numata et al. | |
| 2004/0017435 | A1 * | 1/2004 | Kubota | 347/56 |
| 2004/0239706 | A1 | 12/2004 | Kawakami | |
| 2005/0083363 | A1 | 4/2005 | Ishikawa et al. | |
| 2005/0157327 | A1 | 7/2005 | Shoji et al. | |
| 2006/0170937 | A1 | 8/2006 | Takahashi | |
| 2006/0268316 | A1 * | 11/2006 | Condon et al. | 358/1.15 |
| 2007/0052745 | A1 * | 3/2007 | Izuo | 347/14 |
| 2008/0204529 | A1 | 8/2008 | Matsumoto et al. | |

FOREIGN PATENT DOCUMENTS

| | | | |
|---|---|---|---|
| EP | 1547781 | A2 | 6/2005 |
| JP | 60137655 | A | 7/1985 |
| JP | 63-114110 | U | 7/1988 |
| JP | 2036445 | U | 3/1990 |
| JP | 9-001789 | A | 1/1997 |
| JP | 10-129044 | A | 5/1998 |
| JP | 11-179981 | A | 7/1999 |
| JP | 2001-171140 | A | 6/2001 |
| JP | 2002-307758 | A | 10/2002 |
| JP | 2003-091375 | A | 3/2003 |
| JP | 2003-127352 | A | 5/2003 |
| JP | 2004-328272 | A | 11/2004 |
| JP | 2005-014253 | A | 1/2005 |

OTHER PUBLICATIONS

International Preliminary Report on Patentability and Translation in PCT Application No. PCT/JP2006/310931 dated Dec. 21, 2007.

Office Action issued in Japanese Patent Application No. 2006-147445, mailed Nov. 22, 2011.

* cited by examiner

PRINT MODULE ARRANGEMENT (COLUMN) 1901

| SW4 | SW5 | |
|---|---|---|
| OFF | OFF | 0 |
| OFF | ON | 1 |
| ON | OFF | 2 |
| ON | ON | 3 |

PRINT MODULE ARRANGEMENT (ROW) 1902

| SW6 | SW7 | SW8 | |
|---|---|---|---|
| OFF | OFF | OFF | 0 |
| OFF | OFF | ON | 1 |
| OFF | ON | OFF | 2 |
| OFF | ON | ON | 3 |
| ON | OFF | OFF | 4 |
| ON | OFF | ON | 5 |
| ON | ON | OFF | 6 |
| ON | ON | ON | 7 |

| OBJECT | PRINT DATA GENERATION TIME | |
|---|---|---|
| NO DATA | 15ms | 1901 |
| TEXT | 30ms | 1902 |
| BIT MAP | 50ms | 1903 |
| CUSTOMER BAR CODE | 40ms | 1904 |
| BAR CODE | 40ms | 1905 |
| 2-DIMENTIONAL BAR CODE | 60ms | 1906 |

FIG.60

PRINT MODULE, INFORMATION PROCESSING DEVICE, PRINT SYSTEM, PRINT UNIT, INK SUPPLY UNIT, PRINT METHOD, AND PROGRAM

This application is a continuation of Application No. 11/913,615, now allowed.

TECHNICAL FIELD

The present invention relates to a print module constituting a part of a print system, an information processing device connected to the print module, a print system including the print module and the information processing device, a print unit and an ink supply unit constituting a part of the print module, a print method using the print system, and programs.

BACKGROUND ART

Among print systems for printing on print mediums, an ink jet system is known which ejects ink from a print head as a print means onto the print medium to print an image. Such an ink jet system has many advantages, such as an ability to reduce a size of the print head easily, an ability to form highly defined images at high speed, a low running cost made possible by the ability to print on even so-called plain paper, small noise achieved by a non-impact system, and an ease with which to employ a construction for making color images using multiple color inks.

Because of these advantages, the ink jet printing apparatus have found a wide range of applications in industries, offices and homes (for personal and family use), and the printing purposes have also diversified widely. A variety of kinds of print mediums are available for use. In industrial fields, in particular, a wide range of medium size, from a relatively small one such as labels stuck to products and their packages to a relatively large one, for instance A2-size or greater, is being used. Demands on the printing apparatus used in industrial fields are far more stringent than those of personal use in terms of faster printing speed and operation stability.

Patent document 1 describes a serial printing system. This printing system forms an image by moving a print head along the print medium (main scan) and, after each main scan, feeding the print medium a predetermined distance (sub scan) and then repeating this process. In contrast to this printing system, a line printer type printing system uses a print head having a large number of ink ejection nozzles arrayed in a direction perpendicular to the direction in which the print medium is fed (sub scan direction). The line printer type can form an image at a faster speed and therefore is drawing attention as a suitable printing apparatus for industrial use.

In industrial fields, however, various sizes of print mediums are used as described above and at times the printer may have to print on a large print medium as A2-size or more. In a print head applied to the line printer in particular, it is difficult to form a very large number of nozzles over the entire width of a print area without any defect (unless otherwise specifically noted, a word “nozzle” generally refers to an ink ejection opening, an ink path communicating with the ink ejection opening or nozzle opening, and an element arranged in the ink path to generate an ink ejection energy). Suppose, for example, the print width on an A2-size print medium is about 420 mm (on a short side of A2 size) and that the printing is performed at 600 dpi. Then, about 10,000 nozzle openings are required in this print width. Forming such a large number of nozzles corresponding to the nozzle openings without a defect not only makes manufacturing equipment large in scale but also reduces a yield, rendering the production extremely costly.

Under these circumstances, it is a conventional practice to manufacture a line printer ink jet print head of a desired length by arranging a plurality of relatively inexpensive, short print head chips in line with high precision (e.g., patent document 2). By arranging an appropriate number of print head chips in line as described above, it is possible to deal with various sizes of print mediums.

The information processing device as a host apparatus to supply image data to the printing apparatus has its image data development and transfer system constructed to conform to the construction of the printing apparatus, particularly the number of nozzles and the arrangement of nozzles and print head chips (e.g., patent document 1). Image data created by the user is supplied to the printing apparatus via a communication interface.

Patent document 1: Japanese Patent Laid-Open No. 2001-171140

Patent document 2: Japanese Patent Laid-Open No. 60-137655

DISCLOSURE OF THE INVENTION

As described above, the line printer type ink jet printing apparatus can increase the print speed and also deal with a variety of sizes of print medium by arranging an appropriate number of short print head chips. However, in practice a printing apparatus is constructed to be dedicated to a particular use by the user, so it is so far difficult to flexibly meet a variety of needs of users and design various line printers quickly and inexpensively.

One of the reasons for this is as follows. When an appropriate number of print head chips are arrayed to extend the length of the print head, the associated control system hardware and software need to be modified to conform to the construction of the print head. Further, the ink jet printing apparatus generally has a recovery system to maintain the ink ejection performance of the print head in good condition. It also has a drive mechanism to move the recovery system and the ink jet print head toward and away from each other, and the recovery system and drive mechanism should also be designed according to the construction of the print head. In addition to the construction of the printing apparatus, the information processing device as the host device also undergoes significant specification changes in an image data development and a transfer system.

The present invention has been accomplished under these circumstances and its object is to provide a print module, an information processing device, a print system, a print unit, an ink supply unit, a print method and programs, all capable of quickly and easily meeting demands for a print medium size change, particularly to increased sizes, while at the same time coping with demands for faster printing speed.

In a print system where a plurality of modules each containing a print head are connected to a shared information processing device, it is another object of this invention to improve a print system operation environment by enabling the information processing device to identify the individual modules.

It is yet another object of this invention to improve throughput by enabling an optimum operation mode to be set according to the relation between a print data generation speed and a speed of printing an image based on the print data.

It is a further object of this invention to advance a print start timing by enabling a print operation preparation start timing to be set optimally.

The print module according to this invention is installed as one of a plurality of print modules and capable of printing an image by cooperating with the other print modules and comprises: an ink tank capable of accommodating ink; a print head capable of performing a print operation by applying the ink introduced from the ink tank onto a print medium; a receiving portion to receive print data to be printed by the print head, a print start signal defining a print start timing of the print head, and a drive timing signal defining a drive timing of the print head; a control portion to, when it receives the print start signal, control the print head according to the print data at the drive timing defined by the drive timing signal; an information holding portion to hold identity information of the print module; and a sending portion to send the identity information held in the information holding portion.

The information processing device according to this invention is connectable to the plurality of the print modules and comprises: a receiving portion capable of receiving the identity information from the print modules; and a sending portion capable of sending the print data associated with the identity information to the print modules.

The print system according to this invention includes: the print module; the information processing device; and means to move the print head of the print module relative to the print medium.

The print unit according to this invention constitutes a part of the print module and includes the print head, the receiving portion and the control portion.

The ink supply unit according to this invention constitutes a part of the print module and includes the ink tank.

The print method according to this invention prints an image on a print medium using the print system and comprises: a step for the information processing device to identify an arrayed position of the print head in the print module according to the identity information transmitted from the print module; a step for the information processing device to generate the print data according to the identified arrayed position of the print head; a step for the information processing device to send the generated print data to the associated print modules; and a step for the print modules to print an image according to the print data transmitted from the information processing device.

The programs according to this invention cause the computer to execute the steps in the print method.

This invention constructs the print heads in the form of print modules so that their ink systems and signal systems are independent among the print modules. Therefore, by arranging an appropriate number of print heads it is possible to quickly and easily meet demands for a print medium size change, particularly to increased sizes, while at the same time coping with demands for faster printing speed.

Further, adding identity information to each of a plurality of print modules, which are connected to the information processing device to form a print system, allows the information processing device to identity the individual print modules. The information processing device therefore can control these print modules individually, and create print data according to the arrayed positions of the print modules and then send them to the associated print modules.

BRIEF DESCRIPTION OF THE DRAWINGS

FIG. 60 is a list of print data generation time for each object in FIG. 59A and FIG. 59B.

BEST MODE FOR CARRYING OUT THE INVENTION

Now, embodiments of the present invention will be described by referring to the accompanying drawings.

In the following descriptions, the word "print" (or "record") does not simply refer to forming significant information such as characters and figures. The "print" also generally includes forming images, patterns or the like on print mediums and processing mediums, whether they are significant or insignificant or whether they are visible so as to be perceived by human sight.

The word "print medium" signifies not only paper used in common printing apparatus but also a wide range of materials capable of accepting ink, including cloth, plastic films, metallic sheets, glass, ceramics, woods and leathers.

Further, the word "ink" (or also referred to as "liquid") should be interpreted widely as with the definition of the word "print". That is, the word "ink" signifies a liquid used in forming images and patterns and processing print mediums, and also a liquid used to process ink (e.g., coagulating or insolubilizing of ink).

The word "nozzle", unless otherwise specifically noted, generally refers to a combination of an ejection opening, an ink path communicating with the opening and an element to generate ink ejection energy.

[First Embodiment]

Figure 1:
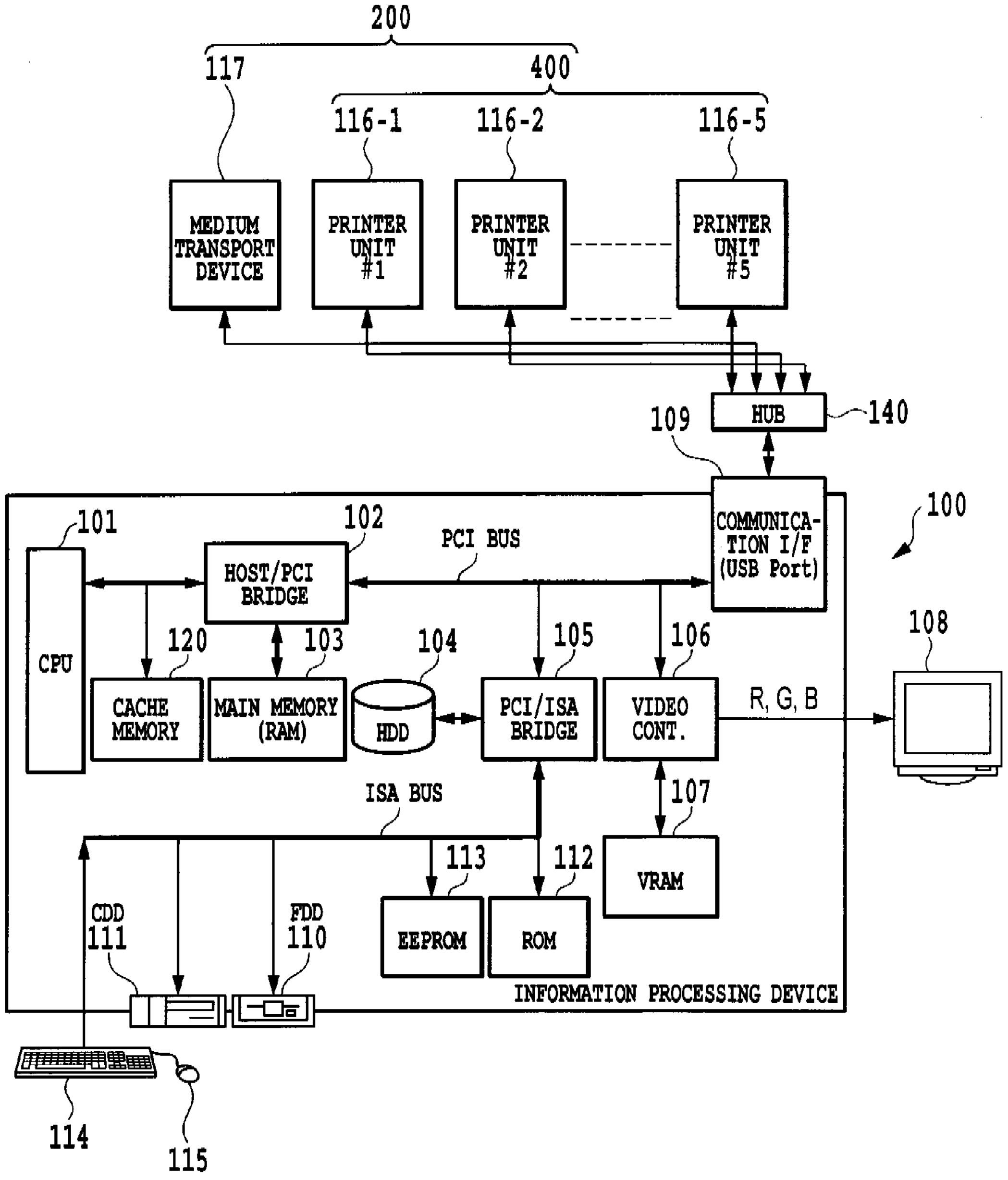
FIG. 1 is a block diagram showing an outline of an image forming system with printing apparatus in a first embodiment of the invention.
Figure 2:
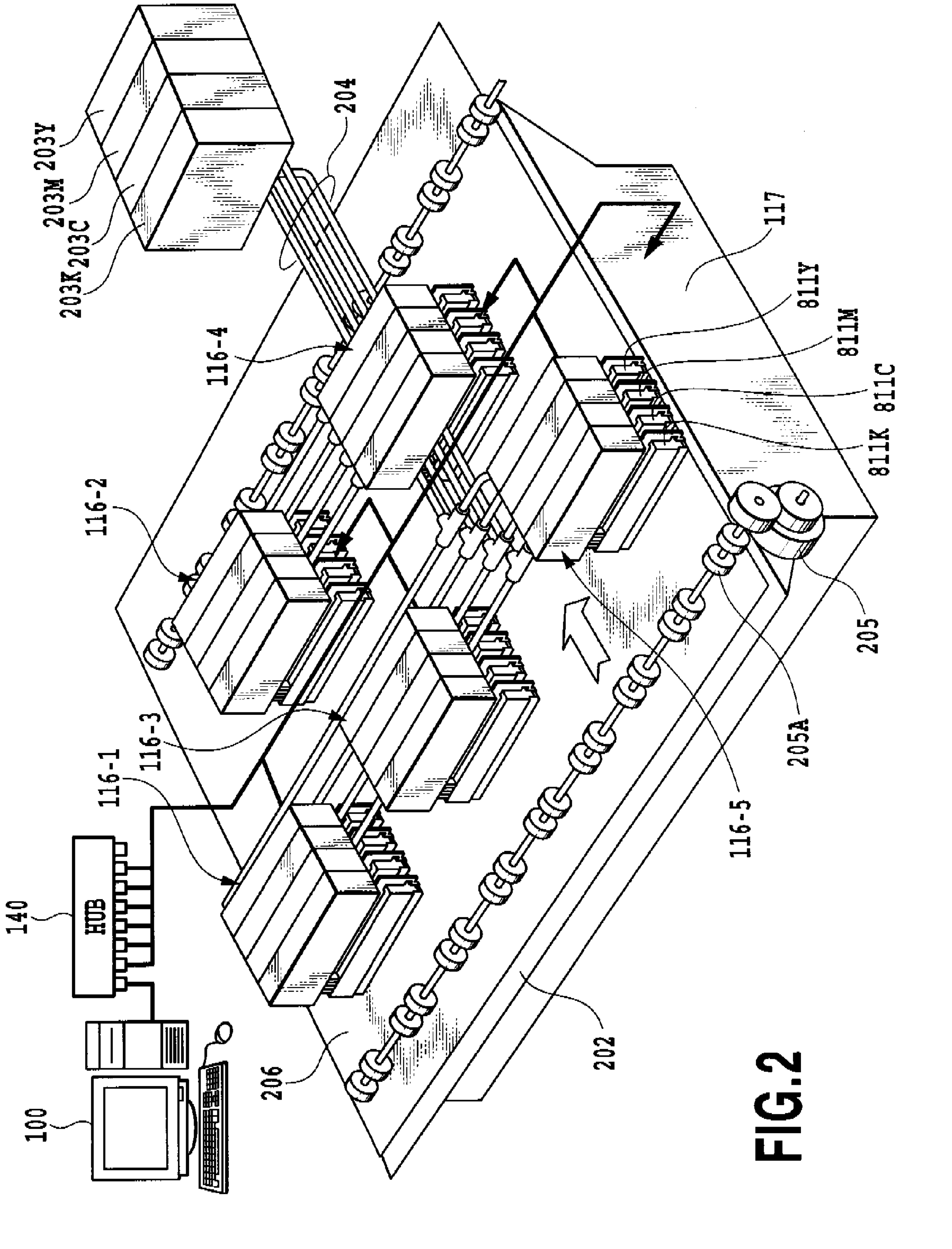
FIG. 2 is a schematic perspective view showing an outline construction of the image forming system of FIG. 1.

FIG. 1 and FIG. 2 show an example configuration of an image forming system to which the present invention can be applied.

(Overview of Image Forming System)

FIG. 1 and FIG. 2 are a block diagram and a schematic perspective view, respectively, showing an outline configuration of an image forming system. A printer composite system of this example comprises an information processing device 100 and an image forming device 200. The image forming device 200 has a medium transport device 117 and a printer composite system 400. The printer composite system has a plurality of independent engines or print modules (also referred to as "printing apparatus", "printers", or "printing modules") 116-1 to 116-5.

The information processing device 100 is a source of data for an image to be formed, and divides one page of image into a plurality of areas and supplies a plurality of divided pieces of image data corresponding to the divided areas to a plurality of print modules 116-1 to 116-5, respectively. A print medium 206 transported by the medium transport device 117 has a widthwise size that matches an area printable by an array of print modules 116-1 to 116-5. The medium transport device 117 detects an end of the print medium 206 (paper end) and outputs signals that define print start positions for individual print modules 166-1 to 116-5.

The printer composite system 400 has a plurality (in this example, five) of print modules 116-1 to 116-5 arranged to print associated divided areas of a print area on the print medium 206. Each of the print modules independently performs a printing operation on the associated divided print area at a timing defined by the medium transport device 117 according to the divided image data supplied from the information processing device 100. Each print module mounts print heads for ejecting three primary color inks, yellow (Y), magenta (M) and cyan (C), and a black (K) ink to form a full color image on the print medium 206. To each of the print heads, the associated color ink is supplied from an ink source, i.e., ink tanks 203Y, 203M, 203C, 203K.

In FIG. 1, CPU 101 is a central processing unit that performs an overall system control on the information processing device 100. In the information processing device 100, the CPU 101 under the control of an operating system (OS) executes processing defined by application programs for generation and editing of image data, processing defined by an image dividing program of this embodiment, processing defined by a print program (printer driver) for a plurality of the print modules 166-1 to 166-5, and processing defined by a control program (described later in connection with FIG. 5) for the medium transport device 117.

The CPU 101 has a hierarchical system bus configuration, in which the CPU is connected to a PCI bus as a local bus through a host/PCI bridge 102 and further connected to an ISA bus through a PCI/ISA bridge 105 for connection with devices on these buses.

A main memory 103 is a RAM (Random Access Memory) which temporarily stores the OS, application programs and control programs and is also used as a work memory area for the execution of programs. These programs are read from, for example, a hard disk drive HDD 104 and loaded into the main memory. The system bus is connected with a cache memory 120, a high-speed memory using a static RAM (SRAM), which stores codes and data that the CPU 101 accesses frequently.

A ROM (Read Only Memory) 112 stores a program (BIOS: Basic Input Output System) that controls input/output devices, such as keyboard 114, mouse 115, CDD 111 and FDD 110, connected through an input/output circuit (not shown), an initialization program that is activated when a system power is turned on, and a self-diagnostic program. An EEPROM (Electrically Erasable Programmable ROM) 113 is a nonvolatile memory to store a variety of permanently used parameters.

A video controller 106 continuously and cyclically reads RGB display data written into a Video RAM (VRAM) 107 and continually transfers them as screen refresh signals to a display 108 such as CRT, LCD, PDP (Plasma Display Panel), and SED (Surface-Conduction Electron Emitter Display).

A communication interface 109 with the print modules 166-1 to 166-5 is connected with the PCI bus and may use, for example, bidirectional Centronix interface, USB (Universal Serial Bus) and hub connections, all conforming to IEEE 1284 standard. In FIG. 1, the PCI bus is connected through the communication interface 109 to the hub 140, which in turn is connected to each of the print modules 166-1 to 166-5 and the medium transport device 117. While this embodiment uses the wired type communication interface 109, other types of communication interface such as wireless LAN may be used.

Figure 3:
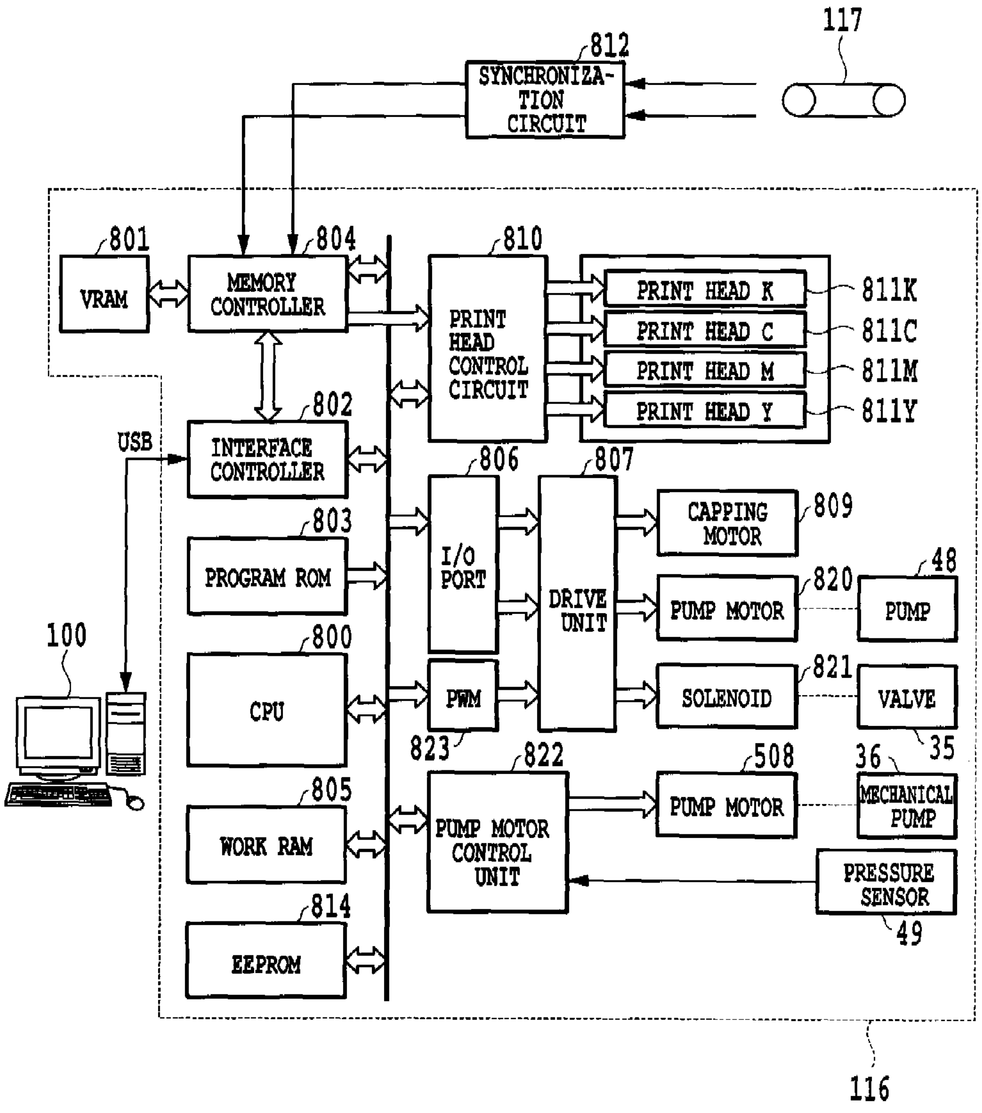
FIG. 3 is a block configuration diagram of a control system for the printing apparatus of FIG. 1.

The print program (printer driver) has a means to set the number of print modules 166-1 to 166-5 connected to the information processing device 100 (corresponding to the number of divisions by which one page of image is divided), a means to assign an area (divided width) to each of the print modules 166-1 to 166-5 (described later in connection with FIG. 4), and a means to allocate which part of one page to which print module (see FIG. 3). Based on the settings made by these setting means, one page of image is divided and the corresponding divided image data are transferred to the individual print modules 166-1 to 166-5 for printing.

As described earlier, the print program generates print data for the print modules 166-1 to 166-5 and transfers them to the associated print modules. Therefore, the print programs themselves, or the print data generation processing and the print data transfer processing in the print program, can be run parallelly (multiprocess, multithread) for fast processing.

Referring to FIG. 2 again, the information processing device 100 is connected to the print modules 166-1 to 166-5 and the medium transport device 117 through the hub 140 for transfer of print data, operation start/end commands and others. Connections are also made between each of the print modules 166-1 to 166-5 (hereinafter referred to by a reference number 116 unless otherwise specifically stated) and the medium transport device 117 for transfer of a detection signal representing the front end of print medium 206, a signal for setting the print start position and a signal for synchronizing the medium transport speed and the printing (ink ejection) operation of each print module.

For continuous full color printing on the print medium 206, each of the print modules 116 mounts four print heads 811Y, 811M, 811C and 811K (hereinafter referred to by a reference number 811 unless otherwise specifically noted) that eject yellow (Y), magenta (M), cyan (C) and black (K) inks respectively. The order of arrangement of the color ink print heads in the transport direction of the print medium 206 is the same among the print modules and thus the order of color overlapping is also the same. Ink ejection nozzles in each print head are arrayed at a density of 600 dpi (dots/inch (for reference)) in the width direction of the print medium (a direction perpendicular to the medium transport direction) over four inches (about 100 mm (for reference)). The print modules 166-1 to 166-5 in combination can therefore cover the maximum print width of about 500 mm.

The print heads 811Y, 811M, 811C and 811K in each print module 116 are supplied their associated color inks through dedicated tubes 204 from the ink source, i.e., ink tanks 203Y, 203M, 203C and 203K.

(Control System for Print Modules)

FIG. 3 shows an example configuration of a control system in each print module 116.

In the figure, 800 represents a CPU that performs an overall control on the print module 116 according to a program defining a sequence of processing described later with reference to FIG. 5. Denoted 803 is a ROM that stores the program and fixed data; 805 a RAM used as a work memory area; and 814 an EEPROM that holds parameters used by the CPU 800 for control even when the power supply to the print module is turned off.

Designated 802 is an interface controller for connecting the print module 116 to the information processing device 100 through USB cable. Denoted 801 is a VRAM to expand image data of each color. A memory controller 804 transfers image data received through the interface controller 802 to the VRAM 801 and also controls an operation of reading image data as the printing operation proceeds. When divided print data is received by the interface controller 802 from the information processing device 100 through USB cable, the CPU 800 analyzes a command attached to the print data and issues an instruction to rasterize image data of each color component into a bit map in the VRAM 801. Upon receipt of this instruction, the memory controller 804 writes the image data from the interface controller 802 into the VRAM 801 at high speed.

Denoted 810 is a control circuit to control the print heads 811Y, 811M, 811C, 811K. Denoted 809 is a capping motor that operates a capping mechanism (not shown) to cap the surface of the print heads 811 in which nozzles are formed. The capping motor 809 is driven through an input/output port 806 and a drive unit 807.

A pump motor 820 is a reversible motor that operates a pump 48 inserted between subtanks 40 described later (see FIG. 9) and the print heads 811. A solenoid 821 is an actuator to operate a valve 35 and can be controlled by a PWM (Pulse Width Modulation) value set in a PWM circuit 823 by the CPU 800 so as to secure a linear open-close state of the valve 35.

A pump motor 508 is a servo motor that controls a mechanical pump 36 by feeding back an output of a pressure sensor 49 installed near a path in each print head to a pump motor controller 822. A set of the pump motors 820, 508, solenoid 821 and pressure sensor 49 is provided independently for each of the print heads 811Y, 811M, 811C, 811K of different color inks.

These are characteristic constitutional elements of this invention and will be described later in more detail.

When the print module 116 is not in use, the capping motor 809 is driven to move the capping mechanism toward the print heads 811Y, 811M, 811C, 811K for capping. When image data to be printed is mapped in the VRAM 801, the capping motor 809 is driven to move the capping mechanism away from the print heads 811Y, 811M, 811C, 811K for uncapping and the print module waits for a print start signal from the medium transport device 117 described later.

Denoted 806 is an input/output (I/O) port which is connected with the motor drive unit 807, other drive means and sensors (not shown) for signal transfer to and from the CPU 800. A synchronization circuit 812 receives from the medium transport device 117 a print medium head detection signal and a position pulse signal representing the movement of the print medium and generates a timing signal to cause the printing operation to be executed, properly synchronized with these signals. That is, in synchronism with the position pulse produced as the print medium is transported, data in the VRAM 801 is read out at high speed by the memory controller 804 and transferred though the print head control circuit 810 to the print heads 811 to execute the color printing.

(Configuration of Transport Device and Control System)

Referring to FIG. 2, the medium transport device 117 so sized as to be suited for transporting a print medium is large in a widthwise direction of the print medium and has an arbitrary dimension in the transport direction. A media stage 202 is provided to ensure that gaps between all print heads 811 of the print modules 166-1 to 166-5 and a print surface of the print medium 206 are equal as much as possible. Print mediums used vary in thickness, so a means may be added for improving the level of intimate contact of the print medium with the media stage 202 so as to keep the gaps between the print surface of even thick paper and the print heads 811 within a predetermined range. The transport motor 205 drives an array of transport rollers 205A to feed the print medium in intimate contact with the upper surface of the media stage 202.

Figure 4:
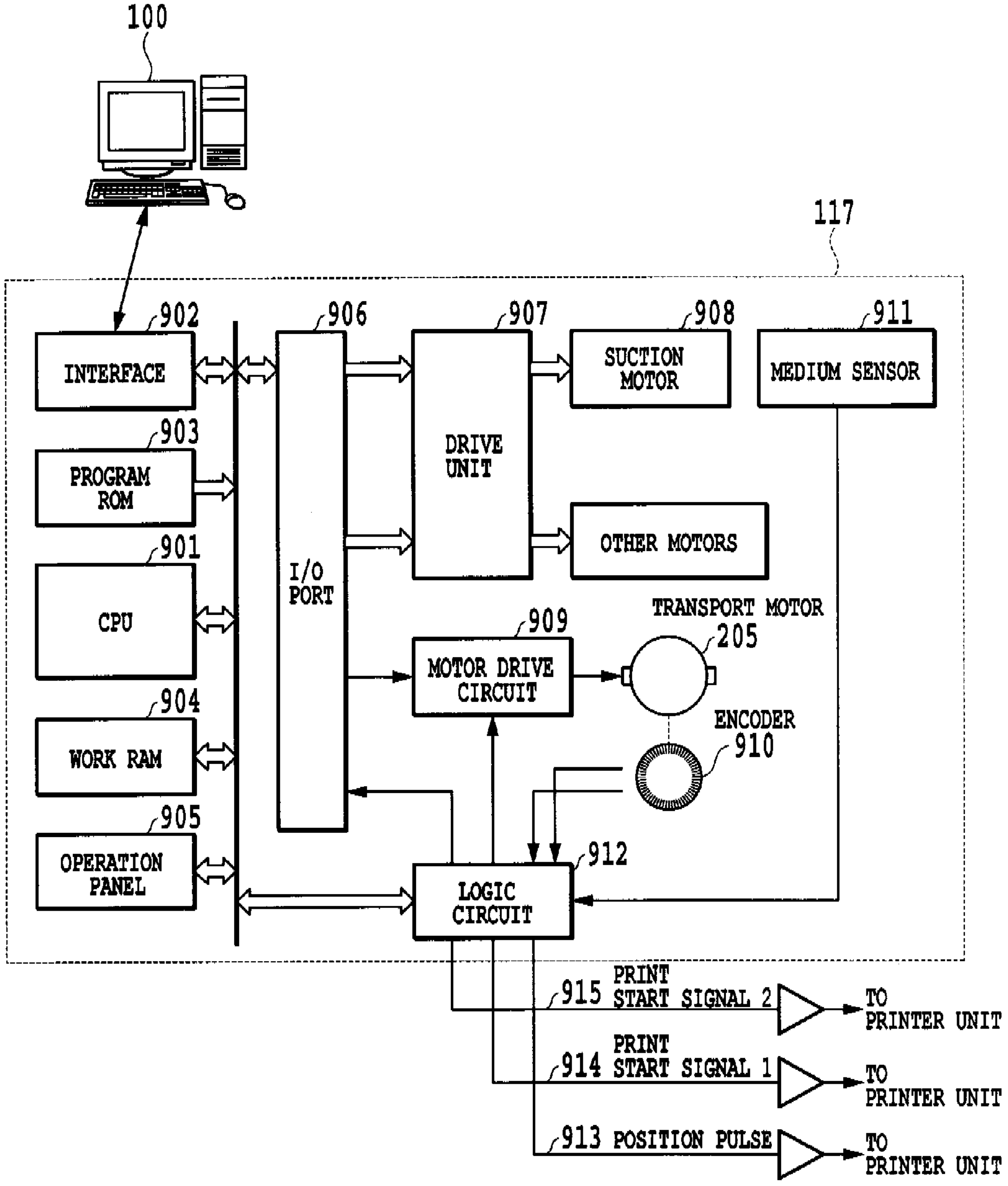
FIG. 4 is a block configuration diagram of a control system for a medium transport device in the image forming system of FIG. 1.

FIG. 4 shows an example configuration of a control system for the medium transport device 117.

In the figure, reference number 901 represents a CPU that performs an overall control on the medium transport device according to a program defining a sequence of processing described later with reference to FIG. 5. Denoted 903 is a ROM storing the program and fixed data; and 904 a RAM used as a work memory area.

Denoted 902 is an interface to connect the medium transport device 117 to the information processing device 100. Designated 905 is an input unit for the user to enter his or her instructions or other inputs to the image forming device and also an operation panel having a display unit for predetermined indications. In this example, this unit is installed on the medium transport device.

Denoted 908 is a suction motor to operate a vacuum pump. The vacuum pump forms one example of means to keep a non-print surface (back) of the print medium in intimate contact with the upper surface of the media stage 202. More specifically, a large number of fine holes are formed in the media stage 202, extending from the bottom of the media stage 202 to its transport surface, and the vacuum pump is operated to keep the print medium in intimate contact with the media stage 202 by a suction applied through the fine holes. When a transport start command is received from the information processing device 100 through the interface 902, the suction motor 908 is started to draw the print medium 206 to the upper surface of the media stage 202 by suction.

Denoted 907 is a drive unit to operate the suction motor 908 and other associated operating units. Denoted 909 is a drive unit for the transport motor 205.

A logic circuit 912 forms a servo system that receives an output from a rotary encoder 910 mounted on the transport motor 205 and performs a feedback control on the transport motor 205 to feed the print medium at a constant speed. The transport speed can be set arbitrarily by a speed value written in the logic circuit 912 by the CPU 901. The rotary encoder 910 may be arranged coaxial with the row of transport rollers 205A, rather than being mounted on the shaft of the transport motor 205.

Also supplied to the logic circuit 912 is an output from a medium sensor 911 that is provided upstream of the print position in the transport direction to detect when the front end of the print medium 206 reaches a point close to the print start position. According to a distance in the transport direction from the position where the front end of the print medium is detected by the medium sensor 911 to each print module, the logic circuit 912 outputs an appropriate print instruction signal to each print module. In this embodiment, since the print modules 166-1 to 166-5 are arranged in two rows in the transport direction as shown in FIG. 2, i.e., the print modules 116-1, 116-3, 116-5 are arranged in line on the upstream side in the transport direction and print modules 116-2, 116-4 are arranged in line on the downstream side, the logic circuit 912 issues two print command signals 914, 915. Considering errors in the mounting positions of the print modules, corrections may be made of the print start signal 914 or 915 for each print module independently according to a physical distance from the medium sensor 911 to each print module.

The logic circuit 912 properly transforms the output of the rotary encoder 910 into a print medium position pulse 913. In synchronism with this position pulse 913, each print module performs a printing operation. A resolving power of the position pulse may be determined as desired. For example, it may be set equal to a plurality of print lines. Further, the construction of a print medium transport unit in the medium transport device 117 is not limited to the one shown in FIG. 2 which has the fixed media stage 202. For example, the print medium transport may be accomplished by feeding it on an endless transport belt, which is wound around a pair of drums installed upstream and downstream of the print position in the transport direction and which is driven by the rotating drums. The transport unit of these constructions can feed print mediums of both cut paper type and continuous sheet type.

(Outline of Operation of Image Forming System)

Figure 5:
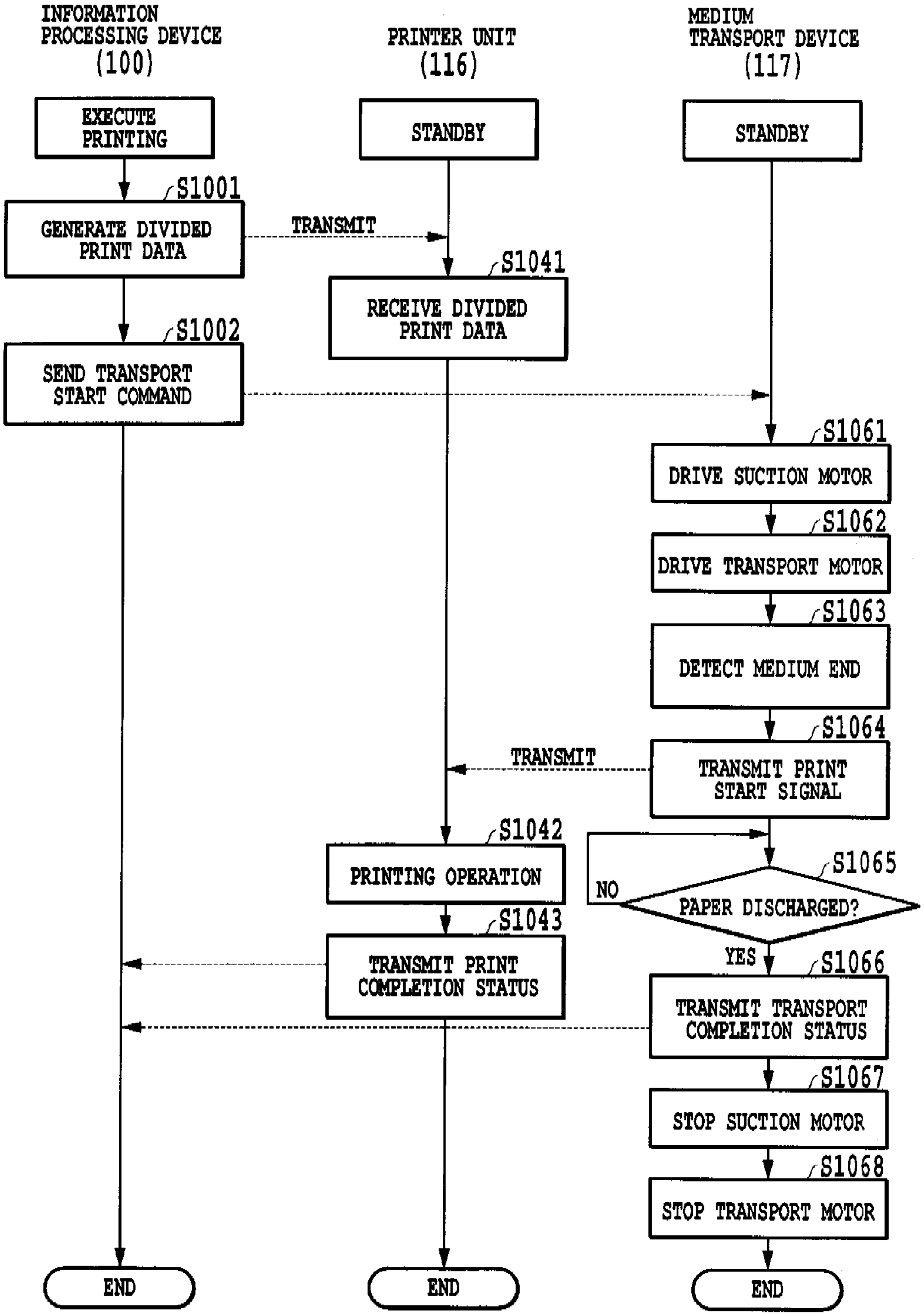
FIG. 5 is a flow chart showing an operation sequence among an information processing device, the printing apparatus and the medium transport device in the image forming system of FIG. 1.

FIG. 5 shows a sequence of operations among the information processing device 100, the print modules 116 of the printer composite system 400, and the medium transport device 117.

For execution of a printing operation, the information processing device 100 generates divided print data and sends them to the associated print modules (step S1001). According to the data received, each of the print modules 116 uncaps the print heads 811 and performs data mapping on the VRAM 801 (step S1041). When all print modules 166-1 to 166-5 have completed the reception of data, the information processing device 100 sends a transport start command to the medium transport device 117 (step S1002).

The medium transport device 117 first drives the suction motor 908 (step S1061) in preparation for drawing the print medium 206 to the media stage 202 by suction. Next, the medium transport device 117 drives the transport motor 205 to start feeding the print medium 206 (step S1062). When it detects the front end of the medium (step S1063), the medium transport device 117 sends the print start signals 914, 915 and the position pulse 913 to the print modules 166-1 to 166-5 (step S1064). As described earlier, the print start signal is issued according to the distance from the medium sensor 911 to each print module.

When the printing operation by the print modules 116 (step S1042) is finished, they send a print completion status to the information processing device 100 (step S1043) and end the processing. At this time, each print module caps its print heads 811 with a capping mechanism not shown to prevent possible drying and clogging of the nozzles (ink ejection openings).

With the printing operation complete and the print medium 206 discharged from the media stage 202 (step S1065—Yes), the medium transport device 117 sends a transport completion status to the information processing device 100 (step S1066). Next, the medium transport device 117 stops the suction motor 908 and the transport motor 205 (step S1067, S1068) and ends its operation.

(Signal System for Printer Composite System)

Figure 6:
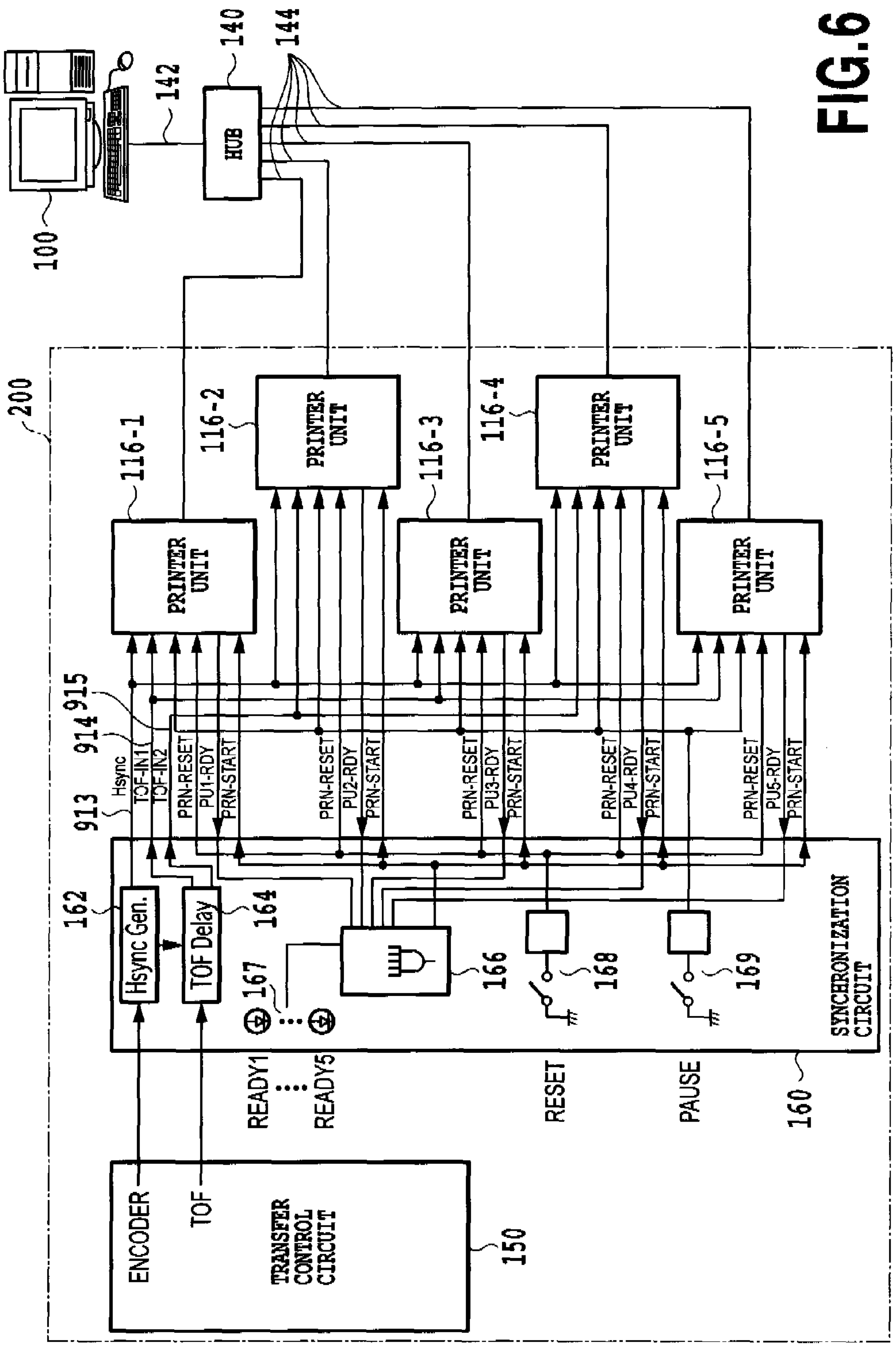
FIG. 6 is a block configuration diagram of a control system for a plurality of printing apparatus of FIG. 1.

FIG. 6 shows an example of signal system for the print modules 166-1 to 166-5 making up the printer composite system. The signal system connected to each of the print modules 166-1 to 166-5 is largely divided in two systems. One is involved in transmitting the divided print data (including the operation start and end commands) supplied from the information processing device 100 and the other is involved in transmitting a print timing defining signal (including the print start signal and position pulse) supplied from the medium transport device 117.

In the example shown in FIG. 6, the divided print data transmission system has a hub 140 that relays data between the information processing device 100 and the print modules 166-1 to 166-5. The hub 140 is connected to the information processing device 100 through, for example, a 100BASE-T standard connector/cable 142 and to each of the print modules 166-1 to 166-5 through, for example, a 10BASE-T standard connector/cable 144.

The print timing defining signal transmission system has, in the example of FIG. 6, a transfer control circuit 150 and a synchronization circuit 160. These may be provided as circuits making up the logic circuit 912 of FIG. 4. The transfer control circuit 150 supplies to the synchronization circuit 160 an output ENCODER of the rotary encoder 910 mounted on the transport motor 205 and a print medium front end detection output TOF.

The synchronization circuit 160 has a print operation enable circuit 166 which takes a logical AND of the operation ready signals PU1-RDY to PU5-RDY issued from the print modules 166-1 to 166-5 upon receipt of the divided image data to determine if all the print modules are ready for the printing operation (with their print heads uncapped), and which, if so, issues a print operation enable signal PRN-START. The synchronization circuit 160 also has an indication unit 167 such as LED to perform an indication associated with the operation ready signals PU1-RDY to PU5-RDY for the user to check that the print modules are ready to operate. Further, the synchronization circuit 160 also has a reset circuit 168 for the user to manually reset the print modules and a pause circuit 169 to temporarily stop the operation after one sheet of print medium has been printed out.

The synchronization circuit 160 also has a synchronization signal generation circuit 162 and a delay circuit 164. The synchronization signal generation circuit 162 generates from the encoder output ENCODER a position pulse signal 913, a synchronization signal (Hsync) that causes the print modules to perform the printing operation in synchronism with one another (e.g., 300 pulse signals per inch of transport distance of print medium). The resolving power of the position pulse signal 913 is preferably an integer times the print resolution in the print medium transport direction.

The delay circuit 164 produces from the print medium front end detection output. TOF the print command signals 914, 915 that are delay signals corresponding to the position of each print module in the medium transport direction.

The printing operation of the print modules 116-1, 116-3, 116-5 on the upstream side of the print medium in the transport direction is started upon reception of the print command signal (TOF-IN1) 914. The print command signal (TOF-IN1) 914 is a delay signal that has a delay corresponding to a distance from the medium sensor 911 to the positions of these print modules. If the distance from the medium sensor 911 to these print modules is zero, the print command signal 914 is issued almost simultaneously with the front end detection output TOF.

The printing operation of the print modules 116-2, 116-4 arranged downstream of the print medium in the transport direction, on the other hand, is started upon reception of the print command signal (TOF-IN2) 915. The print command signal (TOF-IN2) 915 is a delay signal that has a delay corresponding to a distance from the medium sensor 911 to the positions of these print modules. In this embodiment the distance from the medium sensor 911 to these print modules is set at 450 mm. Thus, if the position pulse 913 or synchronization signal (Hsync) is 300 pulses per inch (25.4 mm) of print medium transport distance, the print command signal 915 is issued with a delay of 5,315 pulses after the front end detection output TOF.

In order to make fine corrections on the print positions of individual print modules in the medium transport direction or considering a case where the print modules are not arranged in two rows, the print command signal may be supplied independently to each print module.

As can be seen from FIG. 6, the print modules 166-1 to 166-5 each receive the divided print data from the information processing device 100 and perform the printing operation independently of each other according to the print timing defining signal supplied from the medium transport device 117. That is, each of the print modules 166-1 to 166-5 is a complete circuit in terms of the signal system such that the print data and print timing are not transmitted from one print module to another and that each print module has a means (shift register and latch circuit) to arrange the data for the print heads 811Y-811K and for the nozzles arrayed in each print head and eject ink at specified timings. That is, the print modules 166-1 to 166-5 have the same hardware and operate under the same software; the operation of one print module does not directly affect the operation of another print module; and they cooperate to print one whole image.

(Outline of Ink System)

The print modules 166-1 to 166-5 in this example are independently operable printers and are also independent of each other in the ink system including an ink supply system and a recovery system for the print heads 811 in each print module.

Figure 7:
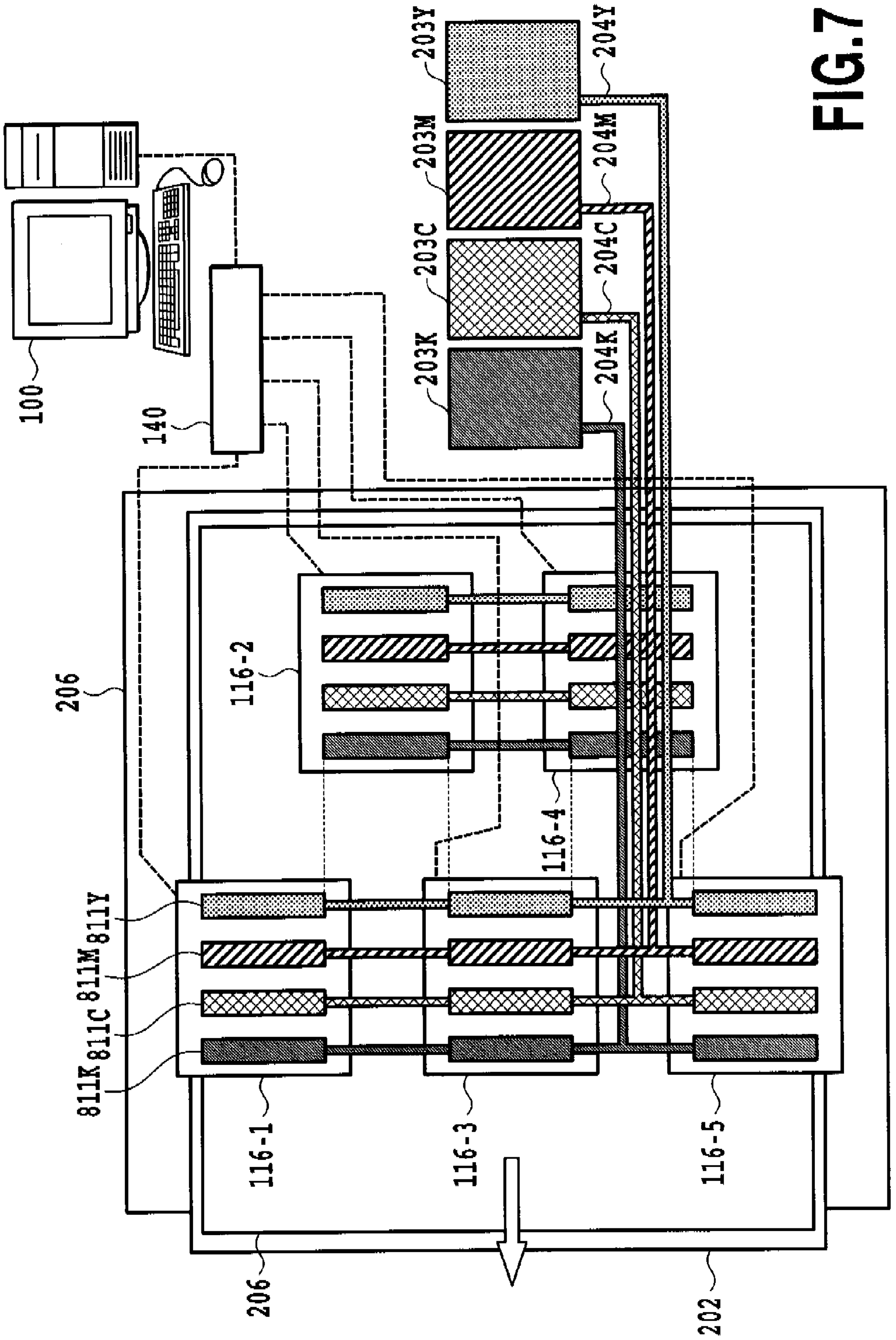
FIG. 7 is a schematic diagram showing a configuration of an ink supply system for the plurality of printing apparatus of FIG. 1.

FIG. 7 is a schematic diagram showing the configuration of the ink system, particularly the ink supply system. As shown in the figure, color inks are distributed from the ink source or ink tanks (also referred to as main tanks) 203Y, 203M, 203C, 203K to the print heads 811Y, 811M, 811C, 811K of each print module 116 through dedicated tubes 204Y, 204M, 204C, 204K. Ink supply may be done in either of two modes: one establishes a fluid communication with ink tanks at all times; and the other establishes the fluid communication with an ink supply unit provided for each print head only when the ink in the unit is running low, thereby supplying ink intermittently.

The recovery system of this embodiment has a cap that comes into contact with a nozzle forming surface of the print heads 811 and receives ink forcibly discharged from the nozzles. The recovery system further circulates the received ink for reuse.

The cap is disposed below the transport plane of the print medium 206, i.e., inside the media stage 202, and can be arranged to face or contact the nozzle forming surface of the print heads. Considering the use of a continuous sheet of print medium such as rolled paper, the cap may be disposed above the print medium transport plane, i.e., on the same side as the print heads 811 to allow the recovery operation to be performed without removing the print medium.

As described above, in this embodiment the ink supply system and the recovery system for the print heads 811 in each print module are constructed to be independent of other print modules. This arrangement allows for the supply of an appropriate amount of ink and the recovery operation according to the operation state, i.e., the amount of ink used for printing in each print module.

(Example Configuration of Ink System)

Figure 8:
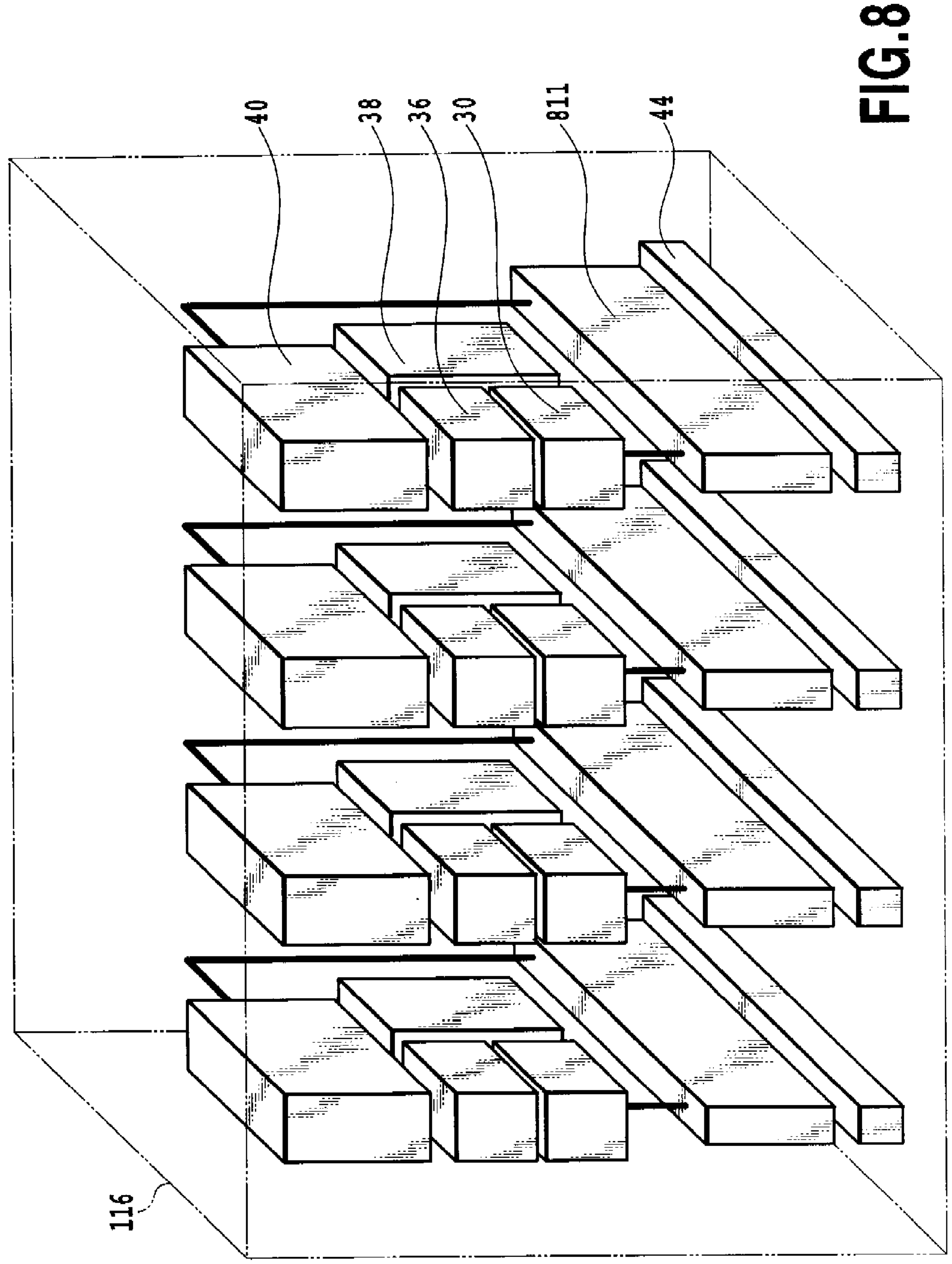
FIG. 8 is a schematic diagram showing a positional relation among essential portions of an ink system in one of the printing apparatus of FIG. 1.
Figure 9:
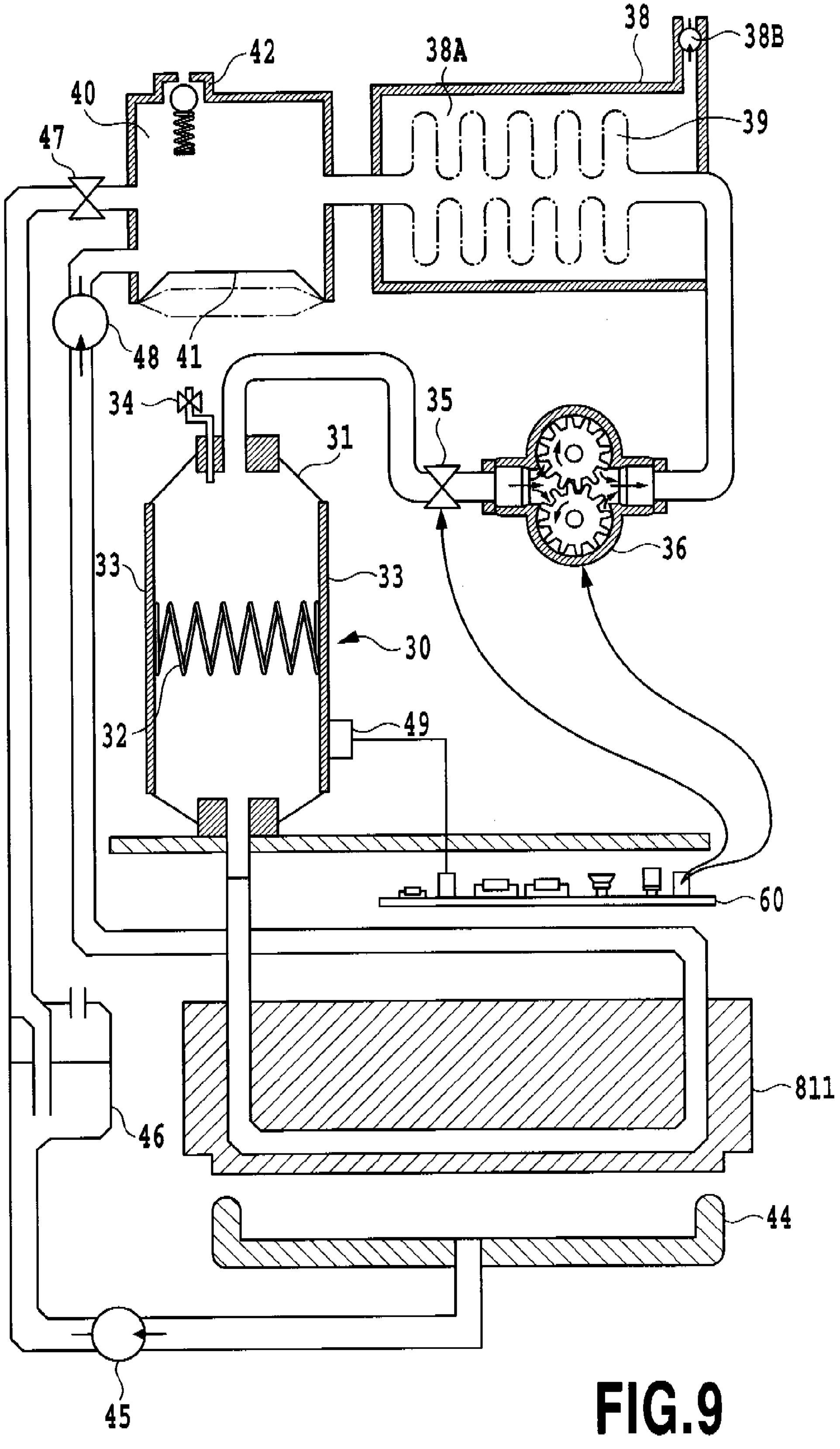
FIG. 9 is a schematic diagram showing a configuration of an ink system for one print head in the printing apparatus of FIG. 1.

FIG. 8 shows a positional relation among essential portions of the ink system in one print module 116 and FIG. 9 shows an example inner construction of the ink system for one print head. The print head 811 is connected with two ink tubes, one of which is connected to a negative pressure chamber 30 to generate a negative pressure that balances with a force holding a meniscus formed in the nozzles of the print head and the other is connected to the ink supply unit (hereinafter referred to as a subtank) 40 provided for each print head through the pump 48.

Figure 10:
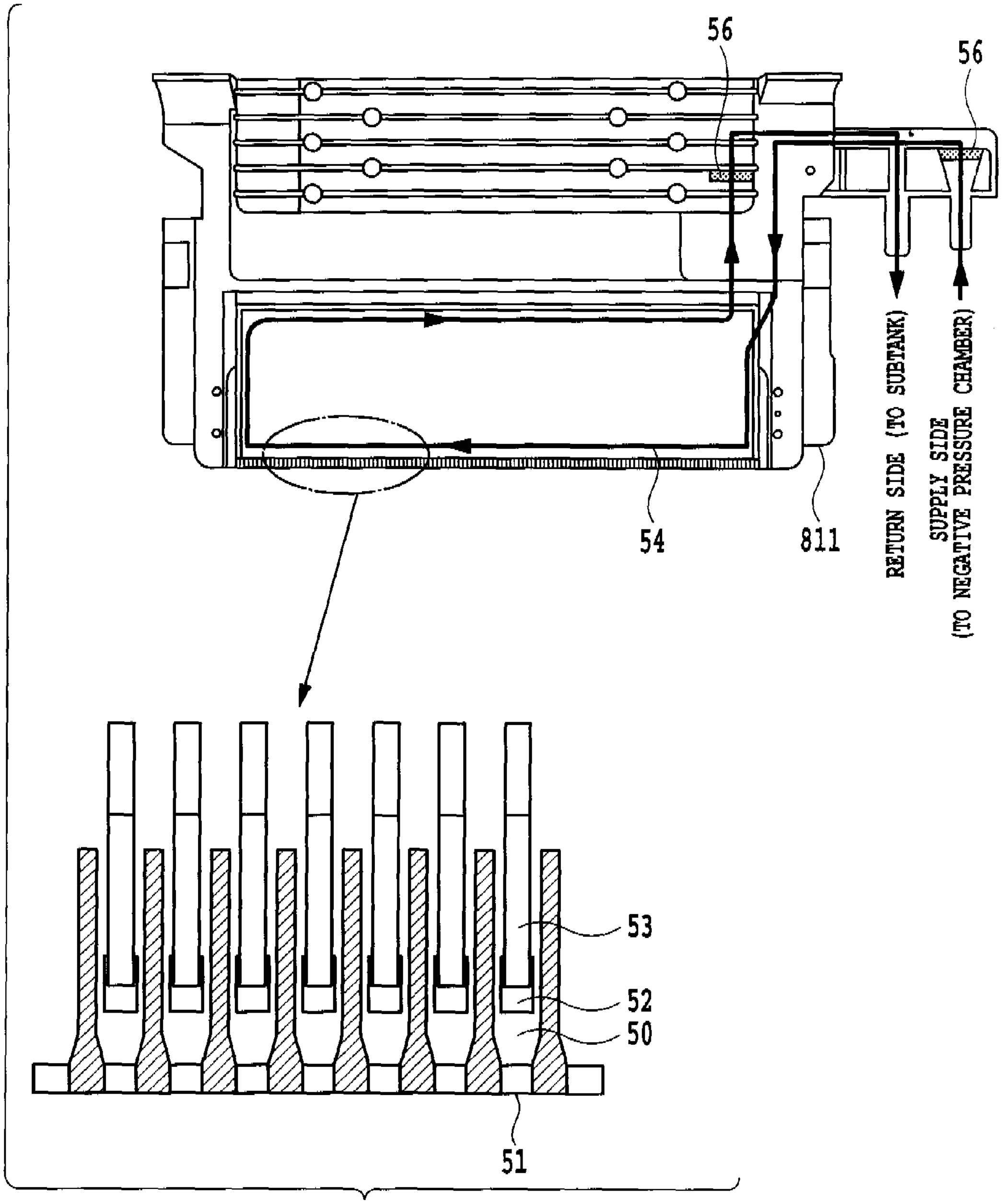
FIG. 10 is an explanatory diagram showing an ink path in the print head of FIG. 9.

FIG. 10 shows an ink path in the print head 811 and a partly magnified view. The print head used in this embodiment has 2,400 nozzles 50 arrayed at a density of 600 dpi (dots per inch) over a width of four inches. Each nozzle 50 has an ejection opening 51 at one end and, at the other end, is connected to an ink supply path 54. In each of the nozzles 50 there is provided an electrothermal transducer (heater) 52 that generates a thermal energy to heat ink and produce a bubble in ink to eject ink as it is energized. When the heater 52 is energized for 1μ to 5μ, the ink is heated and begins a film boiling at more than 300° C. on the heater surface. The ink is given an inertia force and ejected from the ejection opening 51 to land on the print medium, thereby forming an image. Each nozzle 50 is provided with a nozzle valve 53 as a fluid control element. This member is displaced as a bubble is formed so as to effectively apply the inertia force to the ink on the ejection opening side and blocks the movement of the ink on the supply path side toward the supply path side. Denoted 56 is a filter provided on both the supply side and return side of the ink supply path 54.

Figure 11A:
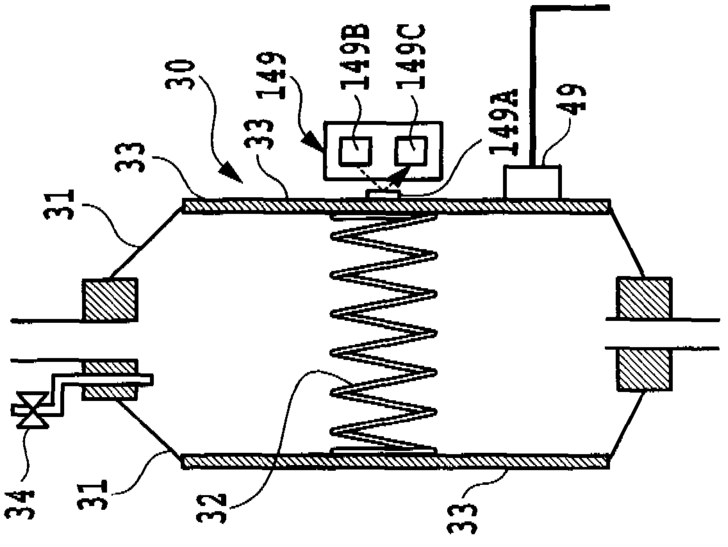
FIG. 11A is a schematic diagram showing an operation of a negative pressure chamber of FIG. 9.
Figure 11B:
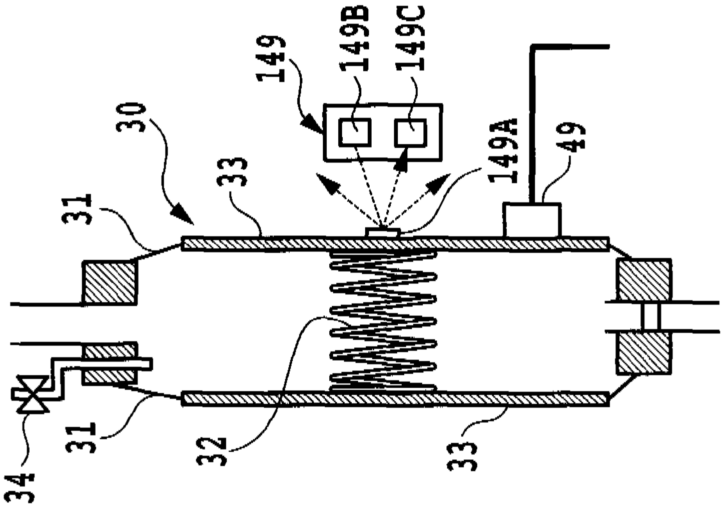
FIG. 11B is a schematic diagram showing the operation of the negative pressure chamber of FIG. 9.
Figure 11C:
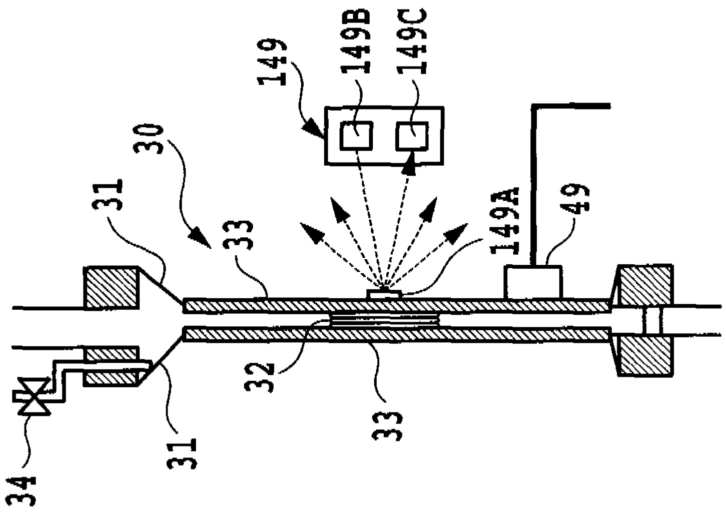
FIG. 11C is a schematic diagram showing the operation of the negative pressure chamber of FIG. 9.

As shown in FIG. 11A, FIG. 11B and FIG. 11C, the negative pressure chamber 30 comprises an ink holding member 31 formed of a resilient material and a pair of opposing platelike ink holding members 33. The negative pressure chamber 30 holds ink in an inner space defined by these members. Between the pair of opposing platelike ink holding members 33 is installed a compression spring 32, which urges the platelike ink holding members 33 away from each other to generate a negative pressure. This negative pressure chamber 30 is placed near the print head 811, so there is almost no pressure loss in the connection portion between them. Therefore, the interior of the negative pressure chamber 30 is almost equal to the negative pressure in the print head. If the ink demand from the print head 811 sharply changes and the pump 36 cannot catch up with the increased ink demand, the negative pressure chamber 30 works as a backup to help meet the demand. More specifically, the pair of platelike ink holding members 33 move toward each other compressing the compression spring 32 against its expansion force to reduce the inner volume of the negative pressure chamber 30 to supply ink.

The pressure sensor 49 may use a detection system that directly detects a negative pressure in the negative pressure chamber 30 or any other detection system. For example, an optical sensor 149 shown in FIG. 11A may be used. This sensor 149 comprises a reflection plate 149A mounted on the platelike ink holding member 33, a light emitting device (light emitting diode) 149B installed at a predetermined position opposite the reflection plate 149A outside the negative pressure chamber 30, and a light receiving device (light receiving transistor) 149C. Light from the light emitting device 149B is reflected by the reflection plate 149A and received by the light receiving device 149C. The quantity of light received is large when the ink volume in the negative pressure chamber 30 is large as shown in FIG. 11A, and decreases as the ink volume in the negative pressure chamber 30 decreases as shown in FIG. 11B and FIG. 11C. Thus, the sensor 149 detects the ink volume in the negative pressure chamber 30 and indirectly determines the negative pressure in the negative pressure chamber 30 from the relationship between the ink volume and the negative pressure in the negative pressure chamber 30.

The negative pressure chamber 30 is connected through a pressure adjust valve 35 (see FIG. 9) to a mechanical ink pump (also referred to as a "mechanical pump") 36 that controls the ink supply to the negative pressure chamber 30. In this example, the ink pump 36 is a gear pump.

Figure 12A:
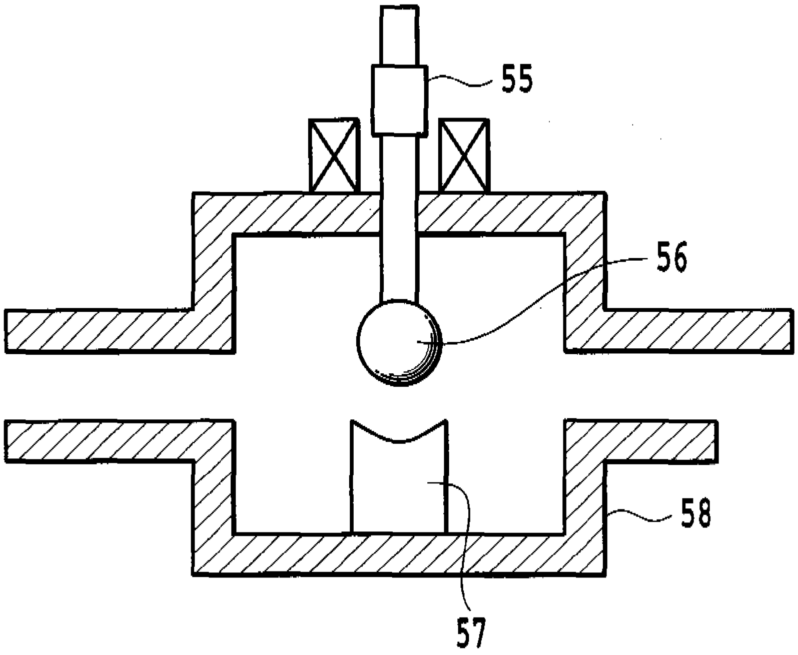
FIG. 12A is a schematic diagram showing an example construction of a valve of FIG. 9 and its operation.
Figure 12B:
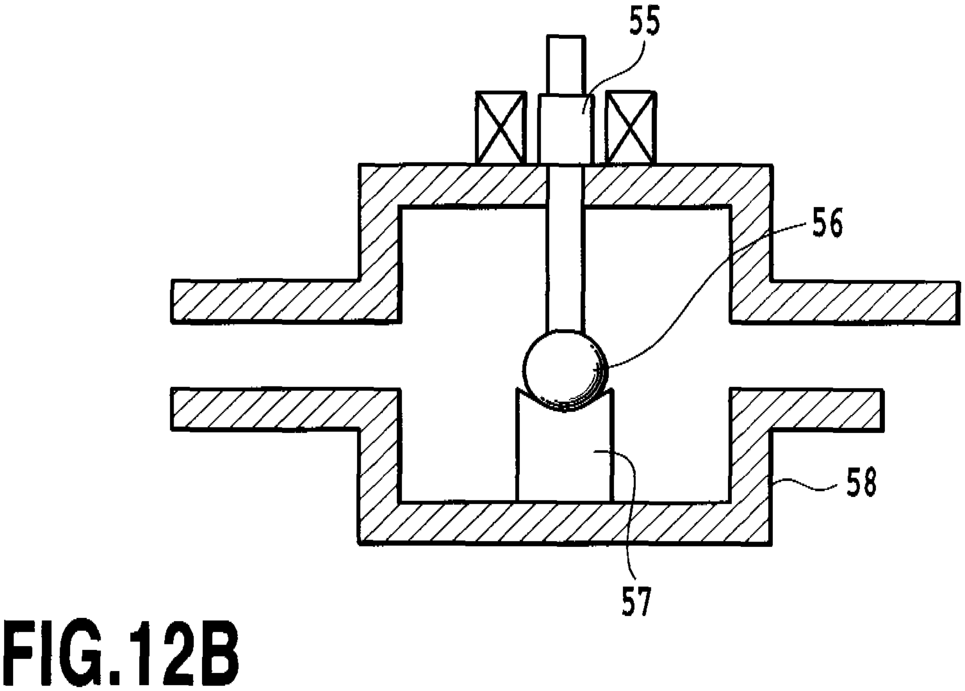
FIG. 12B is a schematic diagram showing the example construction of the valve of FIG. 9 and its operation.

Valves installed at various parts of the ink supply path, including the valve 35, may be of any desired type as long as they can properly open and close the path or properly control the ink flow in response to a control signal. For example, as shown in FIG. 12A and FIG. 12B, a valve 58 may be used which has a ball valve disc 56 and a seat 57 to receive the ball disc, with the valve disc connected to a plunger 55 that is driven forward and backward by a solenoid. In this case, the ink path can be opened and closed by controlling the energization of the solenoid to move the valve disc 56 toward or away from the seat 57. FIG. 12A represents a state in which the ink path is open and FIG. 12 represents a state in which the ink path is closed. As to the valve 35, however, it may use as an actuator a lightweight device such as piezoelectric element to allow for a highly responsive, high-performance negative pressure control.

As for the pumps installed at various parts of the ink supply path, including the pump 36, any desired type may be used as long as they can deliver ink in response to a drive signal. The pump 36 of this embodiment can control the direction and volume of ink flow. That is, the pump 36 of this example is a gear pump capable of selectively delivering ink in a direction that supplies ink to the negative pressure chamber 30 (the rotation in this direction is called a forward rotation) or in a direction that draws ink out of the negative pressure chamber 30 (the rotation in this direction is called a reverse rotation).

Figure 13:
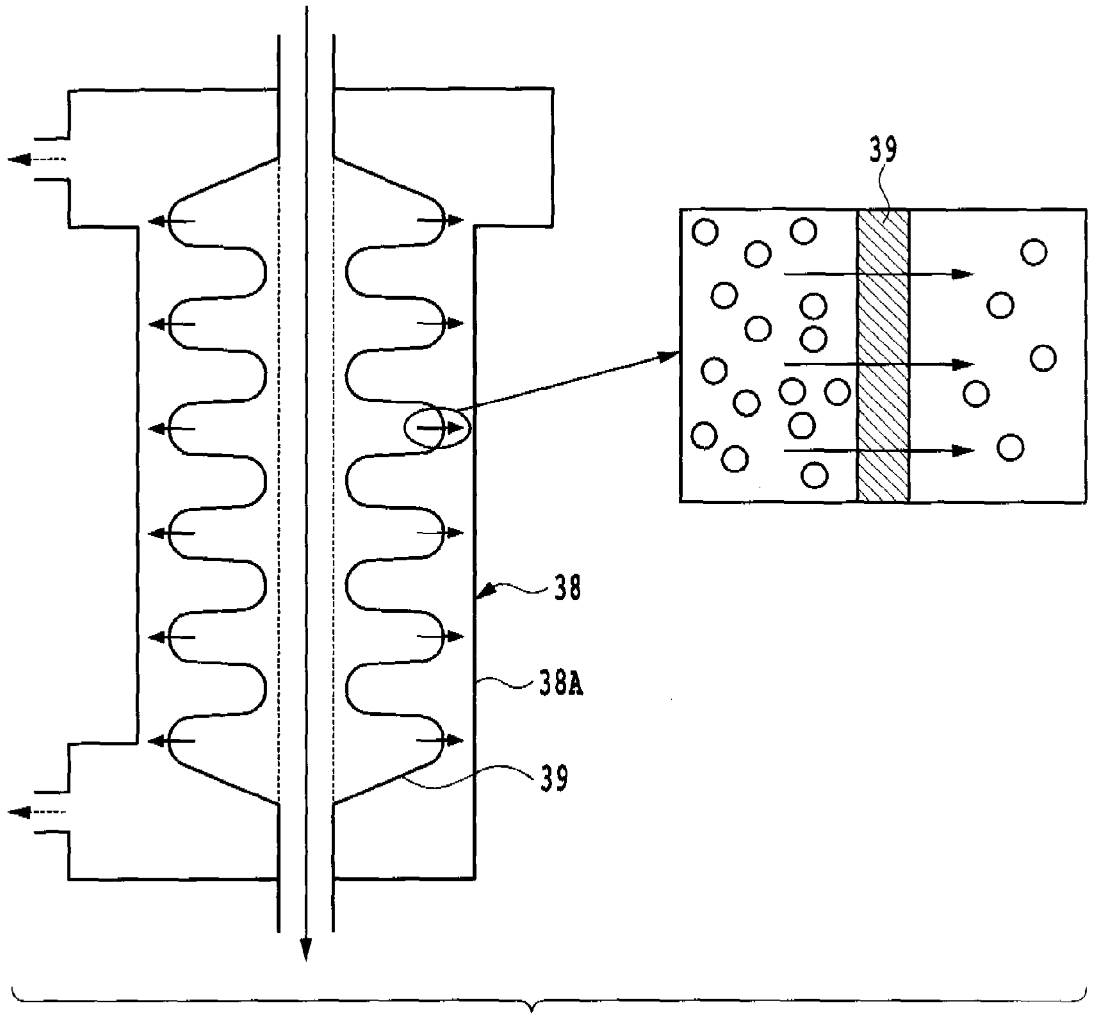
FIG. 13 is a schematic diagram showing an example construction of a deaeration system of FIG. 9.

The pump 36 is connected to a deaeration system 38 that removes gas components dissolved in the ink being delivered by the pump 36. The deaeration system 38, as shown in FIG. 13, comprises an ink supply path formed by a gas-liquid separation membrane 39 made of a material that passes gas but not liquid, a pressure reducing chamber 38A enclosing an ambient space, and a pump 385 (see FIG. 9) that reduces a pressure in the pressure reducing chamber 38A. The deaeration system 38 effectively removes gas from the ink flowing in the ink path by means of the gas-liquid separation membrane 39.

Figure 14A:
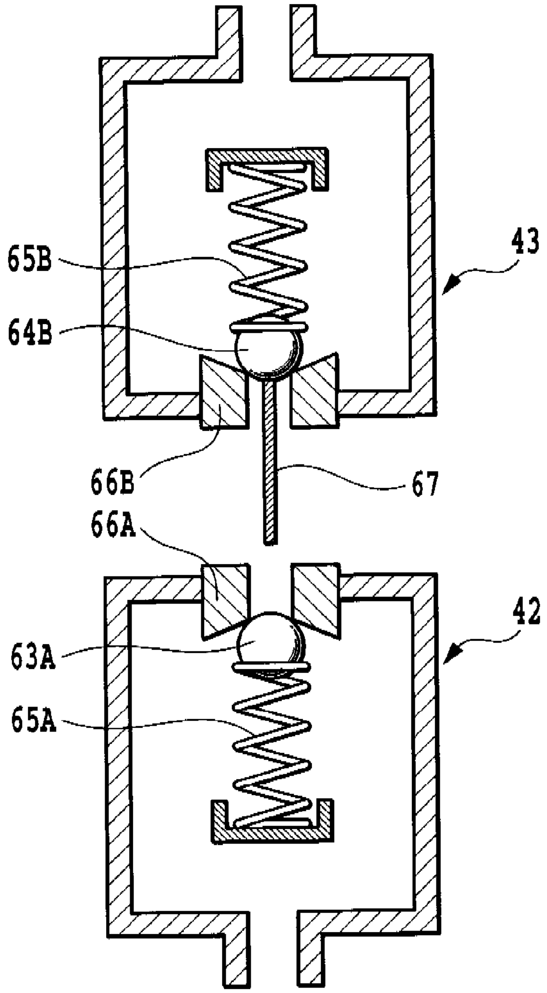
FIG. 14A is a schematic diagram showing an operation of a joint of FIG. 9.
Figure 14B:
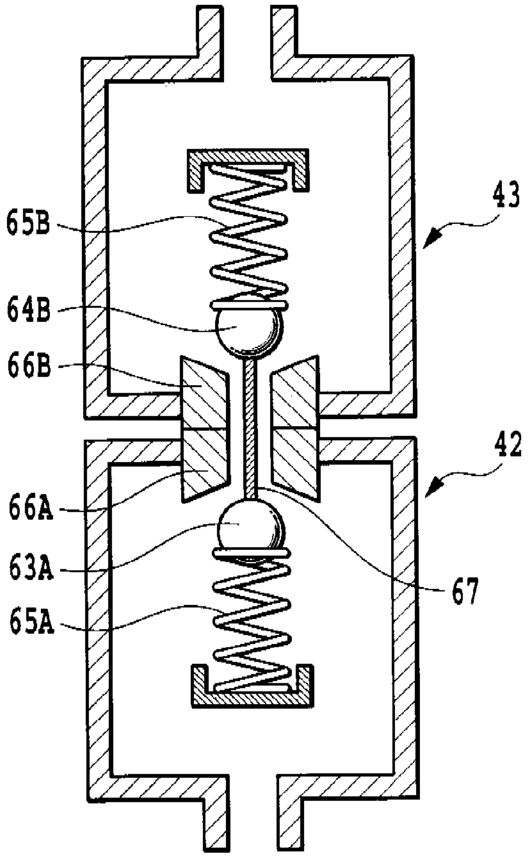
FIG. 14B is a schematic diagram showing the operation of the joint of FIG. 9.

The deaeration system 38 is connected to a subtank 40 (see FIG. 9) that contains an appropriate amount of ink to be consumed by the printing operation. The subtank 40 comprises a buffer member 41 defining a part of an ink accommodation space therein and capable of being displaced or deformed according to the ink volume accommodated, and a joint 42 to establish an ink connection, as necessary, with the ink tube 204 (see FIG. 2) connected to the main tank 203. When the ink in the subtank is running short, this joint 42 connects to a joint 43 fitted to the ink tube 204, as shown in FIG. 14B, to supply ink from the main tank 203 to the subtank 40, as needed.

The joints 42, 43 have at their opposing parts valve rubbers 66A, 66B each formed with a communication hole. When the joints 42, 43 are not connected, valve balls 63A, 64B urged by valve springs 65A, 65B close openings of the communication holes in the valve rubbers 66A, 66B, as shown in FIG. 14A. In this state the ink paths connected to the joints 42, 43 are isolated from outer air. When connecting the joints 42, 43, they are brought close together, as shown in FIG. 14B, to hold the valve rubbers 66A, 66B against each other, causing a ball lever 67 fitted to the valve ball 64B to push the valve ball 63A. As a result, the valve balls 63A, 64B part from the valve rubbers 66A, 66B bringing the ink paths connected to the joints 42 and 43 into communication with each other.

The joints 42, 43 may have any desired construction as long as they can close the openings to prevent ink leakage when not connected and establish a connection of ink paths, isolated from outer air.

In addition to the appropriate connection and disconnection of joints as described above to enable or disable the fluid communication, it is possible to have the ink supply paths themselves connected at all times and to establish the fluid communication in an on/off fashion by means of an open-close valve. What is required is that, when the ink volume required differs among the print modules depending on the contents of the divided image data, the ink supply operation in one print module does not interfere with that of another print module. In this respect, the independence of the individual print modules in this embodiment is assured.

Figure 15A:
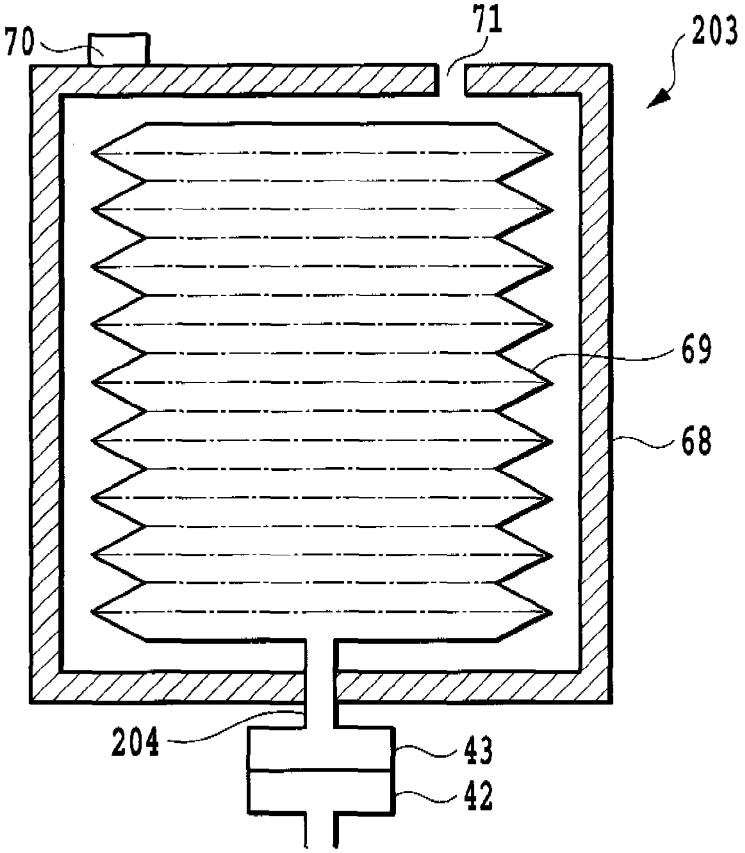
FIG. 15A is a schematic diagram showing an operation of a main ink tank of FIG. 2.
Figure 15B:
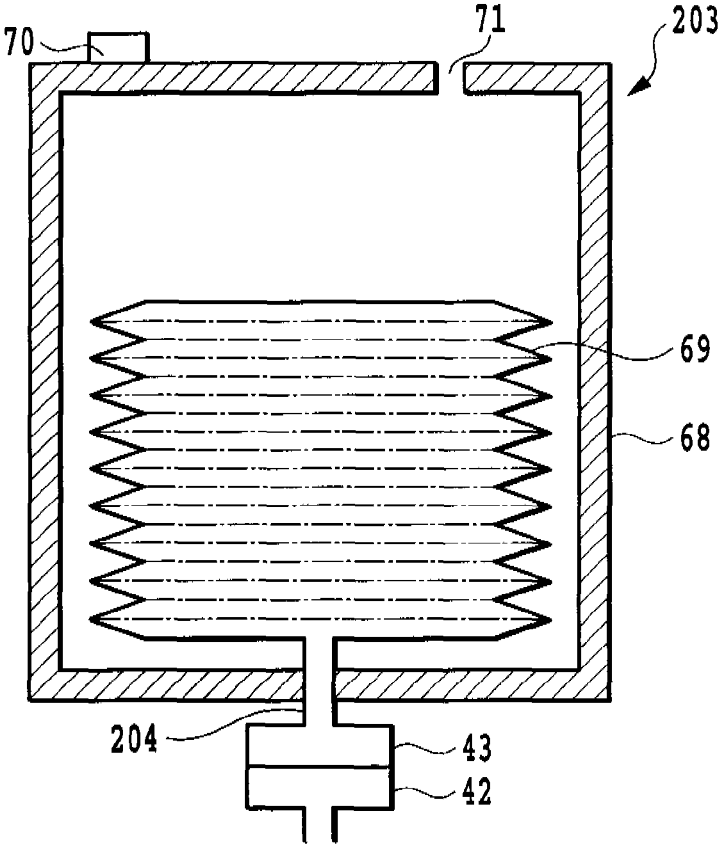
FIG. 15B is a schematic diagram showing the operation of the main ink tank of FIG. 2.

FIG. 15A and FIG. 15B illustrate an outline construction of an ink tank 203 (203Y, 203M, 203C, 203K) connected to the joint 43. The ink tank 203 of this example includes a resilient ink bag 69 and a tank housing accommodating the ink bag. The tank housing 68 is formed with an atmosphere communication hole 71 and attached with a memory device 70. The memory device 70 can store various information associated with the ink tank 203. For example, information such as a kind of ink accommodated, a remaining ink volume and a type of ink tank may be written into the memory device and read out for use, as required. The ink bag 69 is deformed, as shown in FIG. 15A and FIG. 15B, depending on the consumption of ink contained in the ink bag. Therefore, the ink in the ink bag 69 can be supplied in isolation from outer air.

The other end of the tube installed in the print head 811 is connected to the subtank 40 through the pump 48, as shown in FIG. 9. The operation of the pump 48 and the pump 36 described above can circulate ink among the subtank 40, the negative pressure chamber 30 and the print head 811.

The print module 116 has a recovery mechanism to maintain the ink ejection performance of the print heads 811 in normal state or recover their normal state, and as part of the recovery mechanism has a cap 44 to hermetically cap the print heads 811.

During the recovery operation by the recovery mechanism, the mechanical pump 36 is rotated forwardly with the pump 48 stopped (path: closed). This rapidly pressurizes the interior of the print head 811, forcibly discharging a relatively large amount of ink (ink not contributing to the printing of an image) from nozzles of the print head 811 in a short time. As a result, the nozzles recover their sound condition. The forcibly discharged ink is received in an ink receiver of the cap 44, from which it is quickly collected by the action of the already running pump 45 through the valve 47 into the subtank 40 for reuse. This is followed by the wiping of the nozzle arrays of the print head 811 with a wiper blade not shown and by the preliminary ejection of ink not contributing to the formation of an image. Now, the recovery operation of the print head 811 is complete.

The print modules 116 or print heads 811 have the above-described ink (supply) system and therefore can perform control under a variety of conditions separately from the image forming system and image forming device or independently of other print modules, and can also be installed or replaced independently.

Denoted 60 in FIG. 9 is a control circuit board which incorporates control system constitutional devices of FIG. 3 for each print module 116.

(Operation of Ink System)

An operation of the ink system will be described under different conditions of use of the print module 116.

Figure 16C:
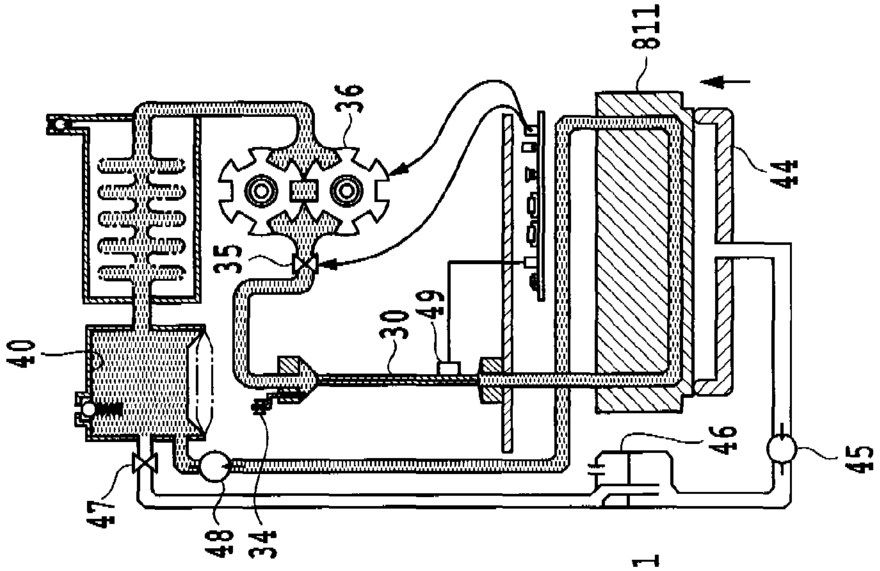
FIG. 16C is a schematic diagram showing the operation of the ink system of FIG. 9 at time of shipping.
Figure 16B:
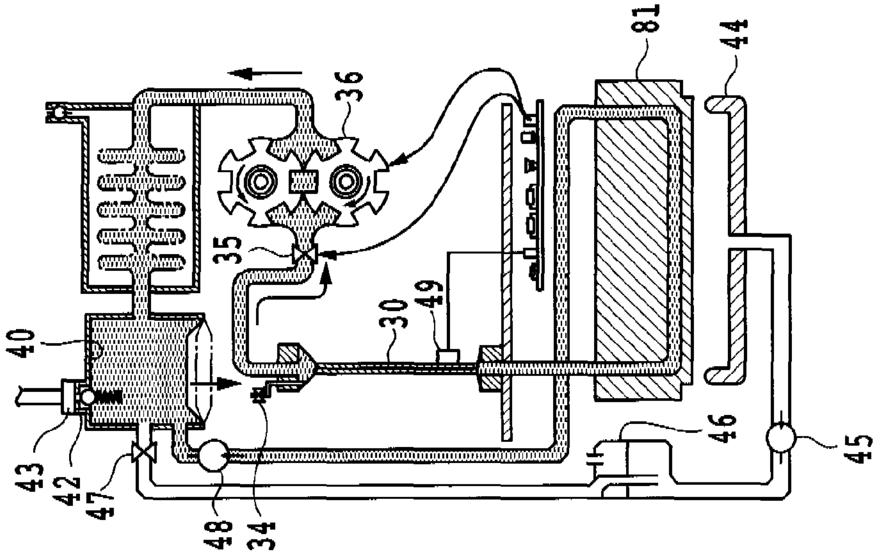
FIG. 16B is a schematic diagram showing the operation of the ink system of FIG. 9 at time of shipping.
Figure 16A:
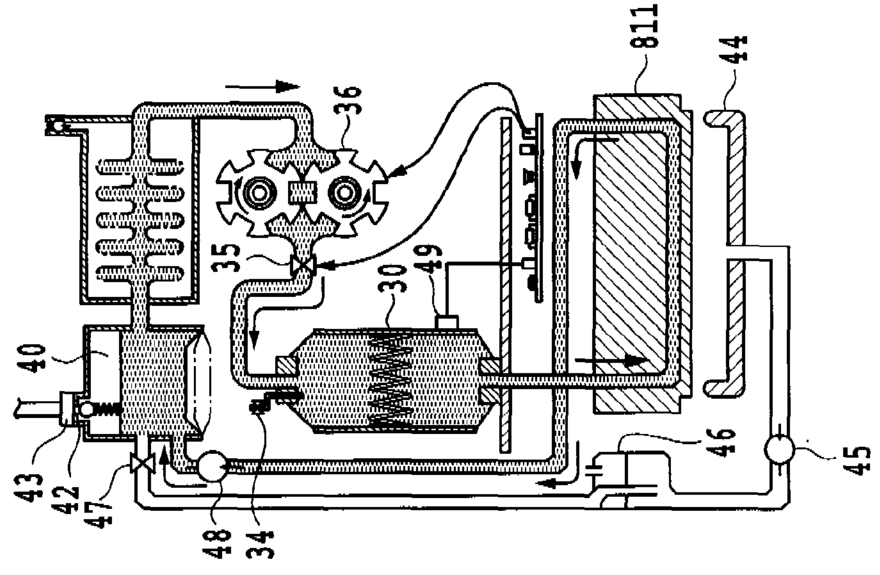
FIG. 16A is a schematic diagram showing an operation of the ink system of FIG. 9 at time of shipping.

Preparation for Shipping (See FIGS. 16A, 16B and 16C)

After the print modules 116 or print heads 811 have been manufactured, ink is poured into the tank 40 through the joint 42 as shown in FIG. 16A while at the same time operating the pumps 36, 48 and 45 to fill the ink system in the print module 116 with ink. At this time, air initially present in the ink system is exhausted from a vent opening of the deaeration system 38. Then, the print heads are subjected to a recovery operation which consists in forcibly discharging ink from the nozzles of the print head 811 into the cap 44, wiping the face of the print head with the wiper blade, and performing a preliminary ink ejection. After this, test printing operations and ageing are performed.

Next, considering the conditions to which the print modules will be subjected during transport, the amount of ink in the ink system in the print modules 116 are reduced. That is, the mechanical pump 36 is reversed, as shown in FIG. 16B, to move the ink in the ink system of the print module 116 back into the main tank 203 to reduce the amount of ink in the negative pressure chamber 30. Then, as shown in FIG. 16C, the cap 44 is held in intimate contact with the print head 811. The above procedure makes an ink leakage less likely even when the print modules 116 are subjected to environmental changes, particularly temperature rise and pressure drop, during transport.

As the ink to be filled into the ink system during the transport of the print modules 116, a liquid dedicated for transport use may be used as well as the ink used for the normal printing operation. The liquid dedicated for use during transport is a liquid generated by taking the environmental changes during transport and a prolonged transport period into account and may use a liquid obtained by removing coloring materials such as dye and pigment from the normal ink components. When such a transport-dedicated liquid is used, an additional process needs to be performed to replace the transport-dedicated liquid in the ink system with the normal ink before starting the printing operation.

Figures 17A, 17B, 17C:
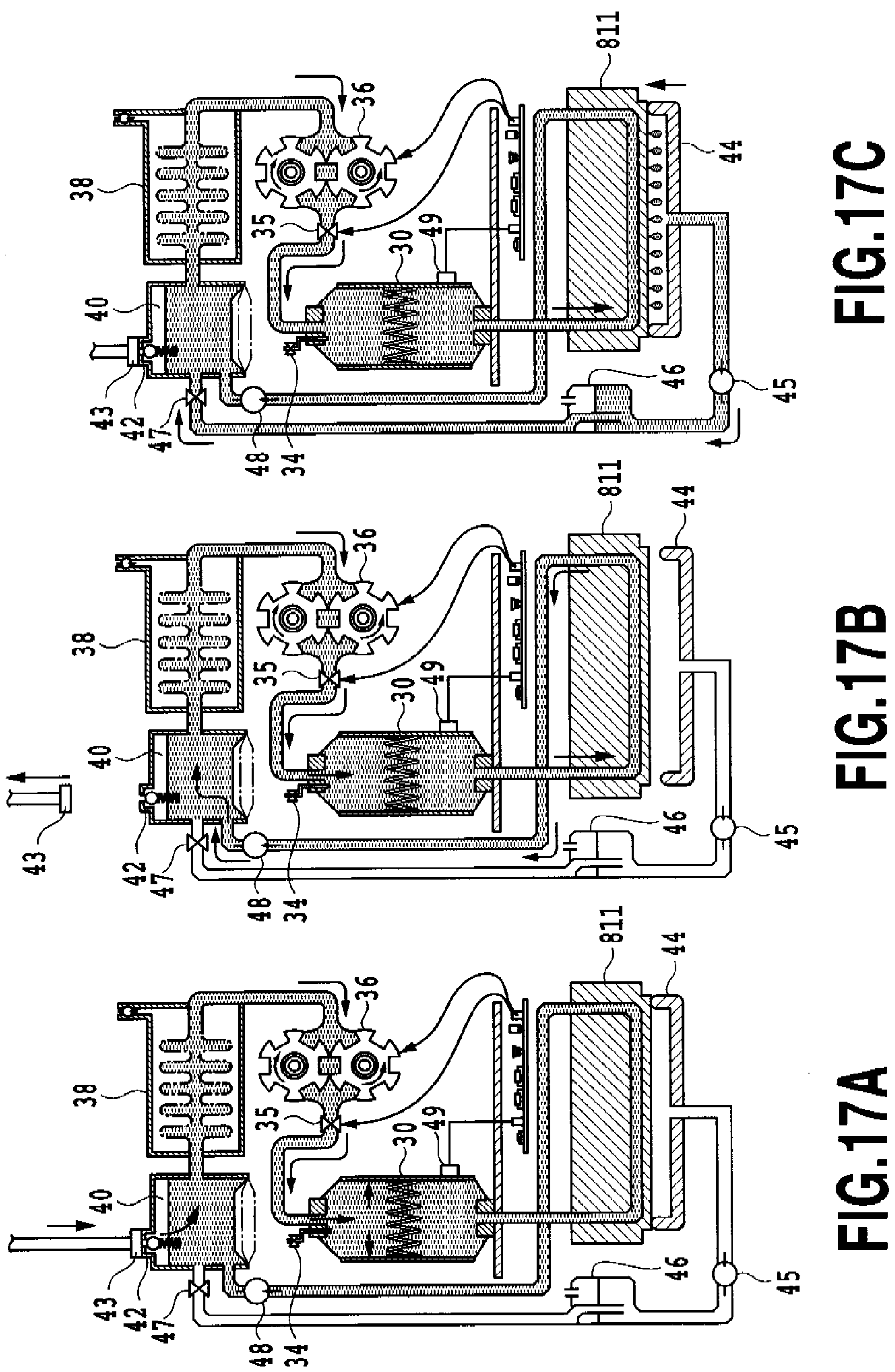
FIG. 17A is a schematic diagram showing an operation of the ink system of FIG. 9 when the apparatus begins to be used.
FIG. 17B is a schematic diagram showing the operation of the ink system of FIG. 9 when the apparatus begins to be used.
FIG. 17C is a schematic diagram showing the operation of the ink system of FIG. 9 when the apparatus begins to be used.

Preparation for Operation (See FIGS. 17A, 17B and 17C)

Before using the printing apparatus that was delivered and installed, the joint 42 is connected to the joint 43 on the main tank 203 side and the pump 36 is operated forwardly, as shown in FIG. 17A, to deliver ink into the negative pressure chamber 30. Then, to remove bubbles remaining in the path, the pumps 36 and 48 are operated, as shown in FIG. 17B, to circulate ink from the negative pressure chamber 30 through the print head 811, subtank 40 and deaeration system 38. This ink circulation is continued for an appropriate length of time, removing the air trapped in the path through the deaeration system to a level that poses almost no problem. Next, to discharge air remaining near the nozzles in the print head 811 and to restore the sound ejection performance, the mechanical pump 36 is operated forwardly with the pump 48 at rest (path: closed), as shown in FIG. 17C. This rapidly pressurizes the interior of the print head 811 through the negative pressure chamber 30, forcibly discharging a relatively large amount of ink from the nozzles of the print head 811 in a short duration of time. As a result, the nozzles are restored to the normal state. The forcibly discharged ink is received in an ink receiver of the cap 44, from which it is quickly collected by the action of the already running pump 45 through the valve 47 into the subtank 40 for reuse. This is followed by the wiping of the nozzle arrays of the print head 811 with a wiper blade not shown and by the preliminary ejection. Now, the recovery operation of the print head 811 is complete.

Figure 18A:
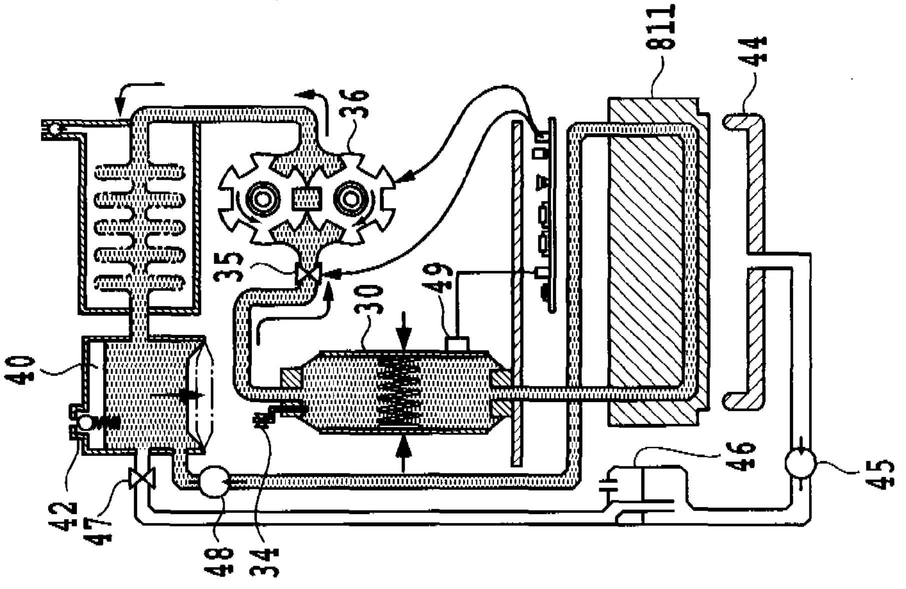
FIG. 18A is a schematic diagram showing an operation of the ink system of FIG. 9 during a standby for printing.
Figure 18B:
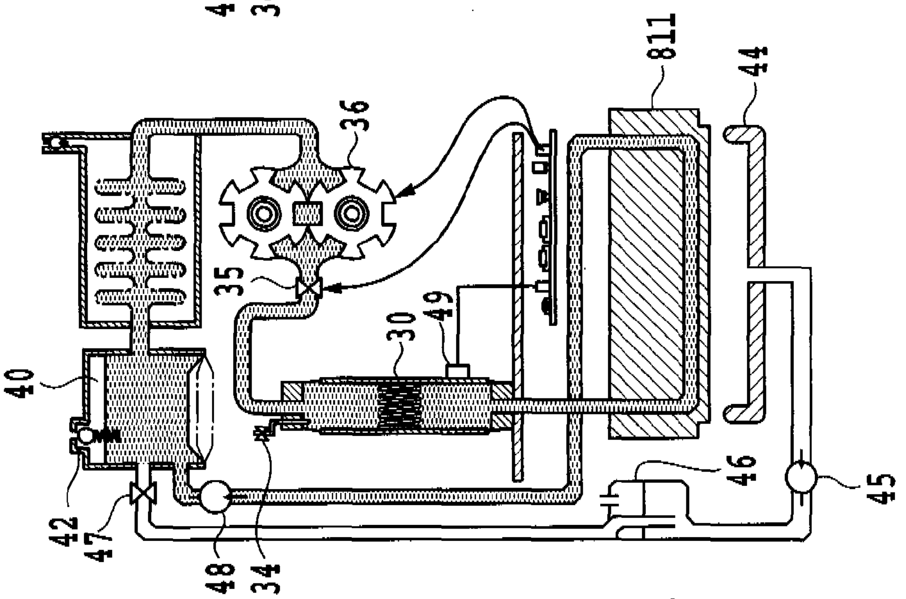
FIG. 18B is a schematic diagram showing the operation of the ink system of FIG. 9 during a standby for printing.
Figure 18C:
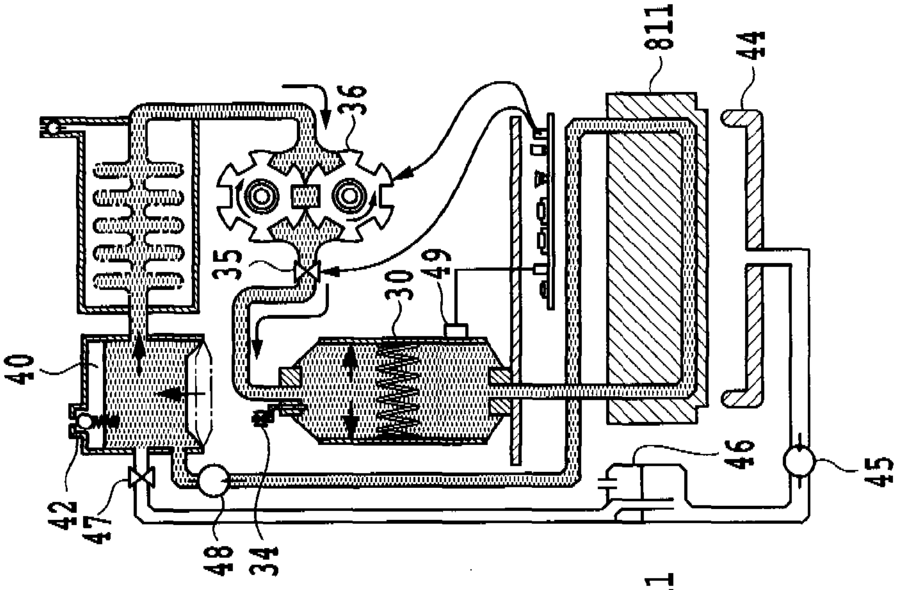
FIG. 18C is a schematic diagram showing the operation of the ink system of FIG. 9 during a standby for printing.

Standby for Printing Operation (See FIGS. 18A, 18B and 18C)

During a normal standby before the start of the printing operation, a relatively large negative pressure (about 20-150 mmAq below the atmospheric pressure) is applied to the ink in the print head 811 to maintain stability against environmental changes. That is, as shown in FIG. 18A, the pump 48 is stopped to limit the return of ink from the print head 811 to the subtank 40 and the pump 36 is reversed to return the ink in the negative pressure chamber 30 to the subtank 40. This increases the negative pressure applied to the ink in the print head 811. Then, as shown in FIG. 18B, with a greater negative pressure maintained, the apparatus waits for the start of the printing operation. The subtank 40 increases in volume in a direction of down arrow of FIG. 18A by an amount of ink returned from the negative pressure chamber 30.

If the ink system is left in the negative pressure state of FIG. 18B, however, the performance of ink supply (refill) to the print head 811 during the printing operation deteriorates making it difficult to drive the print head at high frequency. Thus, when a print signal is input (step S1041 of FIG. 5), the pump 36 is operated forwardly, as shown in FIG. 18C, to perform a preliminary ink supply. That is, the negative pressure chamber 30 is pressurized to control the negative pressure acting on the print head 811 toward the positive direction to reduce the negative pressure to an appropriate level for printing. The negative pressure in the negative pressure chamber 30 can be detected by the negative pressure sensor 49 or sensor 149 (see FIG. 11A). The subtank 40 decreases in volume in a direction of up arrow in FIG. 18C by an amount of ink delivered into the negative pressure chamber 30.

Figure 19C:
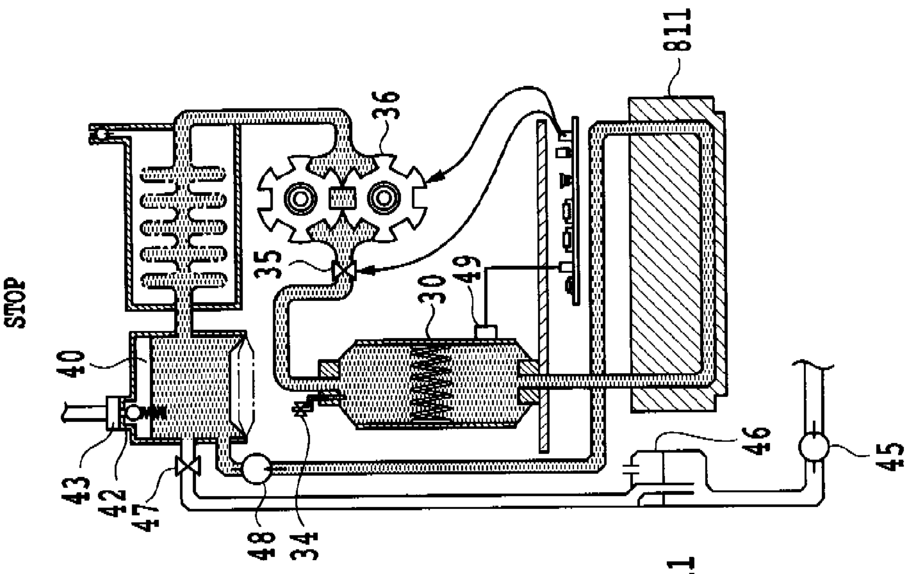
FIG. 19C is a schematic diagram showing the operation of the ink system of FIG. 9 during a printing operation.
Figure 19B:
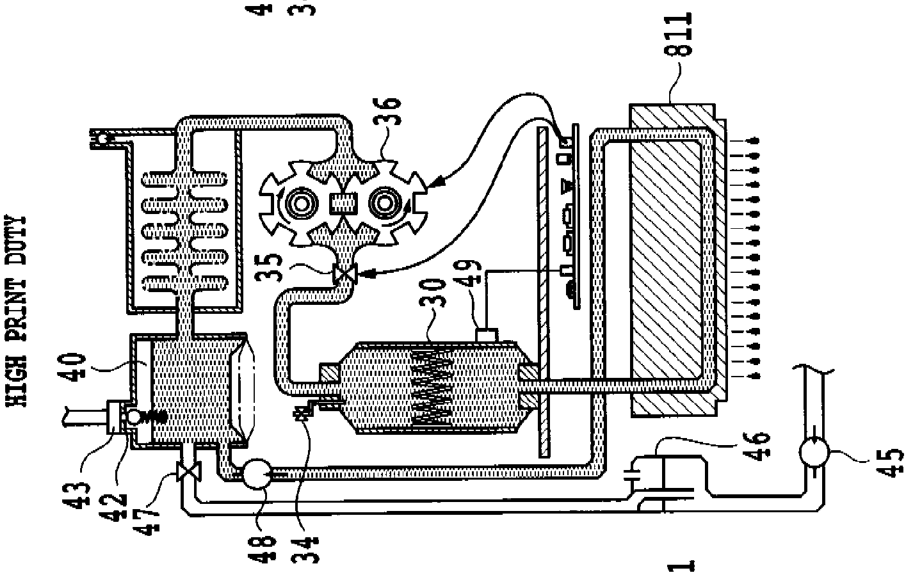
FIG. 19B is a schematic diagram showing the operation of the ink system of FIG. 9 during a printing operation.
Figure 19A:
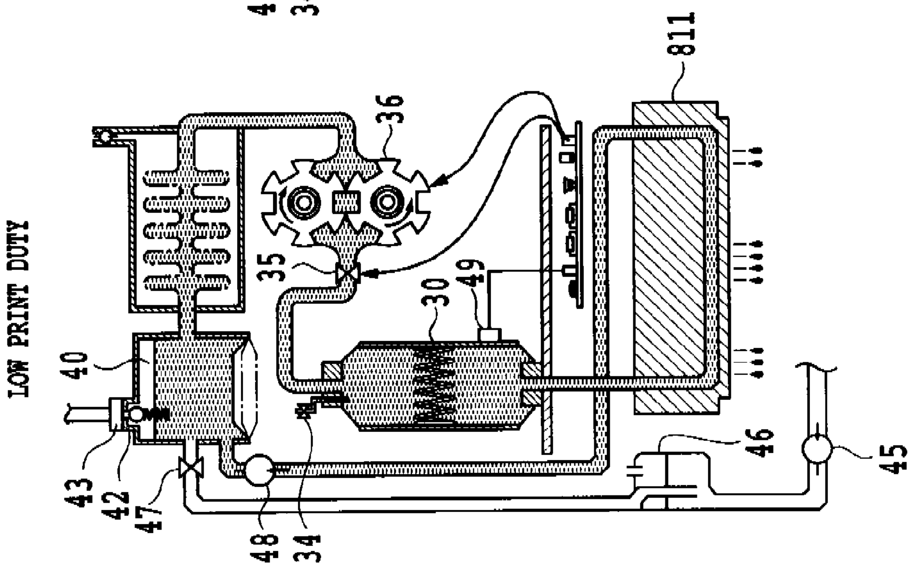
FIG. 19A is a schematic diagram showing an operation of the ink system of FIG. 9 during a printing operation.

Ink Supply Control During Printing (See FIGS. 19A, 19B and 19C)

By properly controlling the negative pressure adjust valve 35 and the mechanical pump 36, a highly uniform negative pressure can be maintained according to a print duty (print density) that corresponds to the content of image data to be printed by the print module 116 or print heads 811.

When, for example, the print duty is low, the pump 36 is operated forwardly at low speed, as shown in FIG. 19A, to supply ink while at the same time controlling the negative pressure adjust valve 35 to stabilize the negative pressure with high precision to optimize the ink supply. That is, by supplying a small amount of ink, the ink negative pressure in the print head is stabilized within an optimum range. Further, the open-close control or opening degree adjust control is performed on the negative pressure adjust valve 35 to further stabilize the negative pressure of ink.

In this case, the rate at which the flow path is open is relatively small and the opening degree is controlled within a relatively narrow range.

When the print duty (print density) is high, the pump 36 is operated forwardly at a higher speed, as shown in FIG. 19B, to increase the ink supply volume and at the same time the negative pressure adjust valve 35 is controlled to stabilize the negative pressure. In that case, the rate at which the flow path is open is relatively large and the opening degree is controlled within a relatively wide range.

When the printing operation is stopped, the negative pressure adjust valve 35 is closed instantly, as shown in FIG. 19C. This is intended to prevent an ink supply pressure caused by the ink inertia, that would occur when the printing operation is stopped, from acting on the negative pressure chamber 30 and the print head 811. Should the ink supply pressure be applied, the inner pressure in the print head rises, giving rise to a possibility of an ink leakage from the nozzles, which in turn will result in a degradation of print quality during subsequent printing operations.

The control of the negative pressure adjust valve 35 can be done by feeding back output signals of the negative pressure sensors 49, 149 (see FIG. 11A) of the negative pressure chamber 30. As described later, the negative pressure adjust valve 35 and the pump 36 can be controlled in connection with each other based on the print data.

Further, according to the ink volume consumed per unit time, i.e., the print duty, not only the amount of forward rotation and forward rotation speed of the pump 36 but its reverse rotation amount and reverse rotation speed can also be controlled. When the pump 36 is rotated forwardly, the negative pressure rise in the print head 811 can be suppressed by positively pressurizing the ink on the side of the print head 811 according to the ink consumption volume. When the pump 3 is reversed, on the other hand, the negative pressure reduction in the print head 811 can be minimized by positively reducing the pressure acting on the ink on the print head 811 side. Further, in connection with such a control of the pump 36, the negative pressure adjust valve 35 may be controlled to control the negative pressure in the print head 811 with high precision, further stabilizing its negative pressure.

With this embodiment, positively controlling the negative pressure of ink supplied to the print head can apply an appropriate, stable negative pressure to the print head whatever the print duty (print density). Therefore, in an industrial printing apparatus (printer) that prints an image on a large-size print medium at high speed, for example, this embodiment can control the negative pressure with good responsiveness even when the ink consumption volume per unit time varies greatly, minimizing variations in the negative pressure in the print head. In such an industrial printing apparatus, it is important to suppress negative pressure variations in the print head in order to meet the demand for a particularly high quality of printed image.

Figures 20A, 20B, 20C:
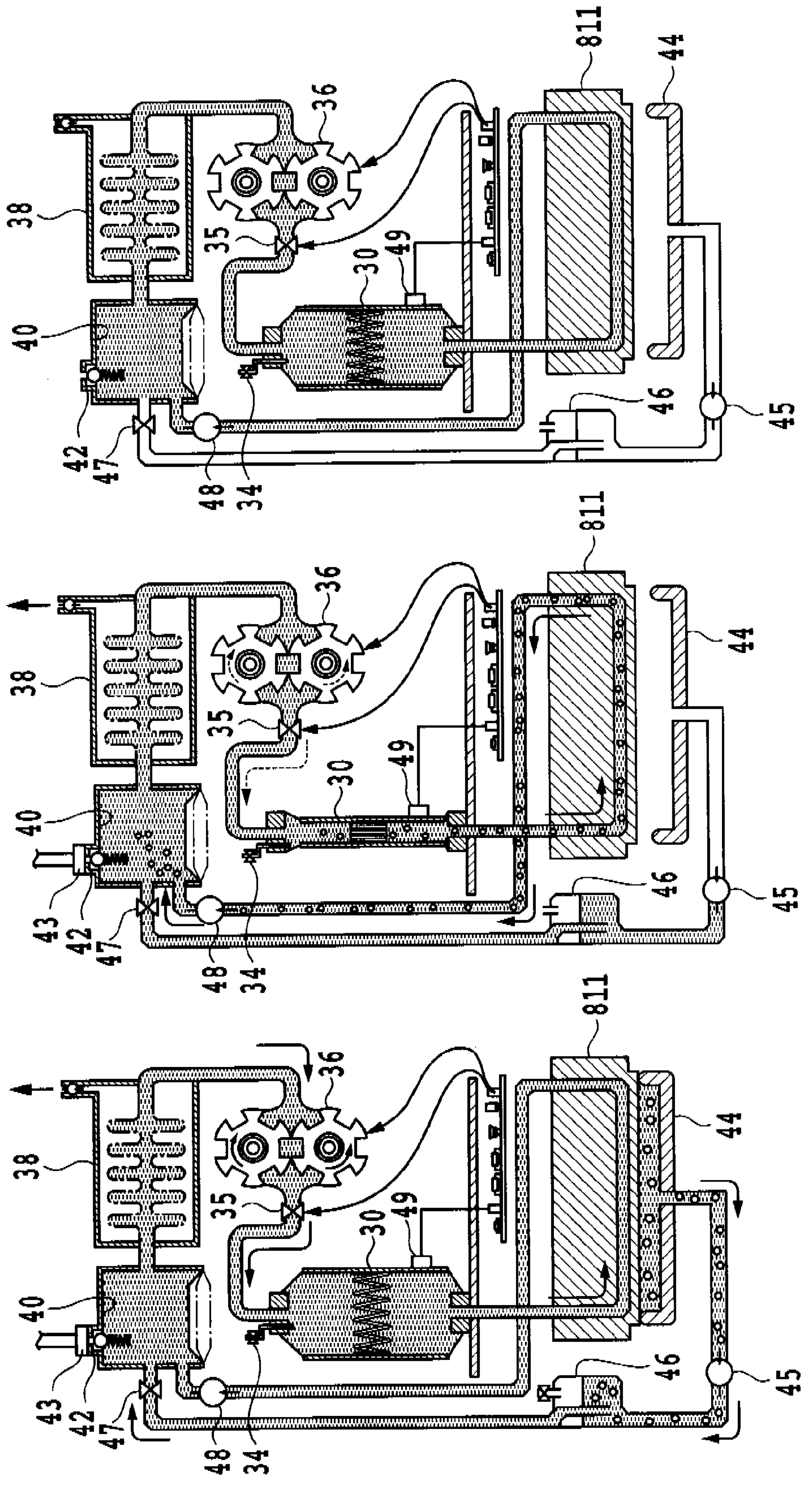
FIG. 20A is a schematic diagram showing an operation of the ink system of FIG. 9 during a maintenance operation.
FIG. 20B is a schematic diagram showing the operation of the ink system of FIG. 9 during a maintenance operation.
FIG. 20C is a schematic diagram showing the operation of the ink system of FIG. 9 during a maintenance operation.

Control During Recovery Operation (Maintenance) (See FIGS. 20A, 20B and 20C)

FIG. 20A shows a recovery operation that forcibly discharges ink not contributing to an image forming from the nozzles of the print head 811.

In this recovery operation, the mechanical pump 36 is operated forwardly with the pump 48 stopped (path: closed). This quickly pressurizes the interior of the print head 811 from the negative pressure chamber 30, forcibly discharging a relatively large amount of ink from the nozzles of the print head 811 in a short period of time. As a result, the nozzles are reinstated to a normal state. The forcibly discharged ink is received in an ink receiver of the cap 44, from which it is quickly collected by the action of the already running pump 45 through the valve 47 into the subtank 40 for reuse. This is followed by the wiping of the nozzle arrays of the print head 811 with a wiper blade not shown and by the preliminary ejection of ink. Now, the recovery operation of the print head 811 is complete.

FIG. 20B shows an operation to remove gas components dissolved in ink by means of the deaeration system 38.

In this operation the pump 36 is rotated forwardly at low speed to supply a small volume of ink from the deaeration system 38 into the negative pressure chamber 30 while at the same time the pump 48 is operated to return a greater amount of ink than is supplied by the pump 36 from the print head 811 to the tank 40. Thus, the amount of ink in the negative pressure chamber 30 decreases and, as the ink circulates through the deaeration system 38, it is removed of gas components dissolved therein.

FIG. 20C shows a standby state to which the ink system proceeds following the recovery operation.

In this standby state, with the interior of the negative pressure chamber 30 adjusted to a predetermined negative pressure, the valve 35 is closed and the pump 48 is stopped to maintain the adjusted negative pressure. At this time, the negative pressure in the negative pressure chamber 30 may be set at a lower negative pressure as during the standby state for the printing operation shown in FIG. 18A.

Figure 21B:
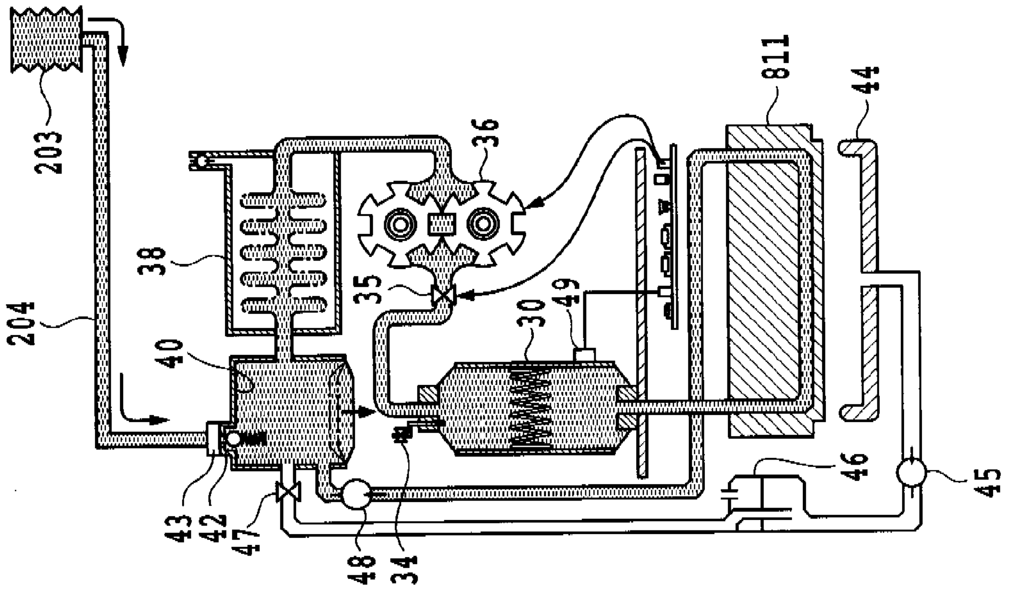
FIG. 21B is a schematic diagram showing the operation of the ink system of FIG. 9 when ink is supplied.
Figure 21A:
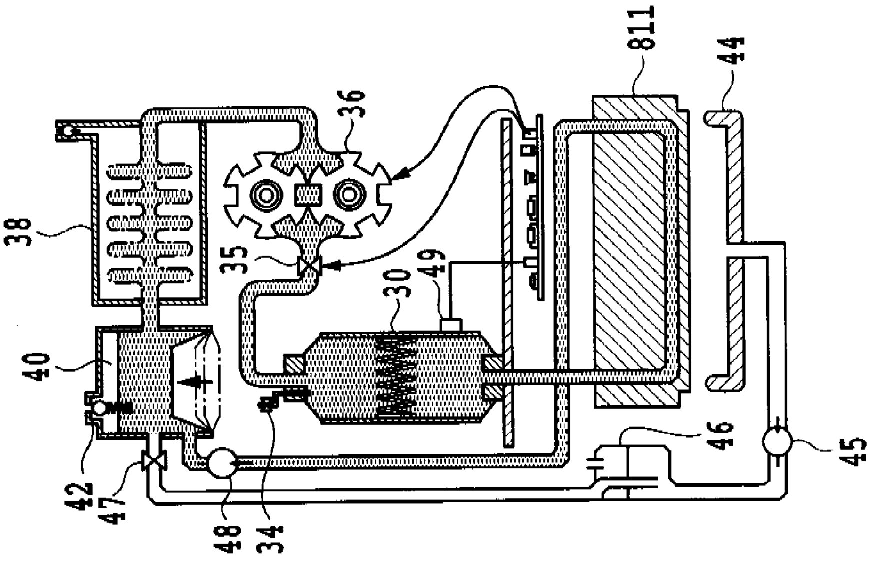
FIG. 21A is a schematic diagram showing an operation of the ink system of FIG. 9 when ink is supplied.

Ink Supply Operation (See FIGS. 21A and 21B)

FIG. 21A and FIG. 21B show an operation of supplying ink from the main ink tank 203 to the sub ink tank 40.

When the ink volume remaining in the subtank 40 decreases to less than a predetermined amount, as shown in FIG. 21A, the joints 42, 43 are connected to supply ink from the ink tank 203 into the ink tank 40. At this time the ink may be supplied by using a water head. As a result, the resilient member of the ink tank 40, that was deformed up as shown in FIG. 21A, is deformed down as shown in FIG. 21B as the ink is refilled.

(Summary of Control of Ink System)

Next, from the standpoint of print duty of the print head and the negative pressure applied to the print head, the operation of the ink system of this embodiment will be explained by referring to FIG. 22.

Figure 22:
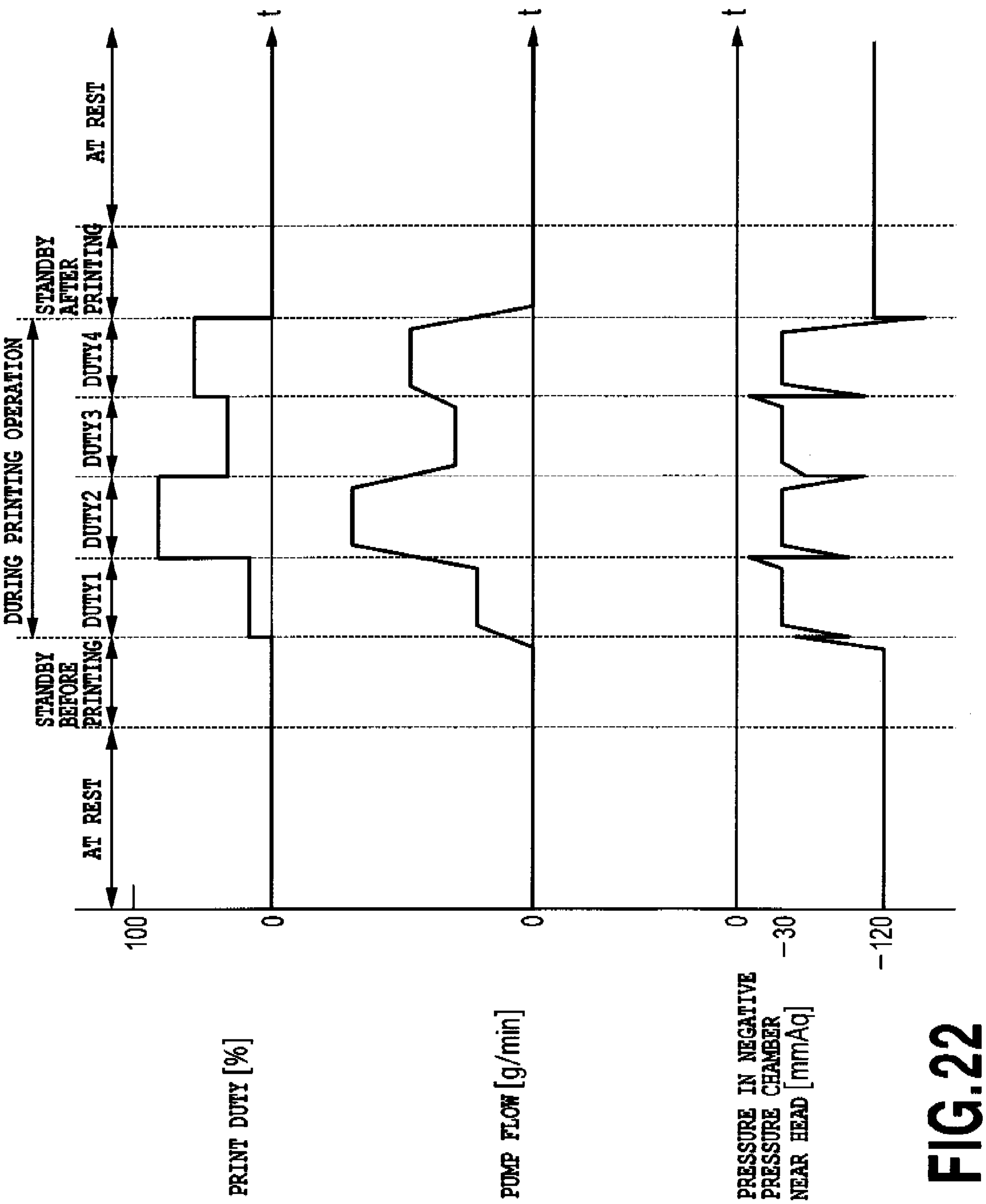
FIG. 22 is a timing chart showing an operation of the ink system of FIG. 9.

"Print duty" (print density) shown in the top tier of FIG. 22 is a print duty (print density) when the print module is in a printing state. An operation stage in the printing state may be divided into a rest stage during which printing is not performed, a pre-printing standby stage immediately before a printing operation, a printing stage, and a post-printing standby stage immediately after the printing operation during which time the print module waits for the next printing operation. During the printing stage, the amount of ink to be supplied varies depending on the print duty, namely the amount of ink consumed for printing. In this example, the print duty is divided into four stages, according to which the pump flow (ink volume delivered by the pump 36) is set as shown at the middle tier of FIG. 22. The print duty shown in the figure is only an example and of course changes according to the image data.

The negative pressure applied to the print head 811 is detected by the pressure sensor 49 (or 149) that is mounted to the negative pressure chamber 30 located close to the print head 811 and having almost the same negative pressure state as the print head. The detected negative pressure is shown at the lower tier of FIG. 22.

As described above, during the rest stage, a relatively large negative pressure (about −120 mmAq) is applied to the print head to make the ink system stable against environmental changes. During the pre-printing standby stage, the ink supply is started immediately before the start of the printing operation as shown at the middle tier of FIG. 22. Performing such a control immediately before starting the printing operation can secure a sufficient ink supply performance immediately after the start of the printing operation, enhancing the print quality.

Next, in "Duty1" during the printing stage, the negative pressure in the print head rises the moment the printing operation is started, so the pump flow is increased according to the detected value of the pressure sensor 49 to reduce the negative pressure in the print head to enhance the ink supply performance. Considering the negative pressure rise in the print head at the start of the printing operation, the pump 36 and the valve 35 may be controlled from just before the start of the printing operation to further stabilize the negative pressure in the print head. In that case, the amount of control and the control timing for the pump 36 and the valve 35 can be set according to the print duty determined from the print data.

In "Duty2" the print duty rises further, so the pump flow is further increased to minimize an increase in the negative pressure applied to the print head. This enables the ink supply to follow a high printing speed. When the print duty changes, the pump flow is controlled from a point in time before that change occurs, to further stabilize the negative pressure in the print head. In that case, the print duty before or after the change is determined from the print data and, based on the print duty, the control amount and the control timing for the pump 36 and the valve 35 can be set.

Similarly, in "Duty3" and "Duty4" the negative pressure of ink supplied to the print head is positively controlled according to the respective print duties and the detected value of the pressure sensor 49 to stabilize the negative pressure in the print head at an optimum level at all times. As a result, the responsiveness and stability of the ink supply are enhanced, allowing a high quality image to be printed regardless of the magnitude of the print duty.

If, immediately after the printing operation is ended, the negative pressure in the print head tends to decrease due to the ink inertia, it is desired that the pump flow be controlled from just before the end of the printing operation so as to cancel the negative pressure reduction. This can further stabilize the negative pressure in the print head. Further, by closing the valve 35 immediately after the printing operation, the reduction in the negative pressure in the print head can be minimized.

After the printing operation, a relatively large negative pressure is applied again to the print head to maintain the stability against environmental changes. That is, by increasing the negative pressure in the print head, an ink leakage can be prevented which would otherwise occur from the nozzles of the print head when there are environmental changes, such as temperature changes, thereby improving the reliability of the printing apparatus.

Here, the control of the pump motor 508 using an output of the pressure sensor 49 as a feedback signal will be explained by referring to FIG. 23, FIG. 24A and FIG. 24B.

Figure 23:
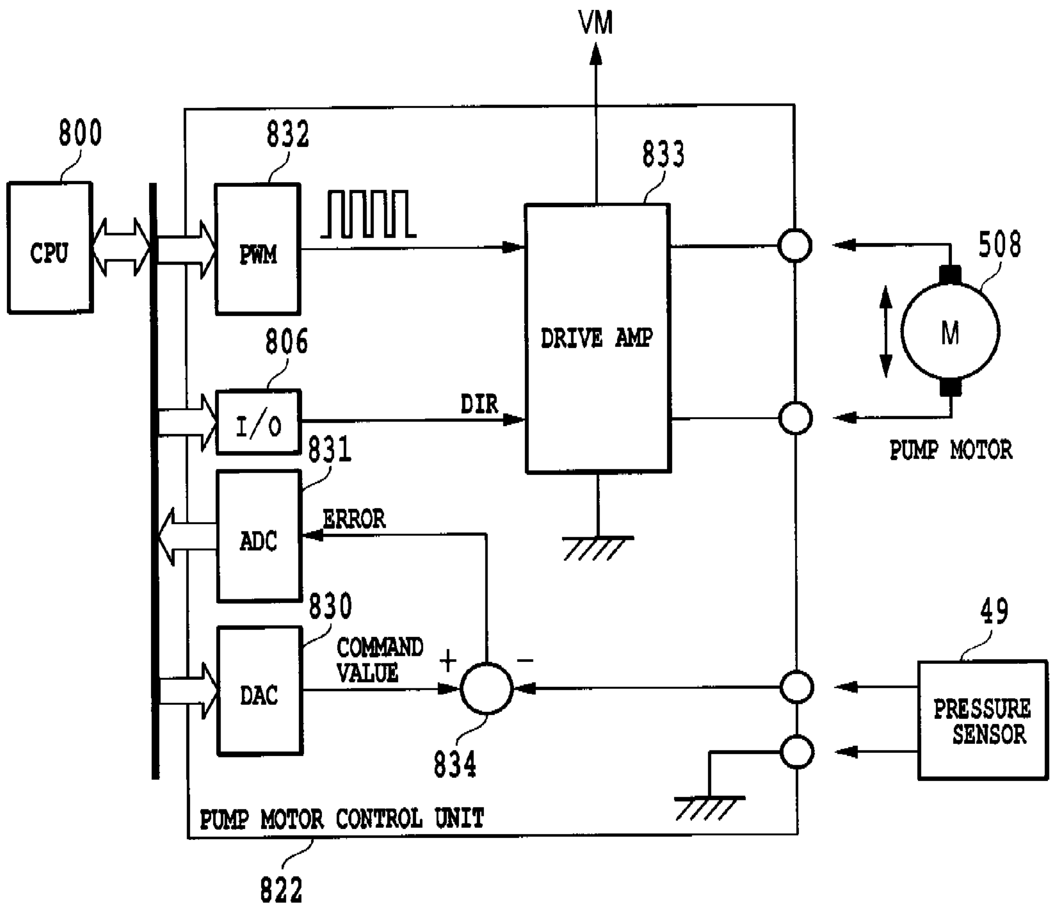
FIG. 23 is a diagram showing electrical blocks involved in a negative pressure control using a pressure sensor output and a pump control using a PWM chopper in the embodiment of this invention.

FIG. 23 is a block diagram of the pressure control system showing details inside the pump motor controller 822 explained with reference to the block diagram of FIG. 3 of the print module. The pump motor controller 822 feeds back the output of the pressure sensor 49 to control the pump motor 508 which is a servo motor.

When the printing operation is started, the CPU 800 writes a digital value representing a small negative pressure (e.g., about −10 mmAq) into a DA converter 830 which in turn supplies an analog demand value corresponding to the negative pressure to a (+) input of a subtractor 834. The output of the pressure sensor 49 installed near the print head 811 is fed to a (−) input of the subtractor 834 and a difference signal (Error) is fed to an AD converter 831, whose converted digital value is read by the CPU 800. The CPU 800, according to the error signal including a polarity, outputs a signal (DIR) specifying a rotation direction of the mechanical pump 36 to a drive AMP 833 that controls the pump motor 508 of the mechanical pump 36 and also sets a PWM (Pulse Width Modulation) value representing a drive duty of the drive AMP 833 in a PWM circuit 832.

Figure 24A:
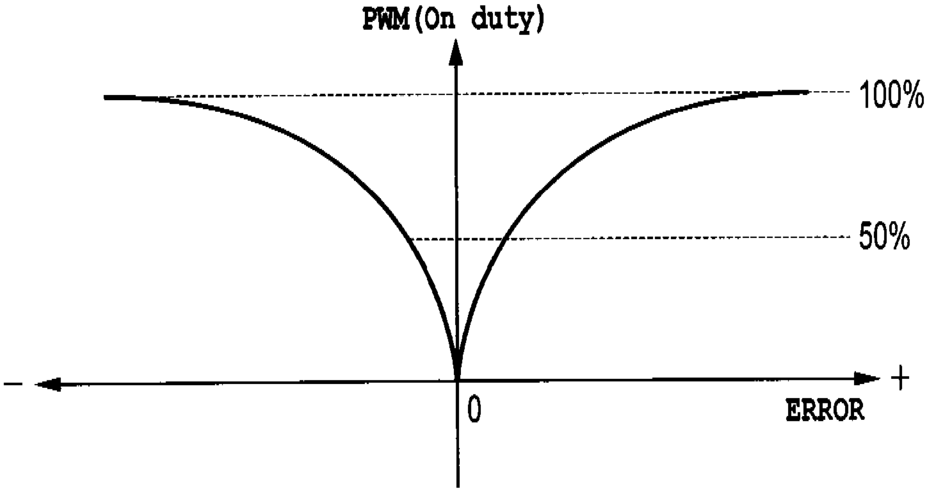
FIG. 24A is a conversion table representing a relation between an AD converter reading and a PWM value in the embodiment of this invention.
Figure 24B:
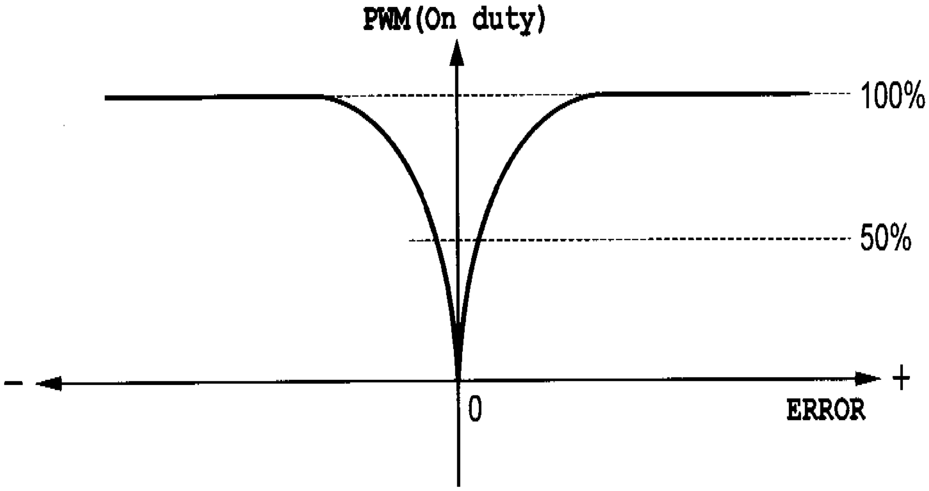
FIG. 24B is a conversion table representing the relation between an AD converter reading and a PWM value in the embodiment of this invention.

A conversion table between the reading of the AD converter 831 and the PWM value is shown in FIG. 24A.

When the difference signal (Error) has a (+) polarity, the rotation direction signal (DIR) is set through an output port (I/O) 806 to a value (e.g., "1") representing a forward rotation (in a direction that pressurizes the interior of the print head 811). If the difference signal (Error) is of a (−) polarity, the rotation direction signal (DIR) is set to a value (e.g., "0") representing a reverse rotation (in a direction that reduces the inner pressure of the print head 811).

When the absolute value of the difference signal (Error), the output of the subtractor 834, is large, the drive duty of the drive AMP 833 that drives the pump motor 508 is increased to quickly establish the desired pressure. When on the other hand the absolute value of the difference signal (Error) is small, the drive duty of the drive AMP 833 is lowered to suppress pressure overshoot and undershoot.

If the valve 35 is used as an auxiliary control means though not shown in the figure, a light valve capable of high-speed response is preferably selected.

During printing, the negative pressure command value set in the subtractor 834 is not necessarily a constant value. The CPU 800 reads the content of the VRAM 801 to estimate a print duty from the number of pixels to be printed. If the print duty exceeds a predetermined value and a fall in the negative pressure in the print head 811 is expected, a high pressure command value for a point in time immediately before the negative pressure fall may be set in the DA converter 830 in advance.

By using a feedforward control in combination as described above, the stability of printing operation of the print head 811 is improved significantly. In this case, because the negative pressure may fall due to a control delay, it is possible to provide a separate PWM value conversion table with a high gain (AMP gain) for the pressure difference (Error), as shown in FIG. 24B. The PWM value conversion tables shown in FIG. 24A and FIG. 24B are stored in the ROM 803 in advance.

Figure 25A:
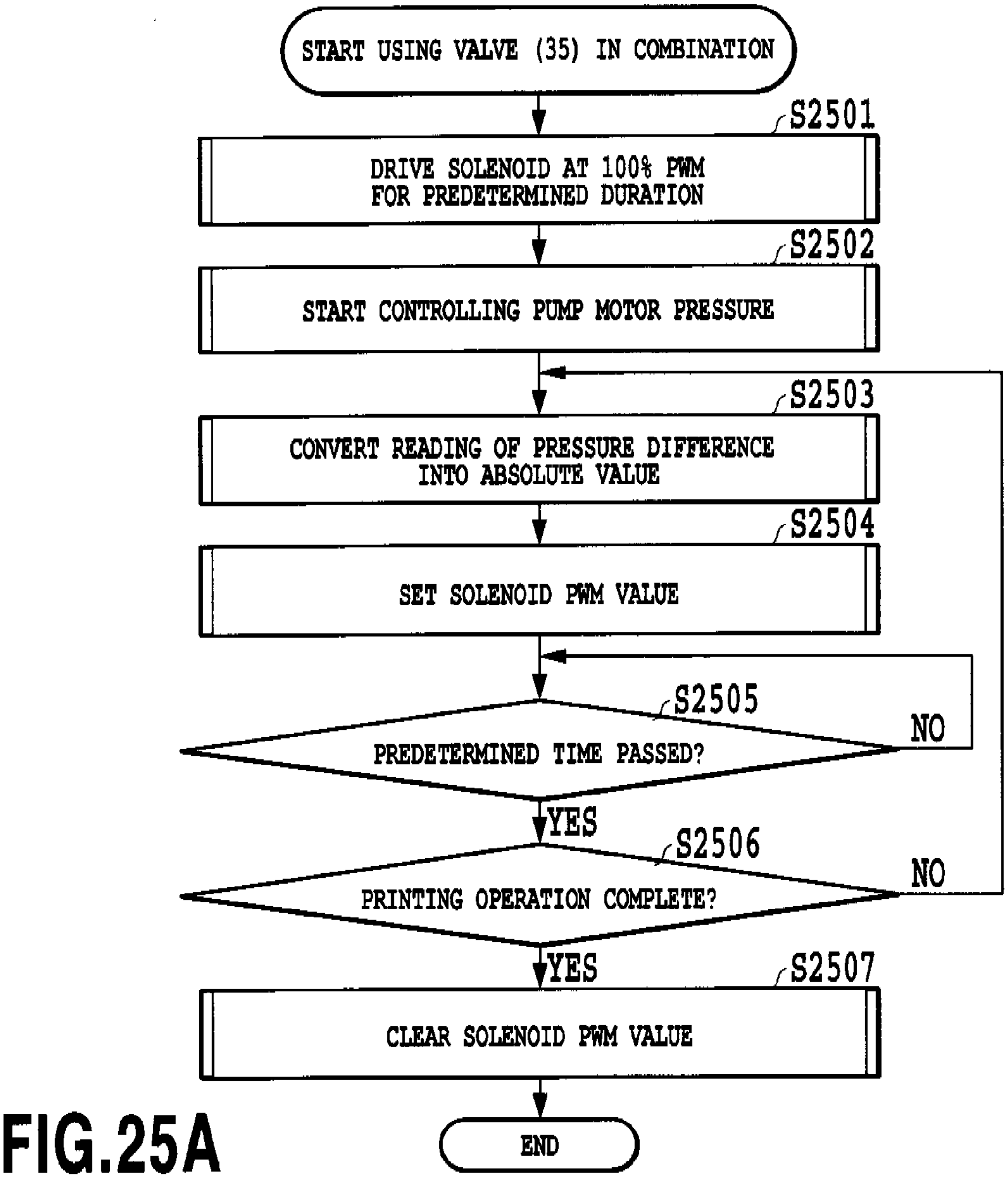
FIG. 25A is a pressure control flow chart when a valve is used in combination in the embodiment of this invention.

Further, other than the method using the adjustment of the gain (AMP gain) for the pressure difference (Error), a pressure control method involving the parallel control of the valve 35 may be performed. The operation flow of CPU 800 using this method will be explained by referring to FIG. 25A. In the normal state (solenoid: off), the valve 35 is open as shown in FIG. 12A. First, for a predetermined duration the PWM value of the PWM circuit 823 for driving the solenoid 821 (see FIG. 3) is set to 100% and the plunger of the solenoid 821 is started to move (step S2501). Then, the servo control of the pump motor 820 is also started. From this point forward, the pump motor controller 822 performs the feedback control intermittently according to the preset pressure value in the DA converter 830 (see FIG. 23) (step S2502). At this point, the pump motor controller 822 may already be executing the control.

Figure 25B:
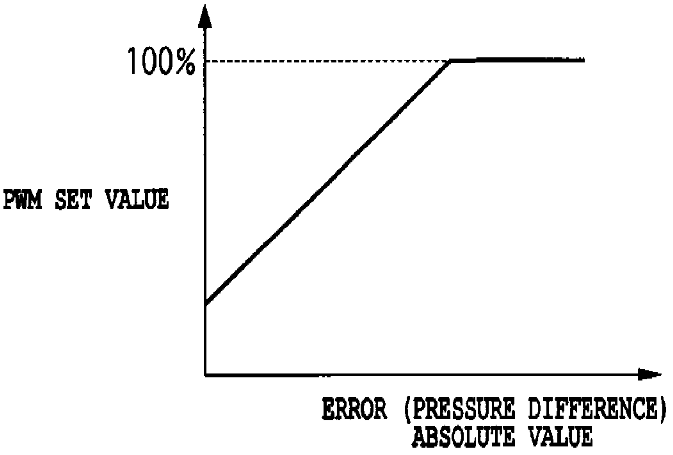
FIG. 25B is a PWM value conversion table for driving a solenoid that operates the valve.

Next, the CPU 800 reads the output of the pressure sensor 49 and converts it into an absolute value (step S2503). Based on the absolute value of the converted pressure difference, the CPU 800 reads a drive PWM value of the solenoid 821 from the conversion table of FIG. 25B and sets it in the PWM circuit 823 (step S2504). If the pressure difference is large, the valve 35 comes close to an open state. If the pressure difference decreases, the valve 35 approaches a closed state. That is, as in the example that was already explained by referring to FIG. 24A and FIG. 24B, the similar effect to that of the gain adjustment of the drive AMP 833 can be realized by the control of the valve 35. That is, when the pressure difference is large, the valve 35 is controlled to approach the set value quickly; and as the pressure difference decreases, it is controlled to prevent an overshoot or undershoot from the predetermined pressure.

The above processing is continually repeated every predetermined period (step S2505). When the printing operation is completed (step S2506), the drive PWM value of the solenoid 821 is cleared to zero (step S2507) before ending the processing.

[Second Embodiment]

FIG. 26 through FIG. 36 shows a second embodiment of this invention, and components identical with those of the preceding embodiment are given like reference numbers and their explanations are omitted.

This embodiment concerns an example case in which an apparatus of this invention is incorporated in the image forming system of FIG. 1 and FIG. 2. Thus, the outline of the image forming system in this embodiment is similar to that of the preceding embodiment.

(Control System in Print Module)

Figure 26:
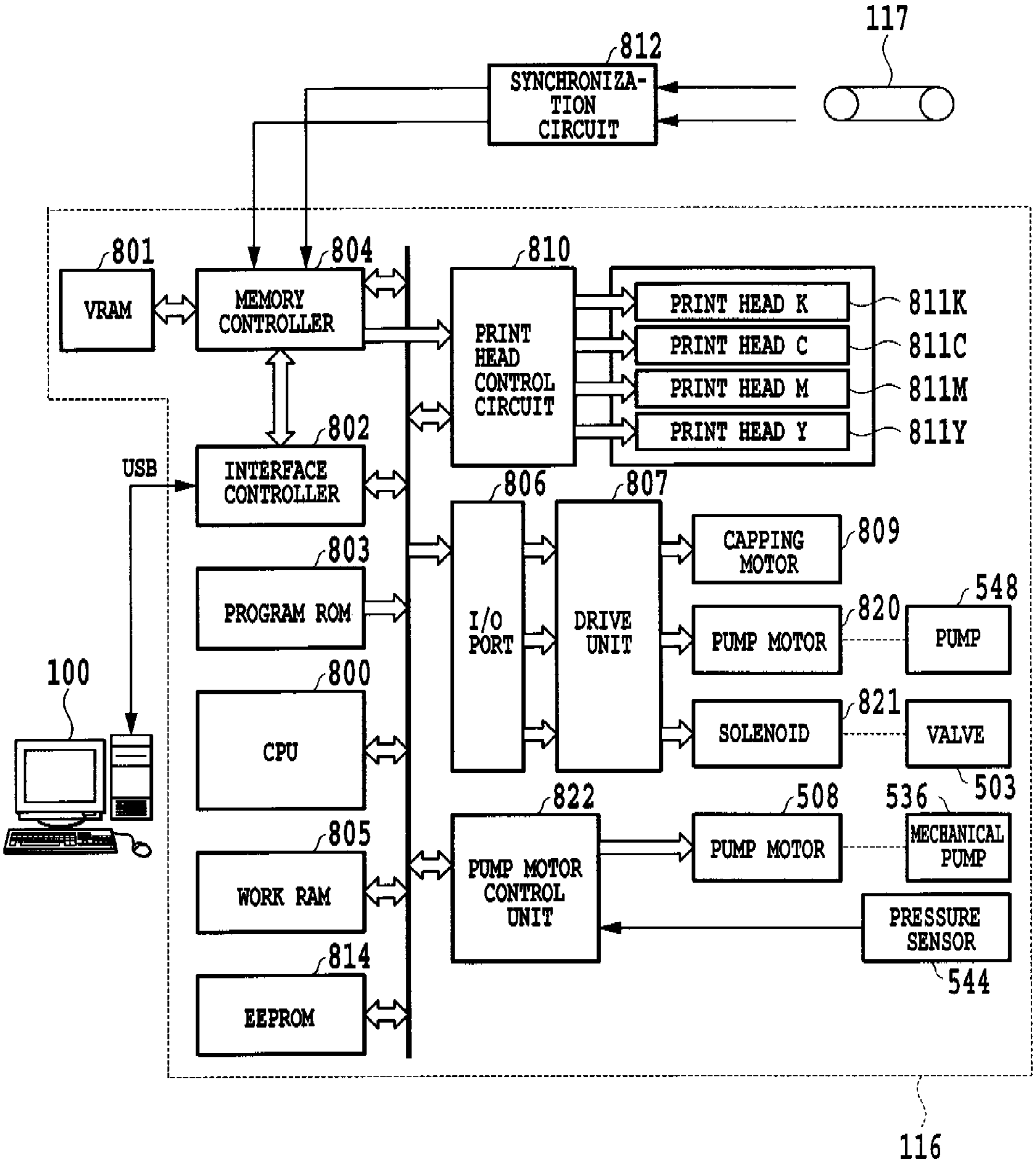
FIG. 26 is a block diagram showing a control system of a printing apparatus in a second embodiment of this invention.

FIG. 26 shows an example configuration of the control system in each print module 116. Components similar to those of the preceding embodiment are assigned like reference numbers and their explanations are omitted.

The pump motor 820 in this example is capable of forward and reverse rotation and drives a pump 548 (see FIG. 27) described later which is built into one end of the ink path of the print head 811 (811Y, 811M, 811C and 811K). The solenoid 821 in this example is an actuator to open and close a valve 503 (see FIG. 27) interposed between the print head 811 and the subtank described later.

The pump motor 508 is a servo motor capable of forward and reverse rotation and which drives the pump 536 (see FIG. 27) interposed between the print head 811 and the subtank described later. The pump motor 508 is servo-controlled by the pump motor controller 822 which is given a feedback of an output of a pressure sensor 544 that detects the pressure in the print head 811.

A set of pump motors 820, 508, valve control solenoid 821 and pressure sensor 544 is provided independently for each of the print heads 811Y, 811M, 811C and 811K dedicated for different ink colors. The print heads 811Y, 811M, 811C and 811K can be moved vertically by the print head U/D motor not shown and are airtightly capped at the capping position while they are standing by except during the printing operation.

The medium transport device 117 in this embodiment is constructed in the same way as in FIG. 2 and its control system is constructed in the same way as in FIG. 4. Therefore, the construction of the medium transport device and its control system in this embodiment are similar to those of the preceding embodiment. The signal system and ink system for the image forming system and the printer composite system in this embodiment are similar to those shown in FIG. 5, FIG. 6 and FIG. 7. Therefore, the outline operation of the image forming system, the signal system to the printer composite system and the outline of the ink system in this embodiment are similar to those of the preceding embodiment.

(Example Construction of Ink System)

Figure 27:
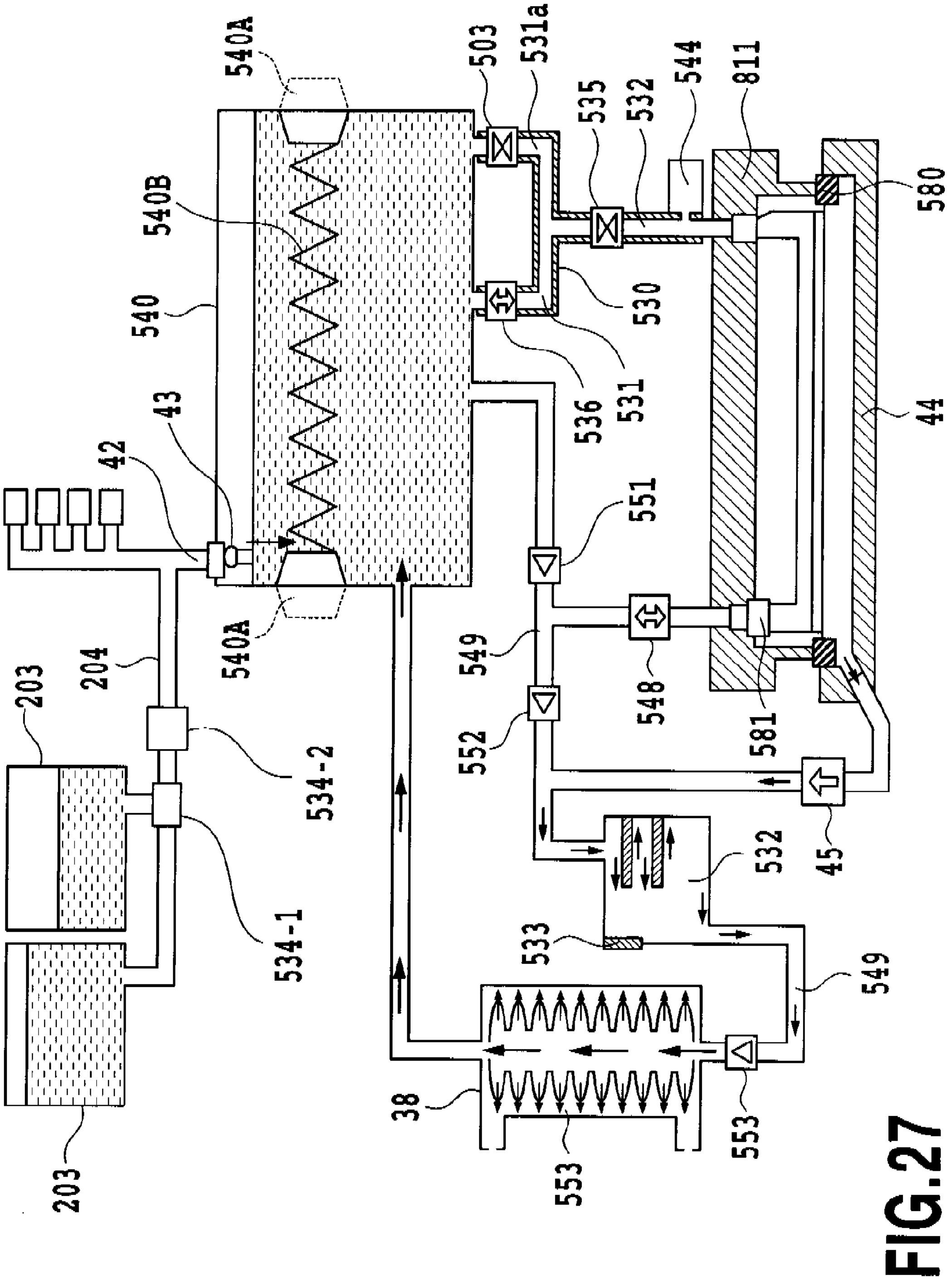
FIG. 27 is a schematic diagram showing an ink system for one print head in the printing apparatus of FIG. 26.

The positional relation among the essential parts of the ink system for one print head is the same as that of FIG. 8 in the preceding embodiment. FIG. 27 shows an example inner construction of the ink system for one print head. The print head 811 is connected with two ink tubes, one of which forms an ink supply path 530 that supplies ink to the print head and maintains and controls a preferable negative pressure. The other ink tube constitutes an ink path 550 that is connected to the ink supply unit (also referred to as a subtank) 540 for each print head 811 through a pump 548 and a one-way valve 551.

The print head 811 used in this embodiment is constructed, for example, in the same way as in FIG. 10.

Figure 28:
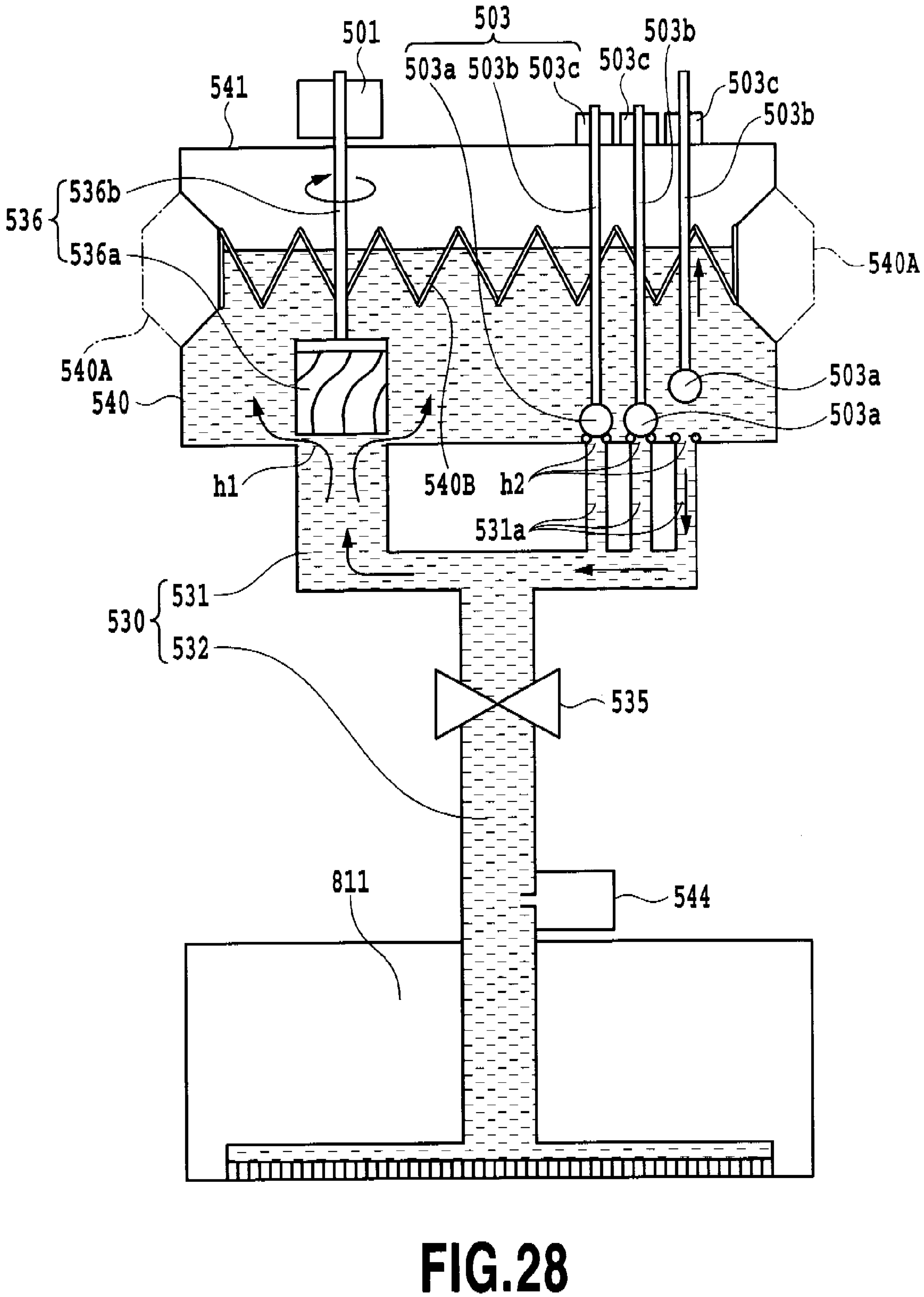
FIG. 28 is a schematic diagram showing an ink supply path connecting the print head and the ink tank of FIG. 27.
Figure 29:
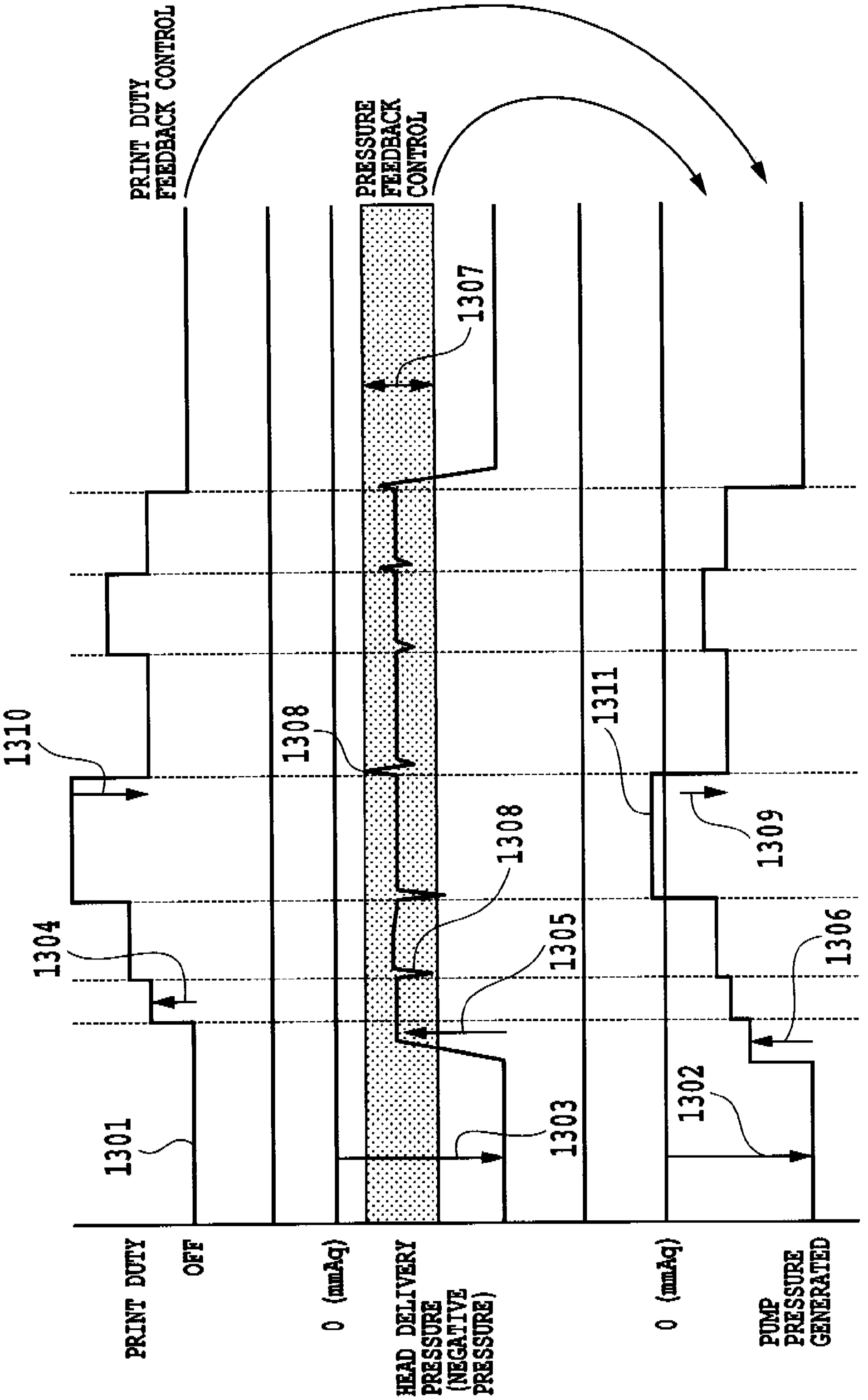
FIG. 29 is a time chart showing an operation of the ink system of FIG. 27.

FIG. 28 shows the construction of the ink supply path 530 connecting the print head 811 to the ink tank, and of a negative pressure generation means provided to the ink supply path 530. In FIG. 28, the ink supply path 530 comprises a circulation path 531 whose ends communicate with two different locations at the bottom of the subtank 540 and a connecting path 532 connecting the print head 811 to a middle part of the circulation path 531. In the connecting path 532 there is provided a pressure adjust valve 535 that permits and interrupts an ink flow.

In the subtank 540 is installed a pressure adjust pump 536 to circulate ink through the circulation path 531. The pressure adjust pump 536 in this example is an axial flow pump and comprises a rotating shaft 536b rotated forwardly or backwardly by a motor 501 mounted on the top surface of the subtank 540 and an impeller 536a secured to the rotating shaft 536b. The impeller 536a is installed near an opening h1 of the subtank 540 that communicates with one end of the circulation path 531. The impeller 536*a* rotates forwardly to draw ink from the circulation path 531 through the opening h1 into the subtank 540 to circulate the ink in the direction of arrow in the figure. The impeller 536*a* rotates backwardly to deliver ink from the subtank 540 through the opening h1 into the circulation path 531.

At the other end of the circulation path 531 is installed a flow adjust valve (flow resistance adjust means) 503 to adjust the ink volume that flows between the subtank 540 and the circulation path 531. In this example, the second end of the circulation path 531 branches into three divided paths 531*a*. A total of three openings h2 of the subtank 540 that communicate with the branched paths 531*a* are opened and closed by ball valve discs 503*a* as they advance and retract to and from the openings. The advancing and retracting operation of the ball valve discs 503*a* is performed by solenoids 503*c* that move shafts 503*b* of the valve discs 503*a* back and forth. By selectively opening and closing the three openings h2 by the valve discs 503*a*, an overall area of the openings h2 of the subtank 540 communicating with the second end of the circulation path 531 can be changed stepwise (in this example, in three steps) Changing the area of the openings h2 can adjust the ink flow resistance between the circulation path 531 and the subtank 540. In this embodiment, the ink flow control means comprises the pressure adjust pump 536, the flow adjust valve 503 and the CPU 800 as a controller that controls them.

Then, the impeller 536*a* is rotated forwardly by the motor 501 to cause the ink to flow in the circulation path 531 in the direction of arrow to generate a negative pressure in the connecting path 532. The magnitude of the negative pressure corresponds to the ink flow velocity running in the circulation path 531 in the direction of arrow and increases as the flow velocity increases. This negative pressure is applied to the print head 811. Therefore, the negative pressure applied to the print head 811 can be controlled by adjusting the ink flow speed in the circulation path 531 by performing at least one, or preferably both, of the control of the forward rotation speed of the pressure adjust pump 536 and the control of the area of the openings h2 by the flow adjust valve 503. The higher the forward rotation speed of the pressure adjust pump 536 and the smaller the area of the openings h2, the greater the negative pressure generated will become.

When the impeller 536*a* is reversed by the motor 501, an ink flow in a direction opposite the arrow is produced in the circulation path 531, generating a positive pressure in the connecting path 532. As described later, in controlling the negative pressure applied to the print head 811, such a forward and backward rotation control of the pressure adjust pump 536 can be used positively. In that case, as the reverse rotation speed of the pump 536 increases and the area of the openings h2 decreases, the positive pressure produced increases.

In the connecting path 532 there is installed a pressure adjust valve 535 that can permit and interrupt the ink flow. The pressure adjust valve 535 may use a construction similar to what was shown in FIG. 12A and FIG. 12B.

The valves installed in various parts of the ink supply path, including the valves 535 and 503, need only be able to properly open and close the flow path or properly control the ink flow in response to a control signal and may have any desired construction in addition to those shown in FIG. 28 and FIG. 12A. As for the valve 503, it is effective to use a lightweight device such as a piezoelectric device as an actuator to realize a high-performance negative pressure control with high response.

The pumps installed in various parts of the ink supply path, including the pressure adjust pump 536, need only be able to deliver ink in response to a drive signal and may have any desired construction. It is preferred, however, that the pump 536 be able to change the ink flow direction and also to cooperate with the flow adjust valve 503 to adjust the ink flow with small pressure variations.

In this example, the pump 536 used is of a constant pressure axial flow type that is driven by a motor (not shown) capable of controlling its rotation direction and rotation speed. As described above, when the pump 536 is driven forwardly, an ink flow is produced in a direction that draws ink from the connecting path 532, i.e., applies a negative pressure to the connecting path 532. When the pump is reversed, an ink flow is produced in a direction that supplies ink to the connecting path 532, i.e., applies a positive pressure to the connecting path 532. As the pump 548 a gear pump may be used. In the following description, the rotation of the pump 536 that produces an ink flow applying a negative pressure to the print head 811 is called a forward rotation and the rotation that produces an ink flow applying a positive pressure to the print head 811 is called a backward or reverse rotation.

As shown in FIG. 27 and FIG. 28, the subtank 540 has a pair of opposing movable members 540A made of a resilient material and a compression spring 540B interposed between them. Expansion and compression of this spring 540B suppresses sharp pressure variations in the subtank 540.

Near the print head 811 is installed a pressure sensor 544 to detect a pressure in the connecting path 532. The CPU 800 reads an output of the pressure sensor 544 and, as described later, feedback-controls (or feedforward-controls) the pump 536 that is rotatable in both directions to adjust the pressure in the print head 811 to a desired value.

In the subtank 540 is installed a pressure sensor not shown, which detects when the ink in the subtank decreases and the inner pressure falls below a predetermined level so that the ink can be supplied automatically from the main tank 203.

Two main tanks 203 are provided for each ink color. One of them is selected by a direction control valve 534-1 and the ink can be supplied from the selected ink tank 203 through a tube 204 into the subtank 540 by driving a pump 534-2. The joint 42 connecting the tube 204 and the subtank 540 may have a similar construction to those shown in FIG. 14A and FIG. 14B.

In addition to the appropriate connection and disconnection of joints as described above to enable or disable the fluid communication, it is possible to have the ink supply paths themselves connected at all times and to establish the fluid communication in an on/off fashion by means of an open-close valve. What is required is that, when the ink volume required differs among the print modules depending on the contents of the divided image data, the ink supply operation in one print module does not interfere with that of another print module. In this respect, the independence of the individual print modules in this embodiment is assured.

The ink tank 203 (203Y, 203M, 203C, 203K) connected to the joint 43 may have a construction similar to that shown in FIG. 15A and FIG. 15B.

Now, let us return to FIG. 27.

The ink can be circulated as follows through the other tube connected to the print head 811.

With the ink flow adjust valve 503 open, the pump 548 is rotated in a direction that draws ink from the print head 811, circulating the ink from the subtank 540 through the pump 536, valve 535, print head 811, pump 548, valve 552, bubble elimination chamber 532 and deaeration system 38 and back into the subtank 540. As the ink is circulated along this path, gases in the ink are removed by the deaeration system 38. In this operation, if the pump 536 is not operated, there is no problem in terms of performance. During this operation, because of the flow resistance of the filter 581, ink though small in volume is discharged from the print head 811 into the ink receiver in the cap 44.

As a constitutional element of the recovery system intended to keep the ink ejection performance of the print head in good condition or recover the normal ejection performance, the cap 44 is provided in the print module. During the printing operation, the cap 44 is retracted from the nozzle-formed surface of the print head 811 to avoid interference with the printing operation. During the standby for printing operation or when a recovery operation of the print head 811 is needed, the nozzle-formed surface is hermetically capped.

Next, a pressurization-based recovery operation to restore a sound ink ejection performance of the print head 811 will be explained.

With the print head 811 capped with the cap 44, the valve 535 is closed and then the ink collecting suction pump 45 is started to suck out ink from the cap 44. Denoted 580 is a seal portion that comes into hermetic contact with the print head 811.

Next, the pump 548 is operated to pressurize the ink toward the print head 811. Since the valve 535 is closed, the interior of the print head 811 is rapidly pressurized, forcibly discharging a relatively large amount of ink from the nozzles, restoring the nozzles of the print head 811 to a sound state. The discharged ink is quickly collected by the already running pump 45 and is deaerated by the deaeration system 38 and returned to the subtank 540. The deaeration system 38 may have the same construction as shown in FIG. 13.

The drive signals for the pumps and valves and the sensor output are transferred to and from the control unit including the CPU 800 and I/O port 806.

Next, the operation of the ink supply device in this embodiment will be explained. First, from the viewpoint of the print duty of the print head 811 and the pressure acting on the print head, the operation of the ink system will be described by referring to FIG. 29. During a non-ejection state 1301 in which the print head 811 does not eject ink, the pump 536 is operated forwardly to generate a predetermined negative pressure as indicated at 1302 to maintain the interior of the print head at a relatively large negative pressure as shown at 1303. Before the ink ejection from the print head is started (at 1304), the negative pressure produced by the pump 536 being rotated forwardly is reduced to approach the atmospheric pressure (0 mmAq) as indicated at 1306. That is, the forward rotation speed of the pump 536 is lowered so as to reduce the negative pressure in the print head to an optimum negative pressure range (ejection permissible range 1307).

Once the printing operation is started, the pressure generated by the pump 536 is controlled according to changes in the print duty to adjust the negative pressure applied to the print head 811 and thereby mitigate negative pressure changes in the print head caused by ink ejection to keep the negative pressure in a preferable ejection permissible range 1307. The pressure generated by the pump 536 is adjusted by controlling the pump 536 and the flow adjust valve 503, as described above, to adjust the negative pressure applied to the print head 811.

In the following, a case of adjusting the negative pressure in the print head by controlling the pump 536 will be explained. The negative pressure in the print head 811 can also be adjusted by the control of the flow adjust valve 503 or by a combined control of the valve 503 and the pump 536.

The negative pressure in the print head 811 tends to increase as the print duty increases. So, the forward rotation speed of the pump 536 is reduced according to the print duty to keep the negative pressure in the print head 811 within an optimum ejection permissible range 1307. When the print duty is extremely high, i.e., the tendency for the negative pressure in the print head 811 to increase is strong, if the reduction in the forward rotation speed of the pump 536 fails to prevent the negative pressure in the print head from becoming too large, the pump 536 is reversed to produce a positive pressure as indicated at 1311 and thereby lower the negative pressure in the print head 811 to the ejection permissible range 1307. Further, when the print duty decreases as indicated at 1310, the pump 536 is rotated forwardly to return the generated pressure to the negative pressure (as indicated at 1309) to prevent a reduction in the negative pressure in the print head 811 which would otherwise be caused by the inertia force of the ink flowing from the subtank 540 toward the print head 811.

By controlling the pump 536 based on the print duty as described above, the negative pressure in the print head 811 can be maintained within the preferable ejection permissible range 1307. When changing the rotation speed and rotation direction of the pump 536, there is some delay in the negative pressure control response with respect to a print duty change, resulting in small irregular pressure changes (at 1308). This level of pressure variations, however, has almost no effect on the formation of an image. It is also possible to detect such small pressure changes by the pressure sensor 544 installed near the print head 811 and, based on the result of detection, control the pump 536 or the pressure adjust valve 535 to alleviate such small pressure variations.

Figure 30:
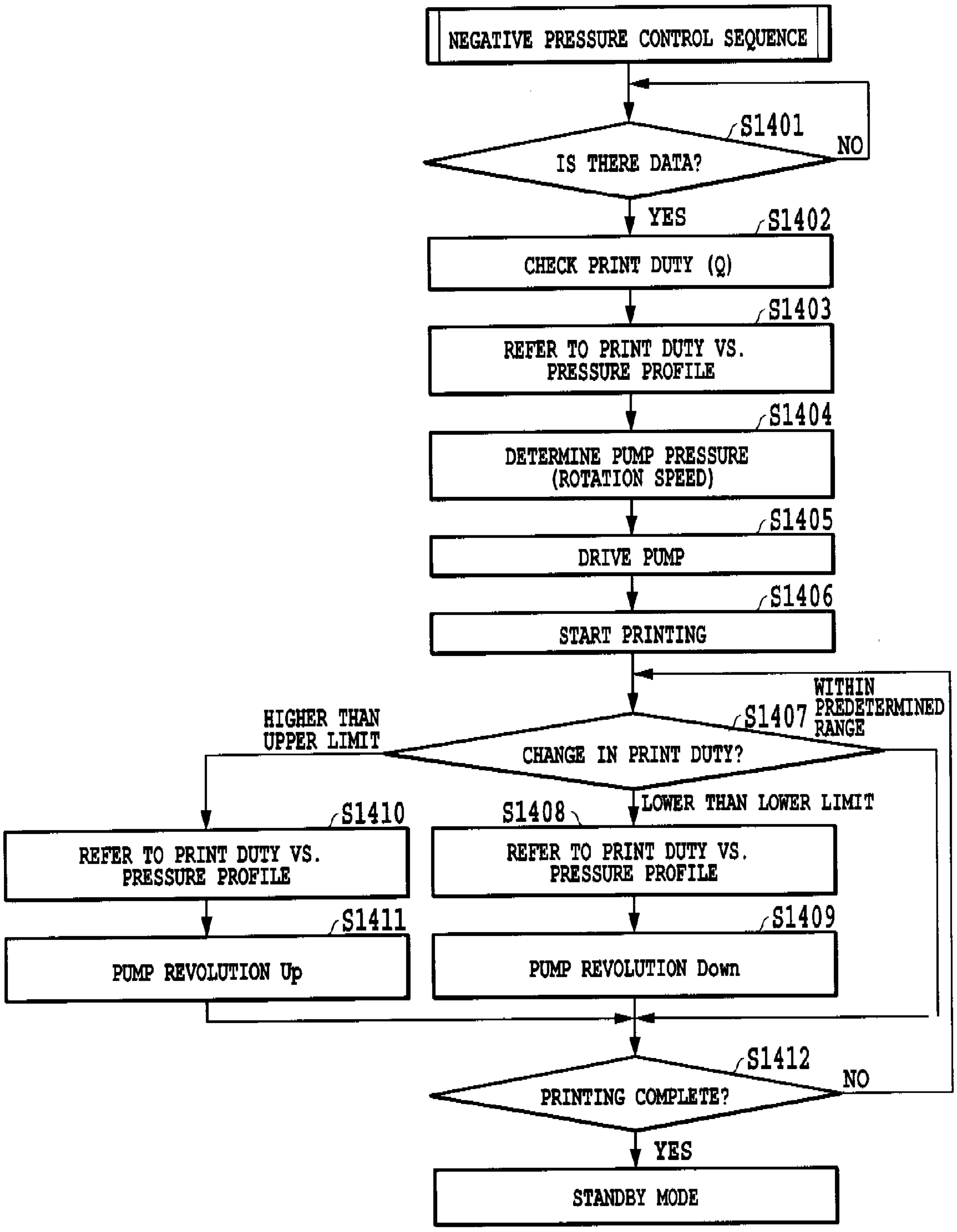
FIG. 30 is a flow chart showing an example control sequence for the ink system of FIG. 27.

FIG. 30 shows an example pressure control procedure in this embodiment. In the control system configuration for the print module shown in FIG. 3, this procedure can be executed by the CPU 800 according to the program stored in the ROM 803.

First, a check is made to see if there is print data (step S1401) and, if so, a print duty per unit print area is determined (step S1402). In the print module (e.g., EEPROM 804), a print head pressure change profile with respect to a print duty is set beforehand. By referring to the profile (step S1403), a pressure set value for the pump 536 that matches the print duty is determined (step S1404). Then, based on the pressure set value, the pump 536 is controlled to adjust the pressure in the print head within the ejection permissible range 1307.

When the printing operation is started (step S1406), a check is made as to whether the print duty per unit print area has changed more than a predetermined amount from the print duty from which the current pressure set value was determined (step S1407). If the print duty has changed more than the predetermined amount, the print duty vs. print head pressure change profile is referred to again and the setting of the pressure to be generated by the pump 536 is changed (step S1407, S 1411). That is, if the print duty rises above an upper limit of the predetermined range, the negative pressure in the print head tends to increase. So, the forward rotation speed of the pump 536 is lowered or the pump is reversed in order to keep the negative pressure in the print head within the ejection permissible range 1307. Conversely, if the print duty falls below a lower limit of the predetermined range, the negative pressure in the print head tends to decrease. So, the forward rotation speed of the pump 536 is increased or the reverse rotation speed lowered in order to maintain the negative pressure in the print head within the ejection permissible range 1307. This control is repeated until the printing operation is finished (step S1412), after which the control sequence moves to a standby mode.

The above control may be realized, rather than by using software processing, but by hardware configuration which comprises a counter to count the number of bits of image data and a means to control the motor to drive the pump 536 according to the count value. Further, instead of performing the control when the print duty changes as the printing operation proceeds, it is also possible to determine a pump control curve based on the print data in advance and perform a feed-forward control on the pump according to the control curve. Further, based on an output of a means that detects an actual pressure in the print head (if the pressure in the subtank 540 can be deemed practically equal to the print head pressure, the pressure sensor 544 may be used), a local feedback loop control may be performed on the pump.

Next, in each of stages ranging from shipping a manufactured ink jet printing apparatus from a factory to the use of the apparatus by the user, we will explain about the setting performed on the ink supply device and its operation by referring to FIG. 31 to FIG. 36.

Preparation for Shipping

Figure 31:
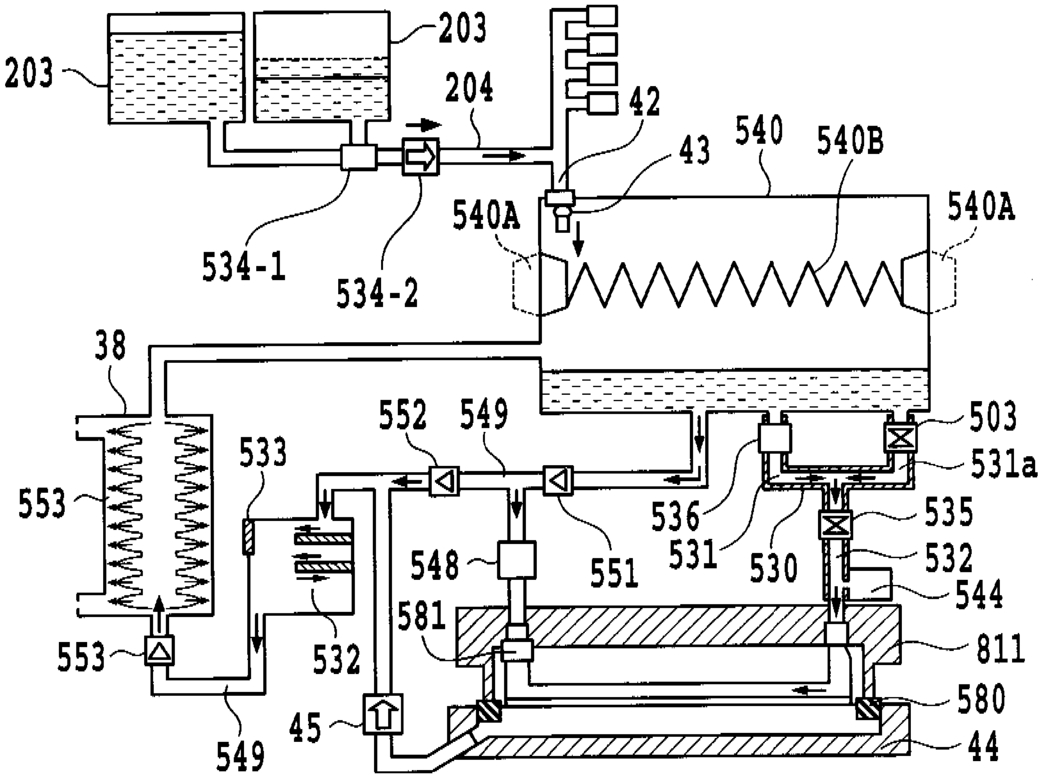
FIG. 31 is a schematic diagram showing an operation of filling ink into the ink system of FIG. 27 at time of shipping.
Figure 32:
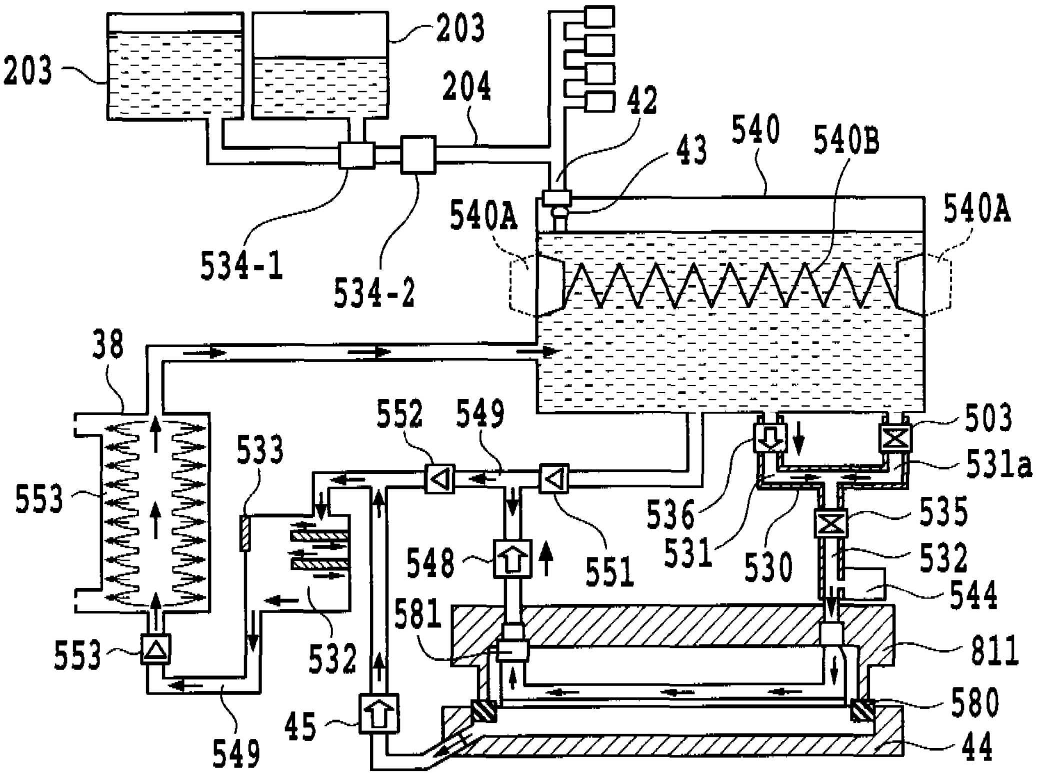
FIG. 32 is a schematic diagram showing an operation of deaerating the ink system of FIG. 27 at time of shipping.
Figure 33:
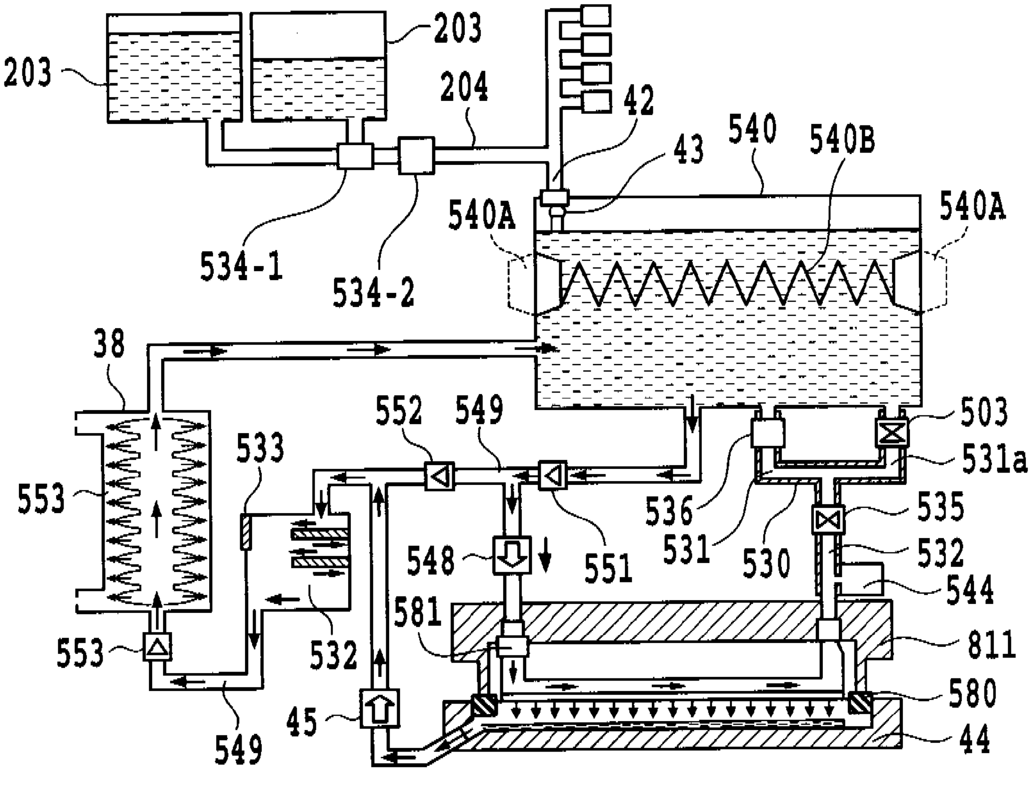
FIG. 33 is a schematic diagram showing a recovery operation of the ink system of FIG. 27 at time of shipping.

FIG. 31 to FIG. 33 show an operation of the ink supply device until the manufactured ink jet printing apparatus is shipped. First, as shown in FIG. 31, a pump 534-2 is operated to pour ink from the main tank 203 into the subtank 540 through joints 42, 43. At this time, valves 535, 503 are open. Although the pumps 536, 548 are at rest, ink can flow past them.

During the process of filling ink into the subtank 540, basically all ink paths and the interior of the print head 811 are filled with ink. At this point in time, there may be bubbles in many parts of the ink path.

With the ink filling from the main tank 205 into the subtank 540 complete, the elimination of bubbles from the ink path and the deaeration operation are performed.

That is, the pumps 536, 548, 45 are operated forwardly to circulate ink from the subtank 540 through the valve 503 and pump 536 into the valve 535, print head 811, pump 548, valve 552, bubble elimination chamber 532 and deaeration system 38 and back into the subtank 540. By circulating the ink in this manner, bubbles in ink are eliminated in the bubble elimination chamber 532 and the ink is deaerated by the deaeration system 38. In this operation, no performance problem arises if the pump 536 is not rotated. Although a small amount of ink is discharged into the ink receiver in the cap 44 because of the flow resistance of the filter 581 of the print head 811, the discharged ink is quickly collected by the pump 45 into the circulation path. Executing this operation continuously for a predetermined duration can remove bubbles and gases from the ink flow.

FIG. 33 shows a recovery operation of the print head 811 in a final step of preparing for the shipping.

The ink in the ink path is already deaerated by the time the recovery operation is started. In the recovery operation, the valve 535 is closed first and then the pumps 45, 548 are operated to move the ink in the direction of arrow in FIG. 33. The ink in the subtank 540 is drawn into the pump 548 through the one-way valve 551 and supplied to the print head 811. Since the valve 535 is closed, the ink in the print head 811 is rapidly pressurized, forcing out a relatively large amount of ink from the nozzles. As a result, the ink ejection performance of the nozzles are restored to normal. The ink discharged to the ink receiver in the cap 44 is quickly collected by the already running pump 45 to the bubble elimination chamber 532 for reuse.

Then, the pumps 548, 45 are stopped and the valve 535 is opened, after which the nozzle surface of the print head 811 (the surface in which nozzles are formed) is wiped with a wiper blade not shown. Then, ink not contributing to the image forming is ejected from the nozzles of the print head 811 into the cap 44. Now the recovery operation is complete.

During Installation

Figure 34:
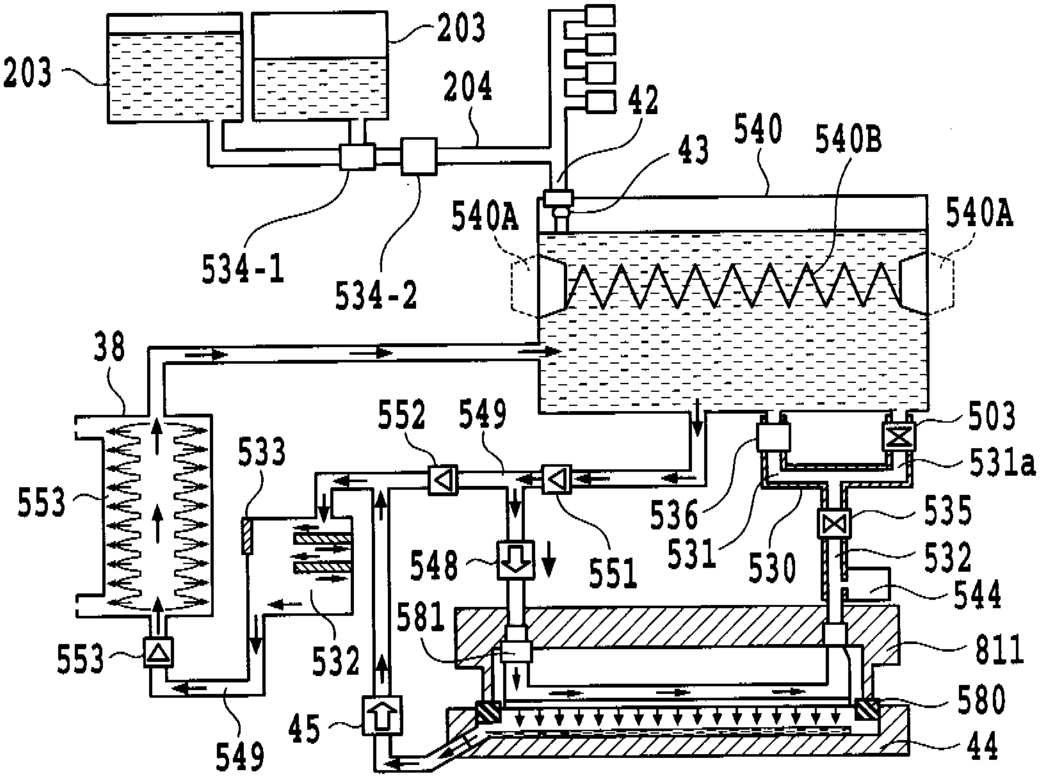
FIG. 34 is a schematic diagram showing a recovery operation of the ink system of FIG. 27 when the apparatus is installed.

After the printing apparatus is delivered to the user and before it begins to be used, the joints 42, 43 are coupled as shown in FIG. 31 and the recovery operation of the print head 811 is executed as shown in FIG. 34. The ink flow during this recovery operation is the same as during the recovery operation of FIG. 33 and the only difference is the operation time. So detailed explanations are omitted here. If a long period of time has passed after shipping, the bubble elimination and the deaeration operation such as described with reference to FIG. 32 may be performed. If the elapsed time is short, the recovery operation of FIG. 34 may be omitted. The decision on the length of elapsed time and the associated operation are performed by the CPU 800 executing the program stored in the ROM 803 in the printing apparatus.

During Standby for Printing

During a normal standby before starting the printing operation, a large negative pressure (about 20-150 mmAq lower than the atmospheric pressure) is maintained in the print head 811 to secure stability against environmental changes. In this state, when a print command is received, the print head 811 is moved from the capping position to the print position above the print medium 206 and at the same time the pressure set value is changed to reduce the negative pressure in the print head 811.

The CPU 800 reads an output of the pressure sensor 544 and performs a PWM (Pulse Width Modulation) control on the rotation direction and speed of the pump 536 to realize a feedback control with a relatively high response.

In connection with the control of the pump 536, the valve 503 is also controlled to realize a more responsive feedback control. In that case, it is preferable to use as the valve 503 a lightweight valve capable of high response.

Supply Control During Printing

Figure 36:
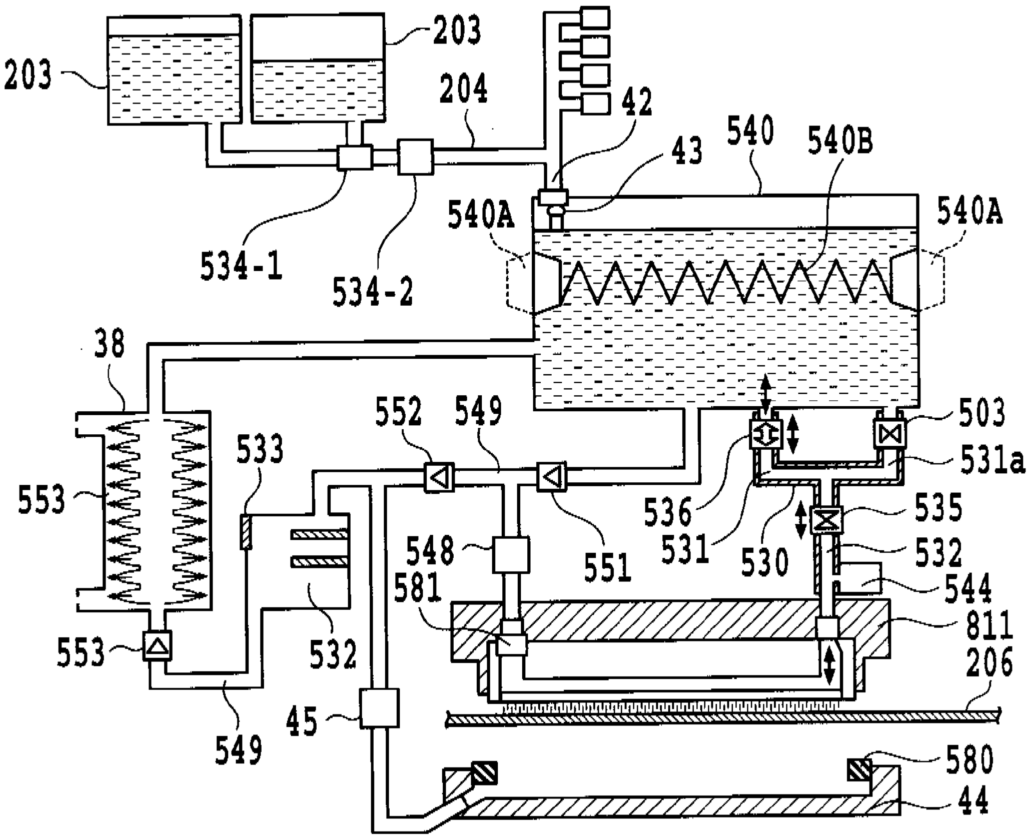
FIG. 36 is a schematic diagram showing an operation of the ink system of FIG. 27 during printing.

FIG. 36 shows a negative pressure control during the printing operation.

Figure 35:
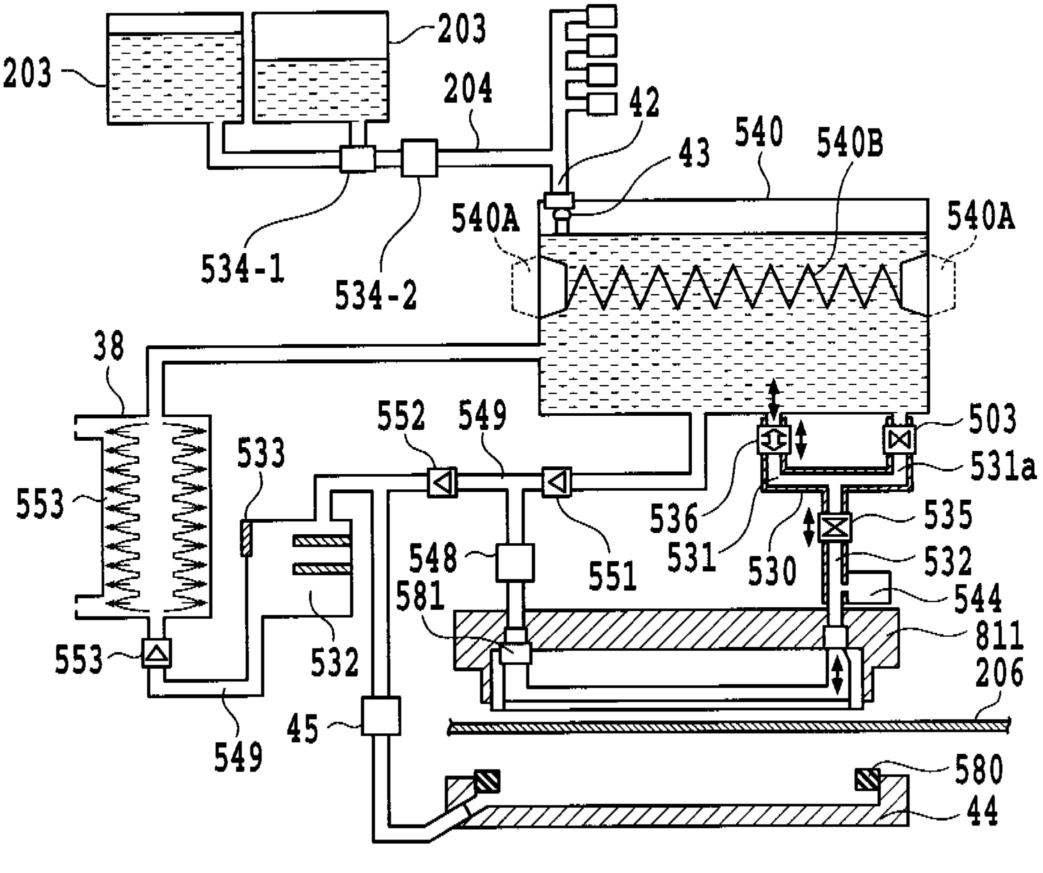
FIG. 35 is a schematic diagram showing an operation of the ink system of FIG. 27 during a standby for printing.

The negative pressure control during the printing operation is almost the same as during the standby of FIG. 35. The CPU 800 reads an output of the pressure sensor 544 and performs a PWM (Pulse Width Modulation) control on elements including the rotation direction of the pump 536 to realize a high responsiveness. In this embodiment, the valve 503 is closed and the ink path on the pump 548 side is also closed during the printing operation. As described above, controlling the valve 503 in connection with the control of the pump 536 can realize a feedback control with an improved response.

The control on the pump motor 508 (drive motor for the pump 536) using the output of the pressure sensor 544 as a feedback signal can be performed by using a pressure control system similar to that of the preceding embodiment shown in FIG. 23.

[Third Embodiment]

Figure 37A:
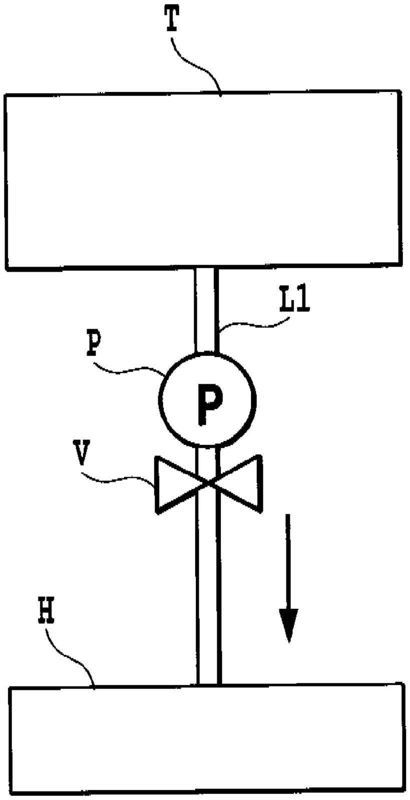
FIG. 37A is a diagram showing an outline configuration of the ink system in the first and second embodiment of this invention.
Figure 37B:
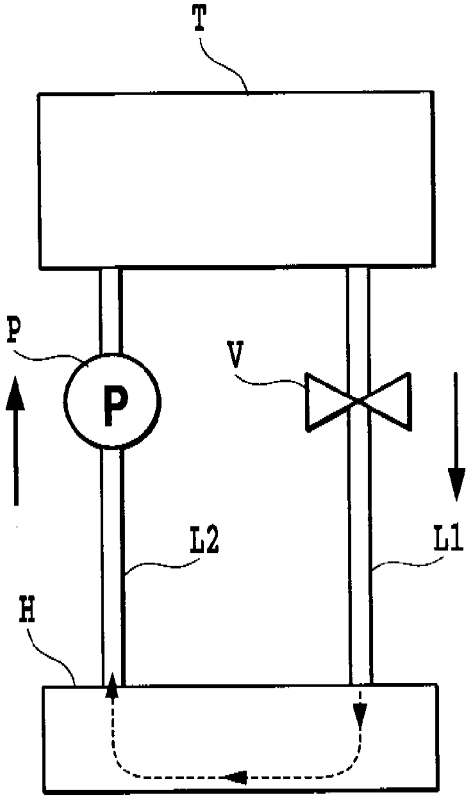
FIG. 37B is a diagram showing an outline configuration of an ink system in a third embodiment of this invention.

FIG. 37A and FIG. 37B show ink systems of different configurations.

The ink system of FIG. 37A, as in the first and second embodiment, has a negative pressure application means including a pump P and a valve V in an ink supply path L1 running between an ink tank T and a print head H. The pump P and the valve V correspond to the mechanical pump 36 and the pressure adjust valve 35 in the first embodiment and to the pressure adjust pump 536 and the pressure adjust valve 535 in the second embodiment. The print head H corresponds to the print head 811 in the first and the second embodiment. The ink communication path L1 is equivalent to the ink path for supplying ink from the ink tank to the print head 811 in the first embodiment and to the ink path for supplying ink from the ink tank 540 to the print head 811, i.e., the ink supply path 530 including the circulation path 531 and the connecting path 532, in the second embodiment.

As described above, FIG. 37A shows a construction having the negative pressure application means including the pump P and the valve V in the ink supply path L1 connecting the ink tank T and the print head H. That is, FIG. 37A conceptually explains the construction common to the first and second embodiment. FIG. 37A therefore leaves out the deaeration system 38, the negative pressure chamber 30, the ink return path from the print head 811 to the ink tank 40, and the ink collecting path from the cap 44 in the first embodiment. Similarly, FIG. 37A omits the circulation path 531, the flow adjust valve 503, the ink return path from the print head 811 to the ink tank 40, the bubble elimination chamber 532, the deaeration system 38, and the ink collecting path from the cap 44 in the second embodiment.

Such an ink system shown in FIG. 37A applies a pressure (including negative and positive pressure) to the ink in the ink supply path L1 by the negative pressure application means including the pump P and the valve V, to apply a negative pressure to the interior of the print head H. The negative pressure application means may include at least one of the pump P and the valve V. This ink system can be constructed simple and compact since the ink supply path L1 can perform both the ink supply and the negative pressure application to the print head H.

FIG. 37B is a conceptual diagram showing the construction of an ink system that differs from FIG. 37A in the installed positions of the pump P and the valve V. In this example, the valve V is installed in the ink supply path L1 and the pump P in the return path L2 through which to return ink from the print head H to the ink tank T. The pump P applies a pressure (including negative and positive pressure) to the ink in the return path L2 to impress a negative pressure in the print head H. The valve V is controlled in connection with the control of the pump P to adjust the ink flow in the ink supply path L1, making it possible to apply a highly responsive, highly precise negative pressure to the print head H. The negative pressure application means may include at least one of the pump P and the valve V. The pump P may serve the function of the pump 48 in the first embodiment or the pump 548 in the second embodiment.

The negative pressure application means may be provided in the ink supply path L1 or the return path L2 or both. The only requirement is that the negative pressure application means be installed in the ink path communicating the ink tank to the print head and be able to apply an adjustable negative pressure to the print head.

[Fourth Embodiment]

Figure 38:
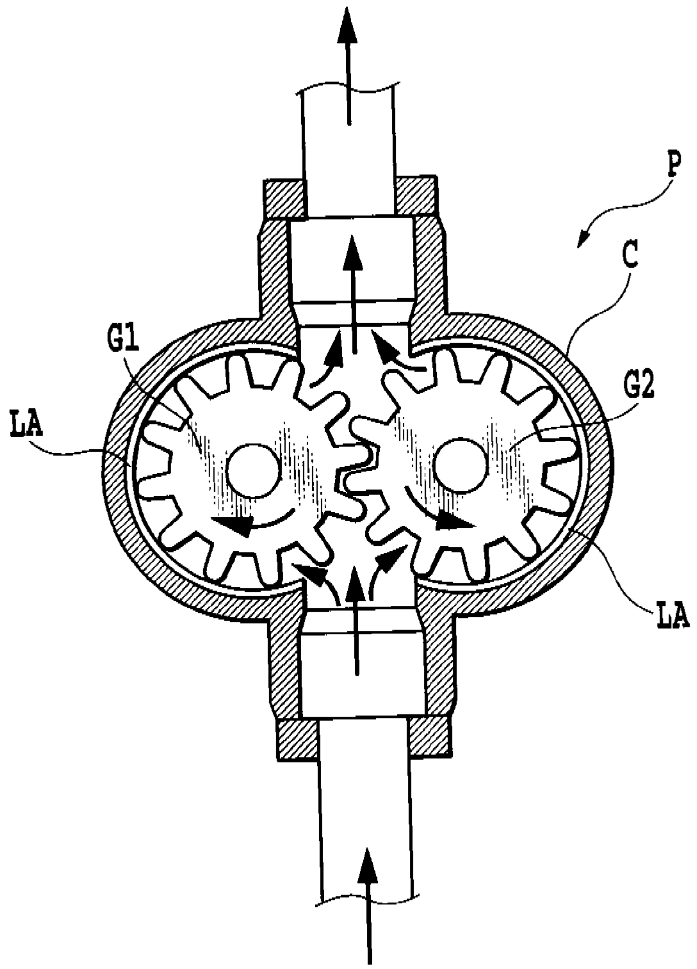
FIG. 38 is an outline cross-sectional view of a pump used in the fourth embodiment of this invention.

FIG. 38 is an outline cross-sectional view showing an example construction of the pump P of FIG. 37A and FIG. 37B.

The pump P in this example is a gear pump similar to the mechanical pump 36 of the first embodiment. However, it differs from the normal volume type gear pump in that it has a gap formed as an ink pass-through channel LA between tooth crests of the gears G1, G2 and an inner circumferential surface of the casing C. More specifically, the casing C has an enlarged diameter portion in its inner surface to form a gap between it and the tooth crests of the gears G1, G2. Thus, the ink can pass through the channel LA and therefore the pump P, and its flow changes according to the rotating speed of the gears G1, G2. When the gears G1, G2 rotate at high speed in the direction of arrow in FIG. 38, a strong force acts to deliver ink upstream, producing a large negative pressure on the downstream side. When the gears G1, G2 rotate at low speed in the direction of arrow, a force acting to deliver the ink upstream is weak, producing a small negative pressure on the downstream side. By controlling the rotating speed of the pump P, the negative pressure acting on the ink can be adjusted.

The provision of the ink pass-through channel and the control of the rotating speed can provide the pump P with characteristics of both a constant volume pump and a constant pressure pump. The pass-through channel may be formed to have a gap of about 10 μm to 1 mm between the gears and the casing.

The pass-through channel need only be formed at a position where it receives a delivery force that depends on the rotating speed of the gears, and may have a desired construction in addition to the one employed in this embodiment. For example, a part of the gear crest may be cut away to form a gap as the pass-through channel between the gear and the inner surface of the casing.

[Fifth Embodiment]

Figure 39:
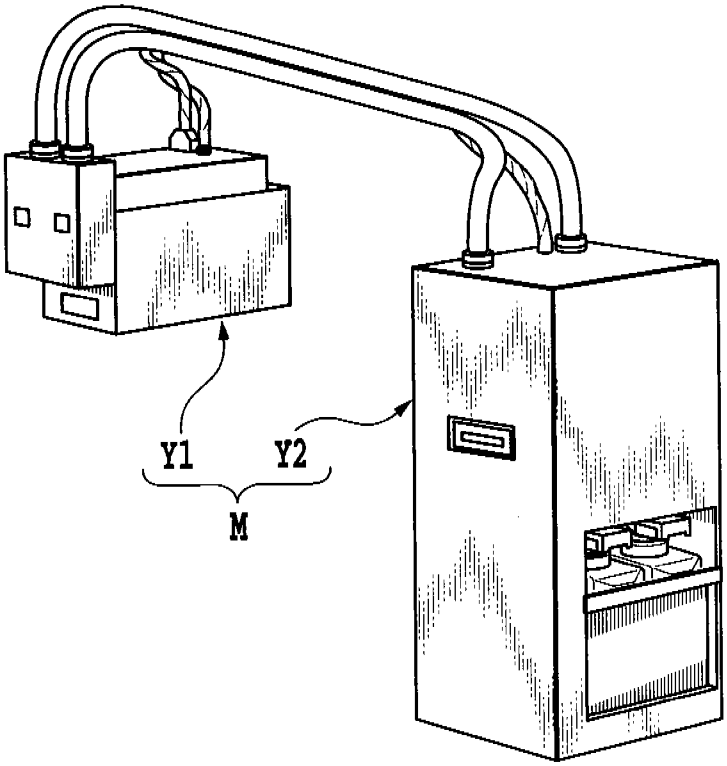
FIG. 39 is a perspective view of a print module as a fifth embodiment of this invention.

FIG. 39 is an explanatory diagram showing an example construction comprising modules of elements in the printer composite system shown in FIG. 1 and FIG. 2.

The printer composite system such as shown in FIG. 1 and FIG. 2 is suitably employed as an industrial printing machines that can print on large-size posters and cardboards. It can cope with large objects to be printed by adding print modules 116 (166-1 to 166-5). When the object to be printed is small, the number of print modules 116 in operation may be reduced without reducing the number of print modules 116 installed. Or the number of print modules 116 installed may be reduced. There may be a large difference in frequency of use among the print modules 116 according to their installed positions, so it is preferred that the print modules 116 be able to be repaired or replaced individually.

From this point of view, the print modules 116 in this example are constructed into print modules M, each of which comprises a print unit Y1 including a print head and an ink supply unit Y2 including an ink tank.

The print unit Y1 incorporates four print heads 811 (811K, 811C, 811M, 811Y) in one print module 116 and a print head control circuit 810 (see FIG. 3) in the print module 116. The print unit Y1 also incorporates the control circuit board 60 of FIG. 9, i.e., the control system of FIG. 3 for each print module 116. It is also possible to construct the print unit Y1 to include the cap 44, a mechanism for capping the print heads with the cap 44, and a control unit to control the mechanism.

The ink supply unit Y2 incorporates an ink system for each print module 116, i.e., the ink system of FIG. 9 in the first embodiment or the ink system of FIG. 27 in the second embodiment. The main ink tank commonly connected with a plurality of print modules 116 can be connected commonly with a plurality of ink supply units Y2. The main ink tank may be provided for at least one ink supply unit Y2. Further, the ink supply unit Y2 may incorporate a power supply circuit for each print module 116. The pressure sensor 49 of the first embodiment and the pressure sensor 544 of the second embodiment are preferably built, near the print heads 811, into the print unit Y1 along with the print heads 811 for the purpose of detecting the inner pressure with high precision. It is also possible to incorporate these pressure sensors into the ink supply unit Y2.

These units Y1 and Y2 are connected by wires including signal lines and power supply wires and also by pipes forming the ink path, and combine to form the print module M. As described above, by building a mechanism for each print module 116 (including a control system and an ink system) into a module, independence of individual print modules 116 can be more clearly secured, allowing the mounting, dismounting, replacement and repairing to be performed for each print module 116. This is very advantageous when the printer composite system such as shown in FIG. 1 and FIG. 2 is applied as an industrial printing machine.

It is noted, however, that the units Y1, Y2 do not have to be handled as a print module M but may be used as separate units. In that case, the units Y1, Y2 need only be constructed such that they can be connected to or disconnected from each other. This arrangement allows for individual mounting, dismounting, replacement and repair, which proves more advantageous when the printer composite system such as shown in FIG. 1 and FIG. 2 is used as an industrial printing machine.

[Sixth Embodiment]

Figure 40B:
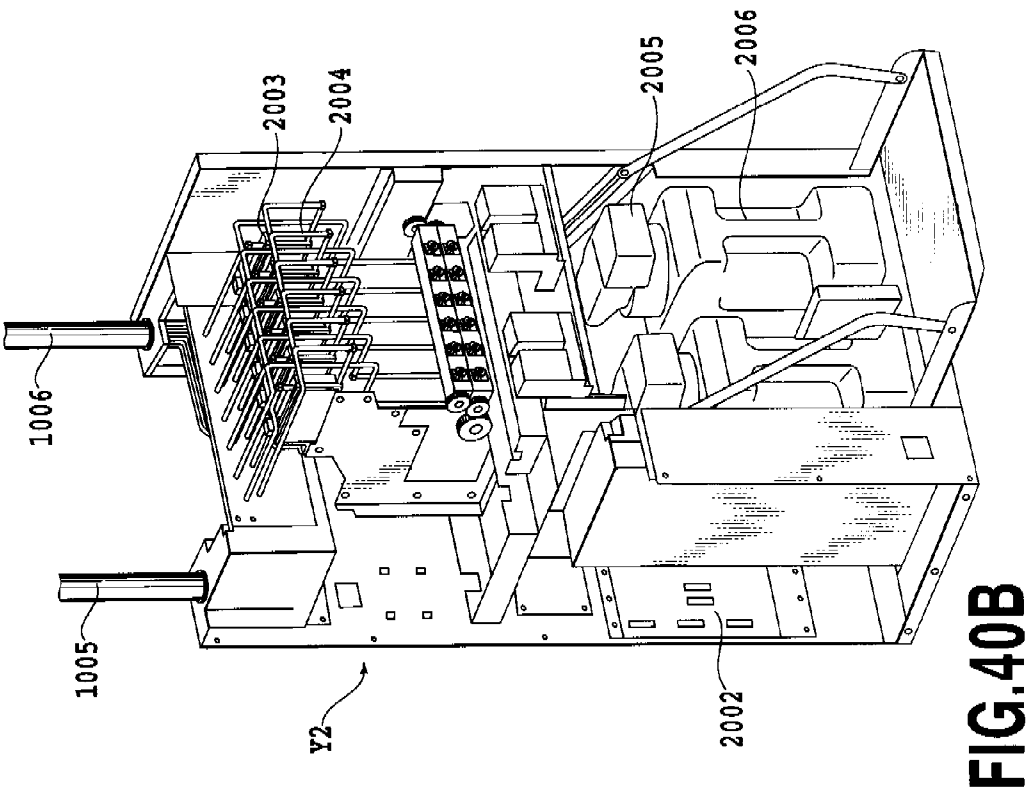
FIG. 40B is a perspective view of an ink supply unit Y2 in the sixth embodiment of this invention.
Figure 40A:
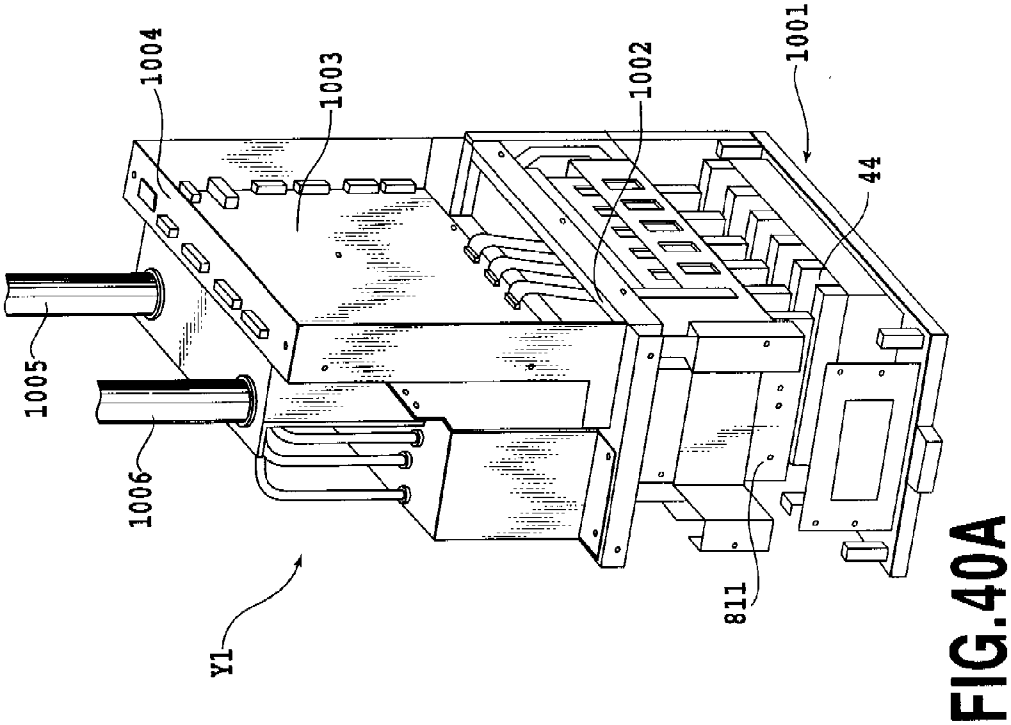
FIG. 40A is a perspective view of a print unit Y1 in a sixth embodiment of this invention.
Figure 41:
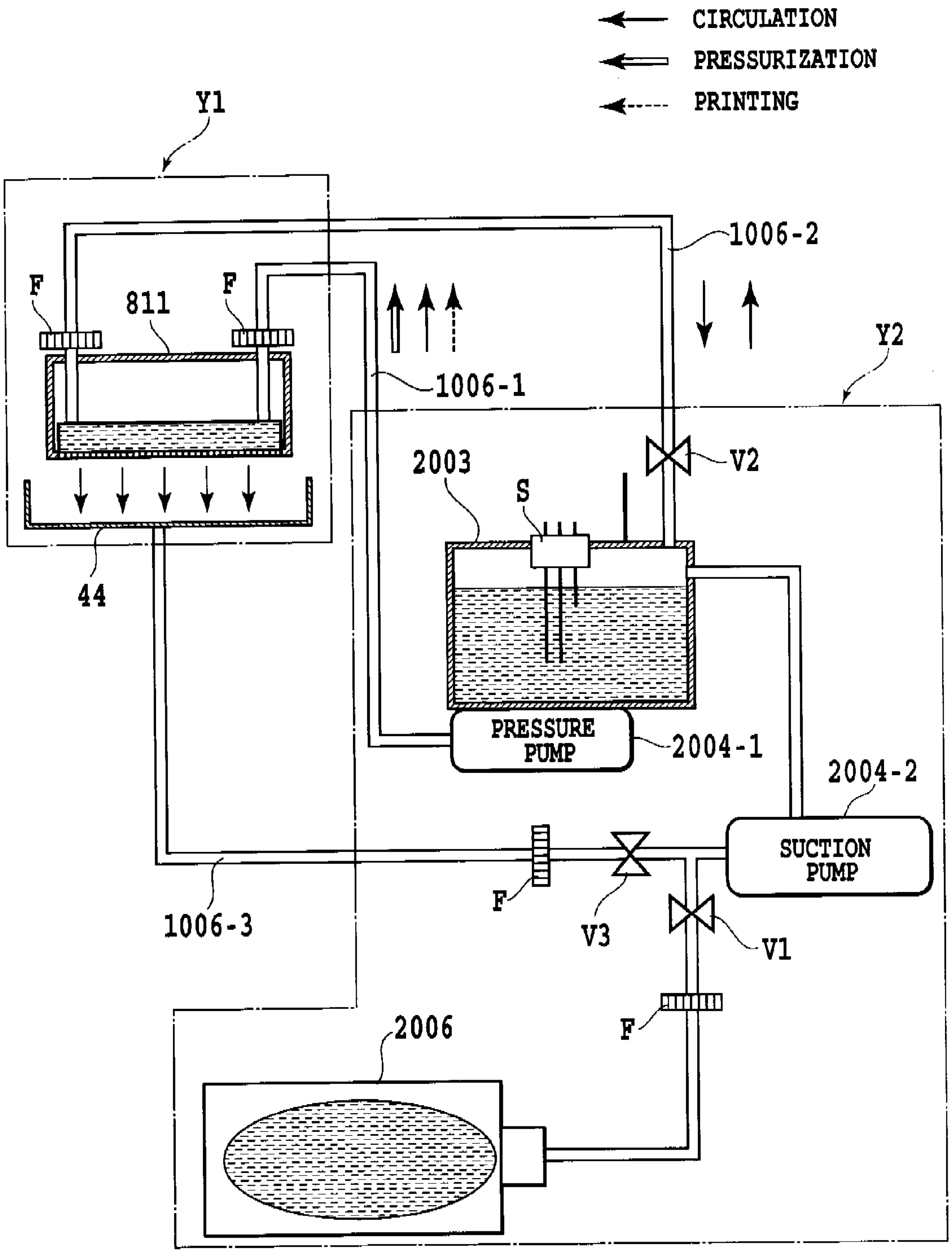
FIG. 41 is an explanatory diagram showing an ink supply path in the sixth embodiment of this invention.

FIG. 40A, FIG. 40B and FIG. 41 are explanatory views showing a more detailed example construction of the units Y1, Y2 in the print module M of FIG. 39.

In the print unit Y1 of this example, denoted 1001 is a capping mechanism 1001 including a cap 44. A capping motor 809 (see FIG. 3) in the print unit Y1, when turned on, drives the capping mechanism 1001 and a print head 811 relative to each other. In this example, with the capping mechanism 1001 and the print head 811 moved relative to each other, the print head 811 is uncapped to expose its nozzle forming face (a surface in which ink ejection openings are formed) downwardly of the print unit Y1. Now, the print head 811 is ready to eject ink toward a print medium. In addition to the print heads 811Y, 811M, 811C, 811K for the four color inks as described above, the print head 811 installed in the print unit Y1 may be constructed of a plurality of combinations of print heads dedicated one for each of various inks.

In the print unit Y1, denoted 1002 is a head controller board which mainly has a print head control circuit 810 (see FIG. 3) formed therein. Designated 1003 is an engine printed circuit board mounted with the CPU 800, the ROM 803, the RAM 805 and the EEPROM 814 (see FIG. 3 for them all). Designated 1004 is an interface unit which has a function of the interface controller 802 (see FIG. 3) for communication with the information processing device 100.

Connected between the print unit Y1 and the ink supply unit Y2 are a wire 1005 including a signal wire and a power wire and a pipe 1006 forming an ink path.

In the ink supply unit Y2, denoted 2001 is a power supply circuit 2001 which supplies electricity from outside to various parts in the unit Y2 and also to the print unit Y1 through the wire 1005. Designated 2002 is an interface portion 2002 that works as a communication interface with the medium transport device 117 of FIG. 4. Designated 2003 is a sub ink tank (hereinafter referred to as a subtank) connected to the print head 811 through the ink path 1006 for ink supply to the head. In this example, a total of six subtanks 2003 containing six color inks are provided. To these subtanks 2003 inks are supplied from main ink tanks (hereinafter referred to as main tanks) 2006 through a pump unit 2004 and an ink supplying path 2005. The pump unit 2004 has pumps to deliver inks from the main tanks 2006 to the corresponding subtanks 2003. The main tanks 2006 are replaceable.

Unlike the previous embodiment 1 to 4, this example utilizes a water head difference between the subtank 2003 and the print head 811 to supply ink from the subtank 2003 to the print head 811. Similar to the embodiment 1 to 4, a mechanism to positively control an ink pressure may be installed in the ink supply system between the subtank 2003 and the print head 811. Between the subtank 2003 and the print head 811 are formed an ink path for introducing ink from the subtank 2003 to the print head 811 and another ink path for returning the ink from the print head 811 to the subtank 2003. The use of these two ink paths can circulate the ink between the subtank 2003 and the print head 811, as in the previous embodiments. Further, like the previous embodiments, this example can perform a recovery operation of forcibly discharging ink from the nozzles of the print head out into the cap 44 by pressurizing the ink in the print head. A pump to circulate and forcibly discharge ink as described above is installed in the pump unit 2004. In the ink circulation system a deaeration system 38 may be installed, as in the previous embodiments.

Also between the subtank 2003 and the cap 44 there is formed an ink path, through which the ink discharged into the cap 44 can be collected into the subtank 2003, as in the previous embodiments. A pump to collect the ink is provided in the pump unit 2004. As in the previous embodiments, when the ink not contributing to the forming of an image is discharged from the print head 811 into the cap 44, the discharged ink can also be collected.

In this example, the pump for delivering ink from the main tank 2006 to the subtank 2003, the ink circulation pump, the pump for forcibly discharging ink and the ink collecting pump are installed concentratedly in the pump unit 2004 of the ink supply unit Y2. Thus, at least two of these pumps can be replaced with a common pump to simplify the construction. Further, at least one of these pumps may be installed in the print unit Y1. Either of the ink returned from the print head 811 and the ink collected from the cap 44 may be introduced into the main tank 2006.

As described above, by concentrating the control system of the print head 811 in the print unit Y1 and the ink supply system in the ink supply unit Y2, the function of the print module can be distributed between the two units Y1 and Y2. As a result, the print unit Y1 can be reduced in size so as to be easily installed at a position facing a print medium and the ink supply unit Y2 can be located at a position that allows the ink tank to be replaced easily. If the deaeration system 38 is installed in the ink circulation system, it is preferably installed in the ink supply unit Y2. Further, locating the power supply circuit 2001 in the ink supply unit Y2 can make the connection with the commercial power supply easy.

FIG. 41 is an explanatory diagram showing an ink path formed between the print units Y1 and Y2. In this example three ink paths 1006-1, 1006-2, 1006-3 are formed for one print head 811. Designated 2004-1 is a pressure pump and 2004-2 a suction pump, both installed as a pump unit 2004 in the ink supply unit Y2. Denoted V1 is a supply valve, V2 a recovery valve, V3 a recycle valve, F a filter and S a level sensor to determine the volume of ink in the subtank 2003.

In this example, during the printing operation, a difference in water head between the subtank 2003 and the print head 811 is utilized to supply ink from the subtank 2003 to the print head 811 through the ink paths 1006-1, 1006-2. Driving the pressure pump 2004-1 can circulate the ink between the subtank 2003 and the print head 811 through the ink paths 1006-1, 1006-2. Also by operating the pressure pump 2004-1, the ink in the print head 811 can be pressurized and forcibly discharged through the ink path 1006-1 from the nozzles out into the cap 44 (recovery operation). The ink discharged into the cap 44 can be collected into the subtank 2003 through the ink path 1006-3 by operating the suction pump 2004-2.

[Seventh Embodiment]

FIG. 42 through FIG. 50 represent a seventh embodiment of this invention.

As described above, the information processing device 100 generates print data (divided print data) to be allotted to the respective print modules according to the number of print modules 166-1 to 116-*n* and their positional relationship, and transfers the generated print data to the associated print modules 166-1 to 116-*n*. So, the information processing device 100 needs to recognize the mounting position of each print module connected.

In this embodiment, as described later, the information processing device 100 has stored in memory the information on the mounting position of each print module 116 (166-1 to 116-*n*) as their identity information. The position information may be stored in an EEPROM 814 (see FIG. 3) in the print module 116. The EEPROM 814 may be installed on the engine printed circuit board 1003 in the print unit Y1 of FIG. 40A.

In printing an image, the information processing device 100 reads the mounting position information (identity information) of the print modules 166-1 to 116-*n* connected to it through the communication interface 109. Next, based on the position information thus read, the information processing device 100 recognizes the positional relation among the print modules 166-1 to 116-*n*. It further determines the number of print modules (i.e., the number of divisions in which one print medium page of image is divided), generates print data and performs a print data dividing operation (allocation of divided print data to the associated print modules). It then transfers the print data to the associated print modules 166-1 to 116-*n*.

Figure 42:
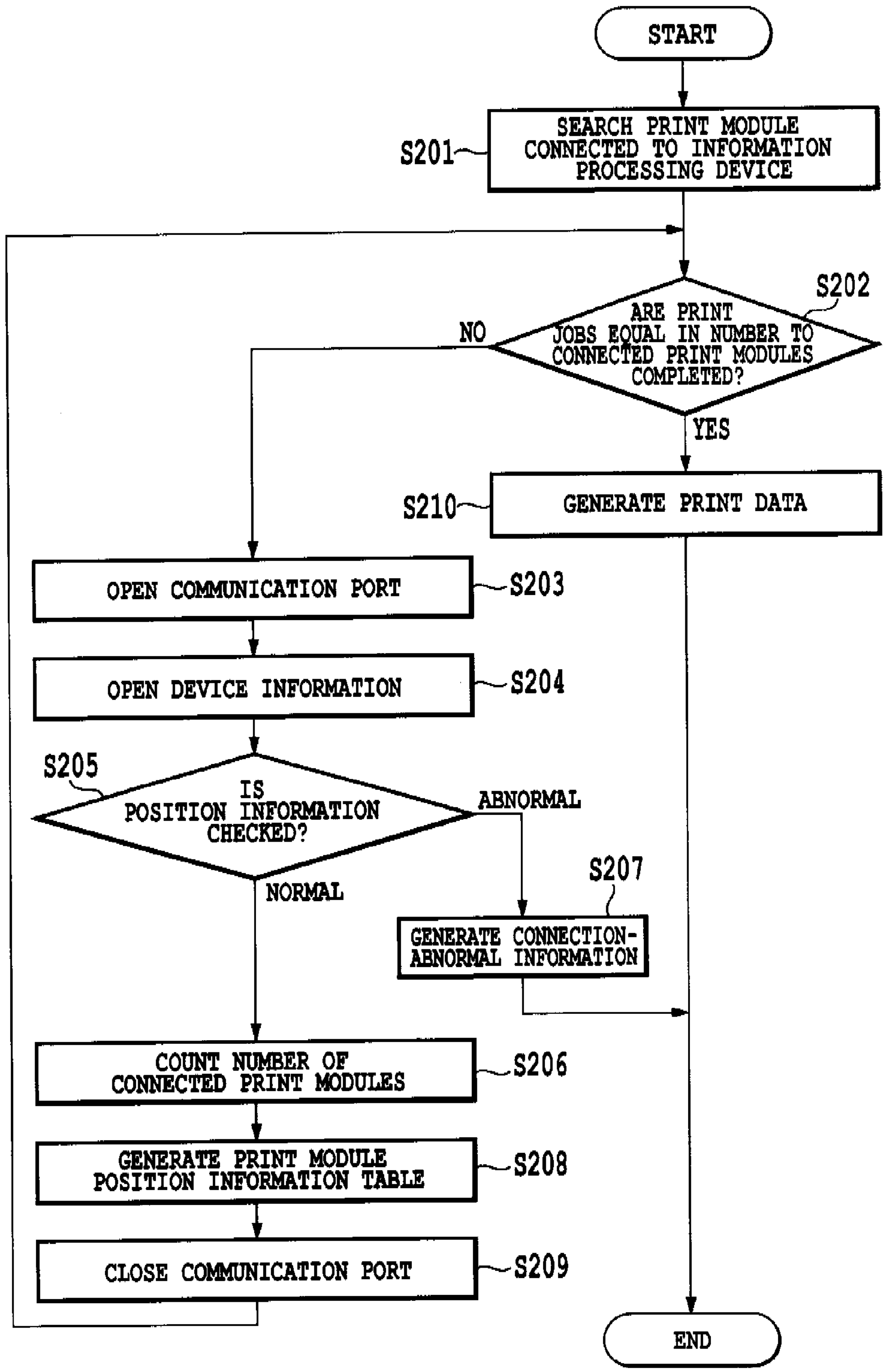
FIG. 42 is a flow chart showing detection processing executed by an information processing device in a seventh embodiment of this invention.

FIG. 42 is a flow chart explaining a print module recognition operation executed by the information processing device 100. According to its print program, the information processing device 100 reads the position information from the print modules 166-1 to 116-*n* and, based on the position information, recognizes the positional relation among the print modules 166-1 to 116-*n*. At the same time, it also recognizes the number of print modules (i.e., the number of divisions in which one page of image is to be divided).

When the print program in the information processing device 100 (e.g., printer driver) is run, it successively searches the print modules 166-1 to 116-*n* connected to communication ports (connection ports) of the information processing device 100 via the communication interface 101 (step S201). The information processing device 100 can have a plurality of communication ports for one-to-one connection with the print modules.

Next, according to the number of print modules connected to the information processing device 100 found by the search, the processing described later is repeated (step S202). That is, whether the processing described later is completed is checked the same number of times as the number of print modules connected. If the processing of interest is not yet completed, it moves to step S203. If the processing is found completed, the processing of FIG. 42 is ended.

First, the communication port corresponding to a print module to be searched is opened (step S203). Next, device information (identity information including position information) unique to the print module is acquired and then stored in the RAM 103 (see FIG. 1) (step 204).

Figure 43:
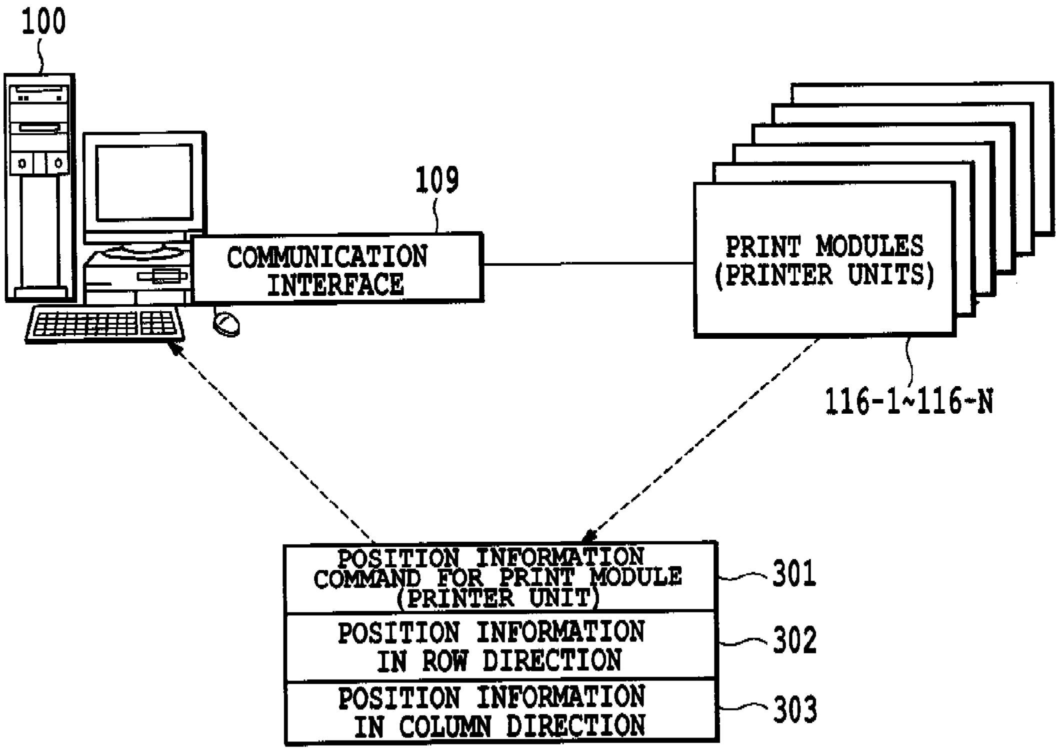
FIG. 43 is a diagram showing an example configuration of position information in the seventh embodiment of this invention.

FIG. 43 shows an example configuration of position information contained in the device information unique to the print module. The position information in this example includes a print module position information command 301, row direction position information 302 and column direction information 303.

Figures 49A, 49B, 49C:
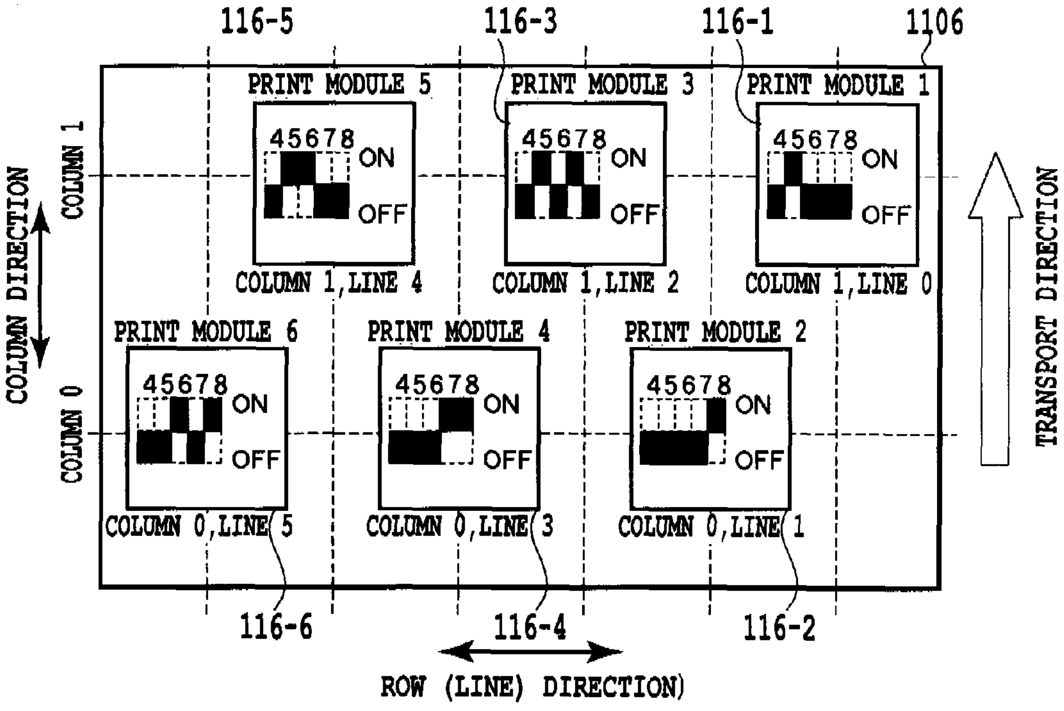
FIG. 49A is a diagram for illustrating a method of setting the print module position information in the seventh embodiment of this invention.
FIG. 49B is a diagram for illustrating a method of setting the print module position information in the seventh embodiment of this invention.
FIG. 49C is a diagram for illustrating a method of setting the print module position information in the seventh embodiment of this invention.

The print module, as shown in FIG. 49C, may be mounted at any desired position in a print module mounting area 1106. The print module mounting area 1106 is an area defined by a print medium transport direction and a direction perpendicular to the first direction. Normally, the print module mounting area 1106 is comprised of sectioned areas that match the size of the print modules. The sectioned areas are defined in a row direction (a direction perpendicular to the print medium transport direction (hereinafter referred to as a line direction)) and in a column direction (the print medium transport direction). Therefore, the user can mount a print module at any desired sectioned area. In FIG. 49C, the print modules 166-1 to 116-6 are placed one in each of the six sectioned areas. These print modules 166-1 to 116-6 are each connected to one of a plurality of communication ports in the information processing device 100. As described later, by reading the identity information from a print module, the print module can be matched to the communication port it is connected to.

If the print module mounting area 1106 is allowed to accommodate up to six print modules in the line direction and up to two print modules in the medium transport direction, for example, it follows that this print module mounting area 1106 comprises a total of 12 sectioned areas in 6 lines and 2 columns. If the print module is constructed of the print unit Y1 and the ink supply unit Y2, as shown in FIG. 39, the print module mounting area 1106 is divided into a plurality of sectioned areas according to the size of the print unit Y1. In that case, these sectioned areas are mounted with the print unit Y1 forming the print module and the position information of the print head of the print unit Y1 constitutes the position information of the print module.

The row direction position information 302 and the column direction information 303 in FIG. 43 correspond to a row number and a column number of the sectioned area where the print module is mounted. The method of setting these information 302, 303 will be explained later.

In the example of FIG. 49C, print modules are arranged in a staggered configuration. This arrangement is adopted because the following considerations are taken. Physically, a plurality of print modules may be arranged straight in the line direction.

If a plurality of print modules are arranged straight in the line direction, the thickness of a case of each print module makes it impossible to array the print heads 811 in the print modules adjoining in the line direction continuously without a gap. As a result, an area where an image is not printed (blank area) occurs between the print modules adjoining in the line direction. In this example, to prevent such a blank area to be formed, a plurality of print modules are arranged staggered as shown in FIG. 49C. However, the arrangement of the multiple print modules can be set arbitrarily as required.

In this embodiment, to enable such a staggered arrangement of the print modules, the print module mounting area 1106 are divided into a plurality of sectioned areas. As the position information of the print modules arranged in a staggered configuration, this embodiment defines the row direction position information 302 and the column direction information 303 in FIG. 43. Therefore, the information processing device 100, based on these information 302, 303, can recognize the positions of the print modules 166-1 to 116-6 arranged staggered as shown in FIG. 49C.

In this embodiment, the mounting position of the print module in the print module mounting area 1106 is defined by a row and a column. However, the method of defining the print module mounting position is not limited to this. For example, if the entire print module mounting area 1106 is defined as an coordinate area (by XY coordinates) and a print module is put in that coordinate area, XY coordinates of the coordinate area where a particular portion of the print module (e.g., a center of gravity of the print module) is situated may be taken as the position information of the print module. If, as shown in FIG. 39, the print module is constructed of the print unit Y1 and the ink supply unit Y2, the XY coordinates of a coordinate area where a particular portion of the print unit Y1 (e.g., a center of gravity of the print unit Y1) is located can be taken as the position information of the print module.

Let us return to FIG. 42.

After the device information of the print module including the position information has been acquired in step S204, step S205 checks the position information. For example, it is checked whether a print module having the same position information already exists. During this check, a communication error check is also made.

Figure 44:
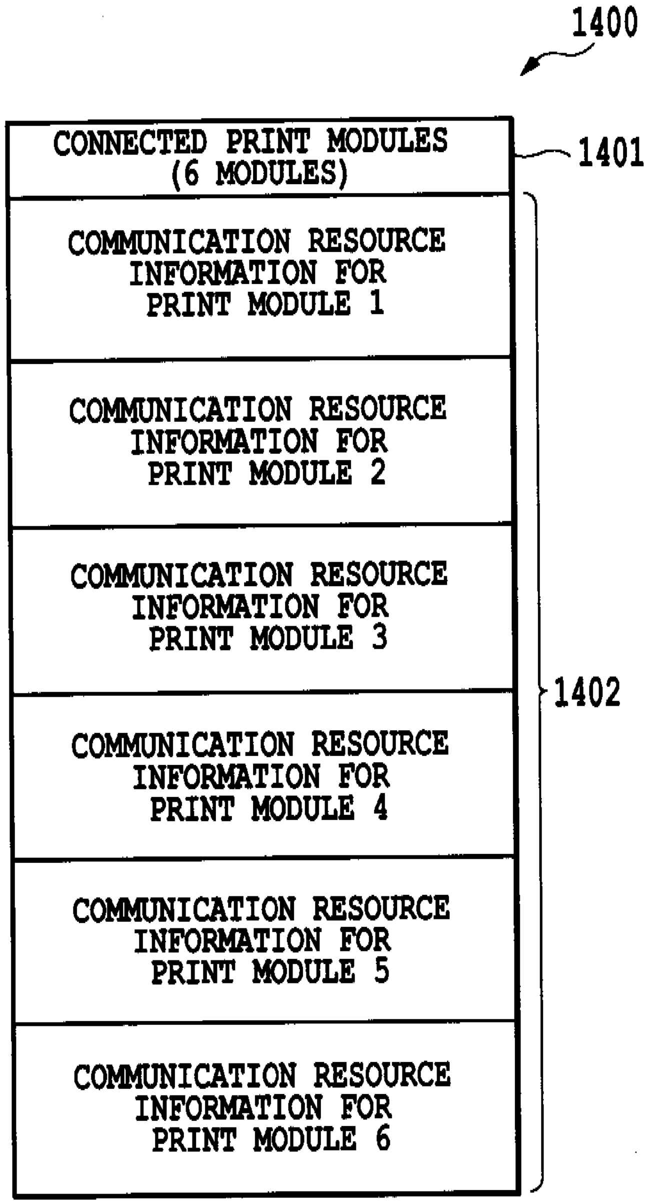
FIG. 44 is a diagram showing an example structure of a print module position information table in the seventh embodiment of this invention.

If the check result is normal, the number of print modules connected to the information processing device 100 is counted up and the count value is stored in the RAM 103 (see FIG. 1) (step S206). Next, a print module position information table 1400 of FIG. 44 is created (step S208). The print module position information table 1400 includes print module position information and print module communication resource information (port identity, port name, port symbol name, etc.). This table 1400 provides the association between the communication ports and the print modules connected to them. Thus, the information processing device 100, when it communicates with a particular print module, needs only to communicate through the communication port to which the print module of interest is connected.

The print module position information table 1400 in this example comprises a field 1401 by which to manage the number of print modules connected to the information processing device 100 and a field 1402 by which to manage the print module communication resource information. The print module position information table 1400 in FIG. 44 is created when six print modules 1-6 are mounted as shown in FIG. 49C.

In the field 1402, the communication resource information of each print module is sorted and generated according to the print module position information so that print data divided for each print module can easily be transferred to the associated print module. In the field 1401 at the head of the print module position information table 1400, the number of print modules currently connected to the information processing device 100 is stored.

The print module position information table 1400 is stored and managed in the RAM 103 (FIG. 1).

Let us turn to FIG. 42 again.

After creating the position information table 1400 for the print module for which the device information was acquired in step S208, the communication port of that print module is closed (step S209). Then, in step S202 again, the processing proceeds to the next print module.

When the check in step S205 finds an anomaly, information representing abnormal connection is generated (step S207). Then, the processing of FIG. 42 is aborted and, based on the abnormal connection information, warning information such as an error is indicated on the display 1008.

When the processing of FIG. 42 ends normally, the program references the created print module position information table 1400 and generates print data corresponding to the print modules. The print data is data of an image to be printed which is to be divided and allocated to the print modules for printing. That is, as described earlier, from the print data of an image, divided print data for the individual print modules are generated. Then, the divided print data is associated with the print module communication resource information managed by the print module position information table 1400 and stored in the RAM 103 (FIG. 1).

Figure 45:
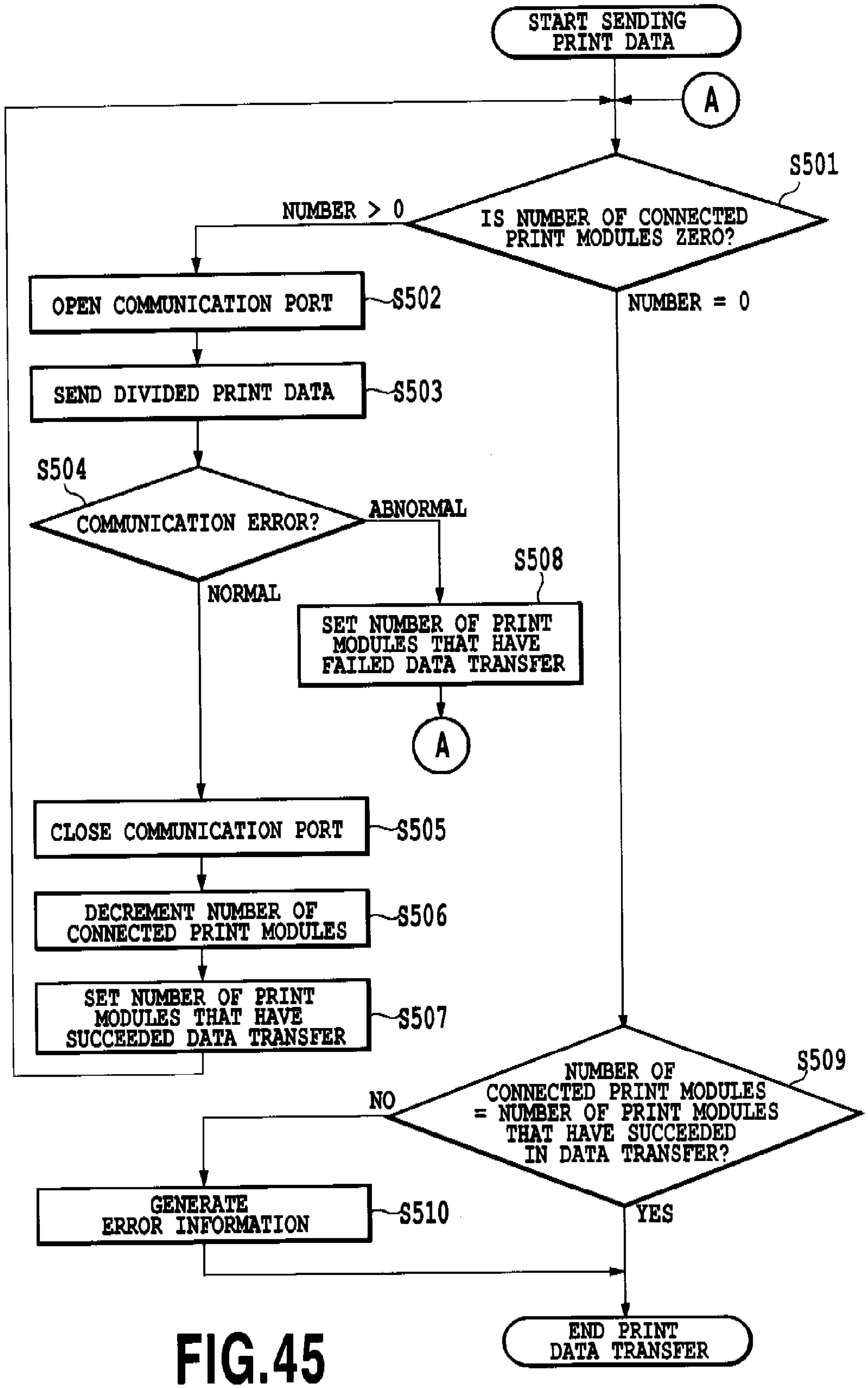
FIG. 45 is a flow chart showing transfer processing executed by the information processing device in the seventh embodiment of this invention.

Next, by referring to FIG. 45, the print data transfer operation performed by the information processing device 100 will be explained. FIG. 45 is a flow chart showing the processing of transferring the print data to the associated print module according to the print program of the information processing device 100. In the following explanation, a case where the print modules are mounted as shown in FIG. 49C is taken for example.

When a user gives an instruction to the information processing device 100 to start transferring print data, the program references the number of connected print modules stored in the field 1401 of the print module position information table 1400 and repeats the following processing the same number of times as the number of print modules (step S501). In the repetitive processing, the print module position information table 1400 is referenced and the processing is executed repetitively in the order of the print modules that conforms to the order in which the communication resource information is stored in the print module position information table 1400.

Next, the communication resource information 1402 (port identity, port name, port symbol name, etc.) in the print module position information table 1400 is referenced and a communication port of the print module to which the divided print data is to be transferred is opened (step S502). Next, the divided print data created for that print module is transferred to the print module via the communication interface 101 (step S503).

Next, a check is made as to whether the data transfer has been normally executed (step S504). If the data transfer is normally ended, a communication port of the print module of interest is closed (step S505). Then, the number of print modules connected to the information processing device 100 is decremented (step S506). That is, each time the counter counts up the repetitive data transfer operation performed, the number of connected print modules is decremented. Then, the number of print modules to which data has been successfully transferred is set in the RAM 103 (FIG. 1) (step S507). The number of print modules with successful data transfer is incremented by step S507 each time the number of connected print modules is decremented by step S506.

If a communication error is detected in step S504, the data transfer fails. In that case, the number of print modules that failed the data transfer is set in the RAM 103 (FIG. 1) (step S508). The number of print modules that failed the data transfer is incremented by step S508 each time a communication error is detected by step S504.

The above processing is repeated until the data transfer to all the print modules 166-1 to 116-6 is complete. When all data transfers are finished, a check is made as to whether the number of print modules connected to the information processing device 100 is equal to the number of print modules with successful data transfer (step S509).

If the two numbers are equal, step S509 decides that the data transfer has been successfully completed with all the print modules 166-1 to 116-6 and ends this processing.

If these numbers do not agree, it is decided that print modules exist that failed the data transfer and error information indicating this fact is generated and shown on the display 1008. If, in this example which has six print modules 166-1 to 116-6 connected, the data transfer fails with one of the print modules, error information is displayed.

In the example of FIG. 45, as described above, the data transfer operation is repeated the same number of times as the number of connected print modules. However, when a communication error occurs with the print module of interest being subjected to the data transfer processing, the operation of FIG. 45 may be ended by showing the error information on the display 108 (FIG. 1).

Figure 46:
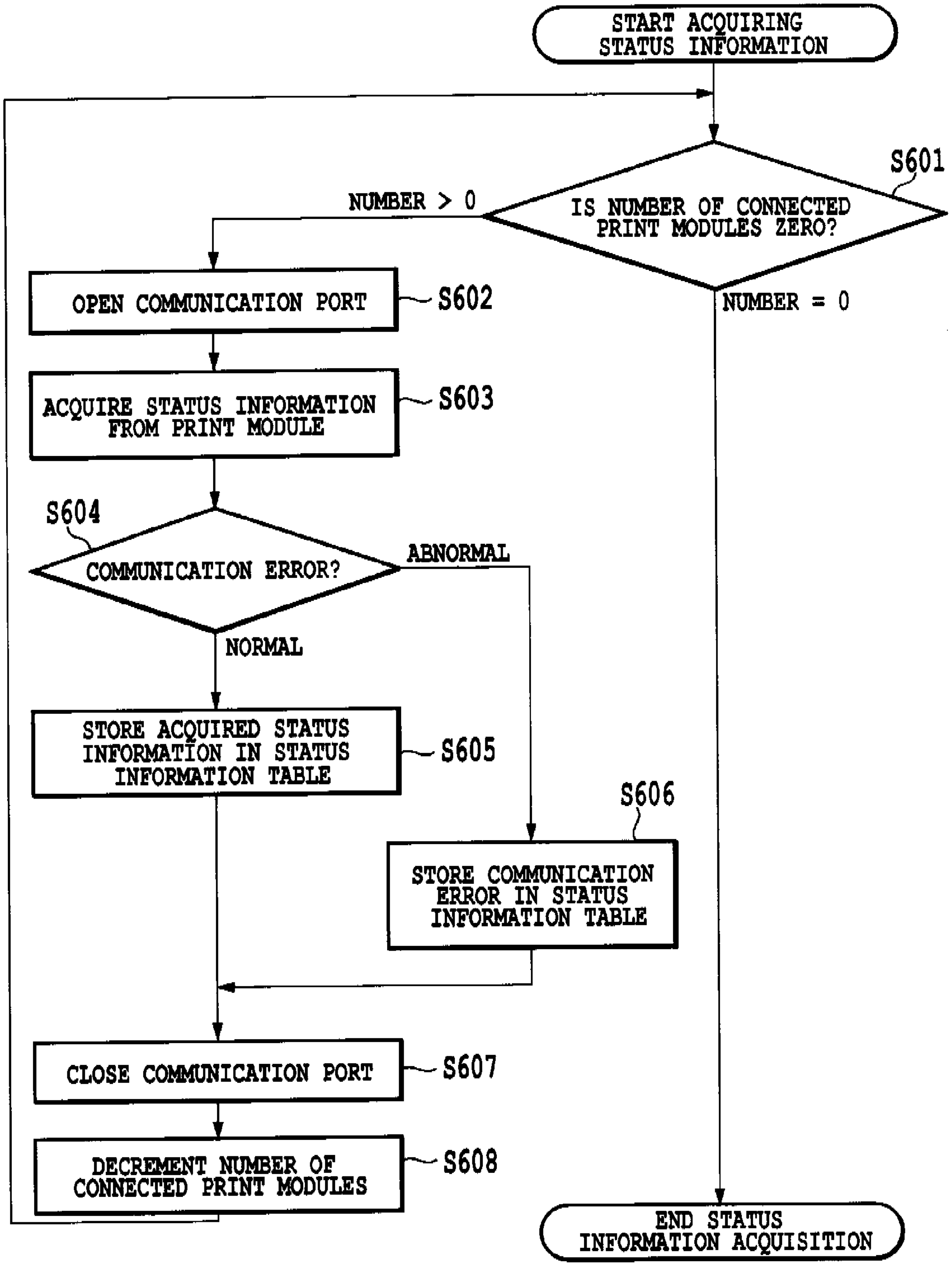
FIG. 46 is a flow chart showing monitoring processing executed by the information processing device in the seventh embodiment of this invention.

FIG. 46 is a flow chart showing a monitoring operation executed by the information processing device 100, namely the operation of monitoring the status information of the print modules connected to the information processing device 100. In FIG. 46, according to the print program of the information processing device 100, the status information (operation status, error information, etc.) of the print modules connected to the device 100 is monitored. In the following explanation, a case where the print modules are mounted as shown in FIG. 49C is taken for example.

The processing shown in FIG. 46 is executed periodically at regular intervals by the print programs of the information processing device 100.

First, the number of connected print modules stored in the field 1401 of the print module position information table 1400 is referenced and the following operation is repeated the same number of times as the number of connected print modules (step S601). The repetitive processing is executed in the order of the print modules that conforms to the order in which the communication resource information is stored in the print module position information table 1400.

Next, the communication resource information 402 in the print module position information table 1400 of FIG. 44 (port identity, port name, port symbol name, etc.) is referenced and a communication port of the print module to be monitored is opened (step S602). Then, the status information is retrieved from the print module of interest (step S603).

Next, a check is made to see if the status information is normally acquired (step S604). If the status information is normally acquired, the status information obtained is set in the status information table 1700 of FIG. 47 (step S605). If the status information fails to be acquired normally, communication error information is set in the status information table 1700 of FIG. 47 so as to determine which print module the communication failed to be established with (step S606).

Next, the communication port of the print module of interest is closed (step S607). Then the number of print modules connected to the information processing device 100 is decremented (step S608). That is, the number of connected print modules is decremented each time the counter counts up the execution of the monitor operation.

The above process is repeated until the monitor operation is complete with all the print modules 166-1 to 116-6. Then, the process of FIG. 46 is ended.

Figure 47:
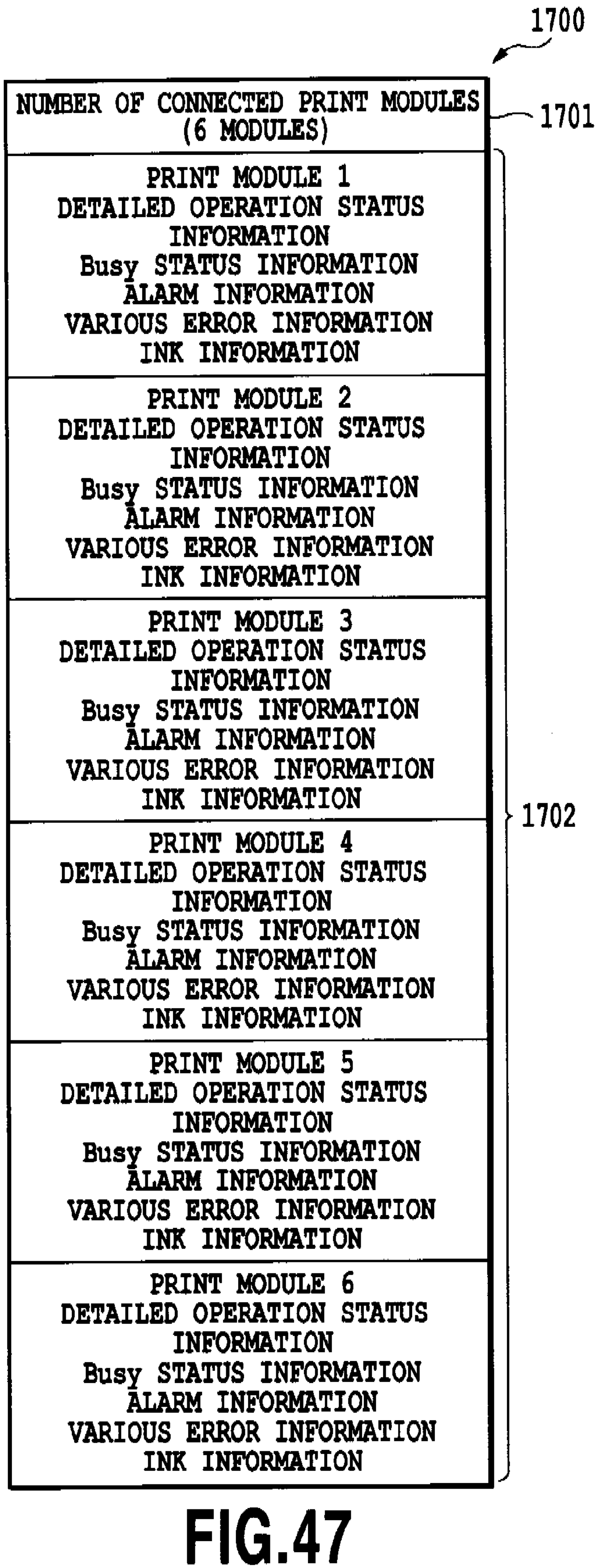
FIG. 47 is a diagram showing an example structure of status information in the seventh embodiment of this invention.

Next, the structure of the status information table 1700 of FIG. 47 will be explained.

The status information table 1700 of this example comprises a field 1701 to manage the number of print modules connected to the information processing device 100 and a field 1702 to manage the status information of the print modules. The status information includes detailed operation status information, warning information, various error information and ink information.

Figure 48:
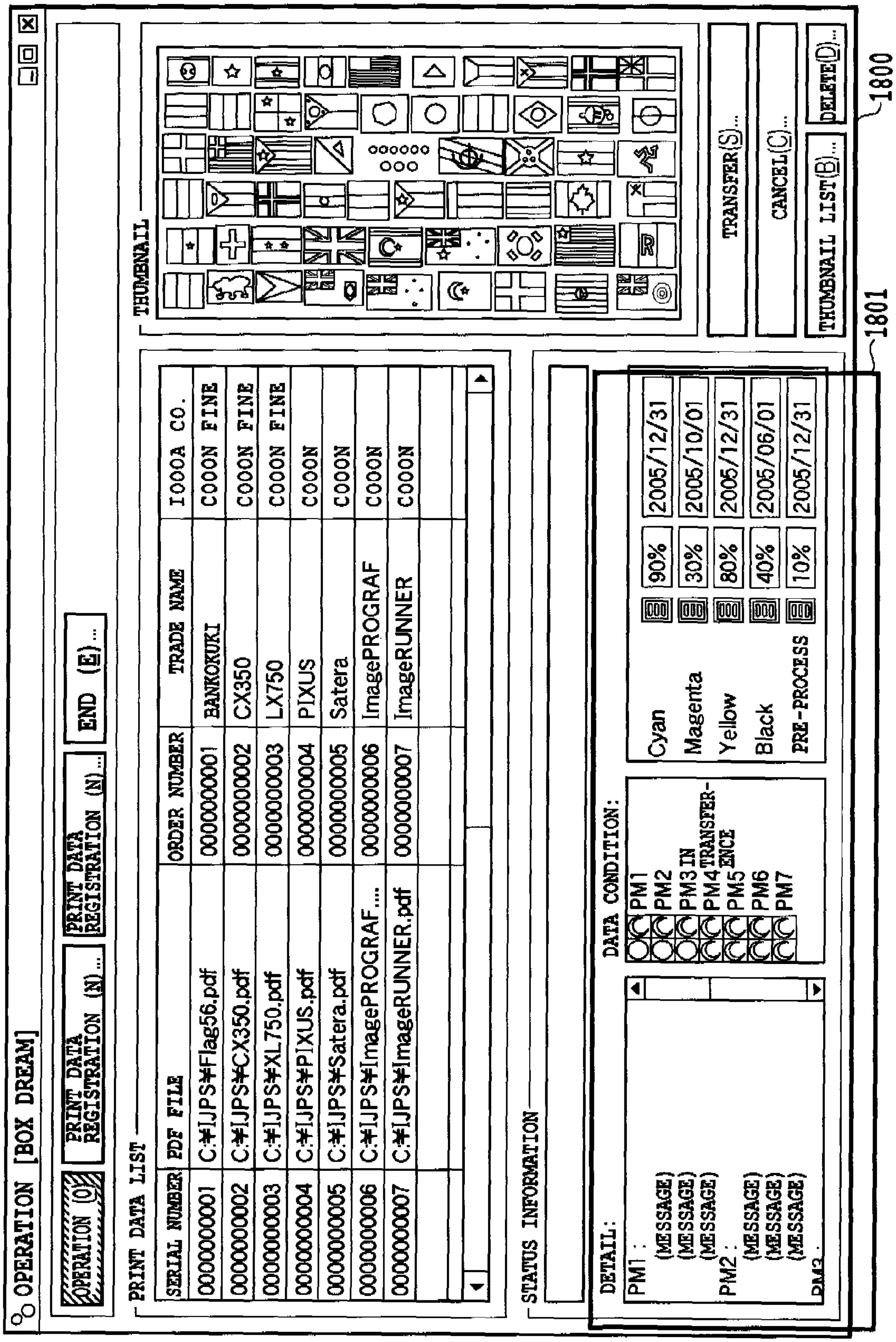
FIG. 48 is a diagram showing an example operation screen in the seventh embodiment of this invention.

By referring to the status information, the print program that runs on the information processing device 100 can display the status of the print modules in a status display area 1801 on a print operation screen 1800, as shown in FIG. 48. The print operation screen 1800 is displayed on the display 108 by the user starting the print program using mouse 115 or keyboard 114. Alternatively, the print program may reside in the information processing device 100 so that, when the print module status information is updated, it can automatically display the print operation screen 1800.

In the status information table 1700 of this example, the status information of each print module is sorted and displayed in the same order as in the print module position information table 1400 of FIG. 44.

The status information table 1700 manages the status information 1702 for each print module. This makes it easy to display the state of each print module, the state of data (data reception state) and ink information (remaining ink volume/useful period) in the status display area 1801 of FIG. 48.

Therefore, the user or serviceman can easily identify the print module in trouble by referring to the operation screen offered by the print program of the information processing device 100.

Next, referring to FIG. 49A, FIG. 49B and FIG. 49C, the method of setting the print module position information will be explained.

The print modules 166-1 to 116-6 of FIG. 49C each have DIP switches SW4-SW8 for setting the position information. When the print module is constructed of the print unit Y1 and the ink supply unit Y2, as shown in FIG. 39, the DIP switches SW4-SW8 may be installed in at least one of the units Y1, Y2.

The user may mount the print module at any desired position in the print module mounting area 1106 and connect it to a desired communication port of the information processing device 100. Then the user manipulates the DIP switches SW4-SW8 on or off to set the row number and the column number as the print module position information.

In FIGS. 49A-49C, denoted 1901 is an example setting of the column information (column number) by operating the DIP switches SW4-SW8 on or off. Reference number 1902 represents an example setting of the row information (row number) by operating the DIP switches SW4-SW8 on or off. FIG. 49C shows an example setting of the position information when a print medium is printed by six print modules 166-1 to 116-6 mounted in the print module mounting area 1106.

When the print modules are installed to construct the print system of this embodiment, the installer such as serviceman sets the position information for each print module using DIP switches SW4-SW8, as shown in FIG. 49C. After the print modules are installed, when the user uses the print system of this embodiment, the information processing device 100 acquires the position information of the print modules 166-1 to 116-6 by executing the processing of FIG. 42. Then the information processing device 100 can recognize the mounted position of each print module, transfer data to them and acquire status information from them.

In this embodiment, the position information of the print module is set using switches (DIP switches). The setting of the position information is not limited to this method. For example, other switches, such as jumpers, may be used instead of DIP switches.

Another method may involve, for instance, mounting a nonvolatile memory such as EEPROM in each print module beforehand and having a serviceman or other person set the position information in the nonvolatile memory when he or she installs the print module. Here, the EEPROM is an abbreviation of Electronic Erasable Read Only Memory. The setting of the position information in the nonvolatile memory may be done by using a dedicated terminal that can be connected to the print module or by using an operation unit on the medium transport device 117.

Figure 50:
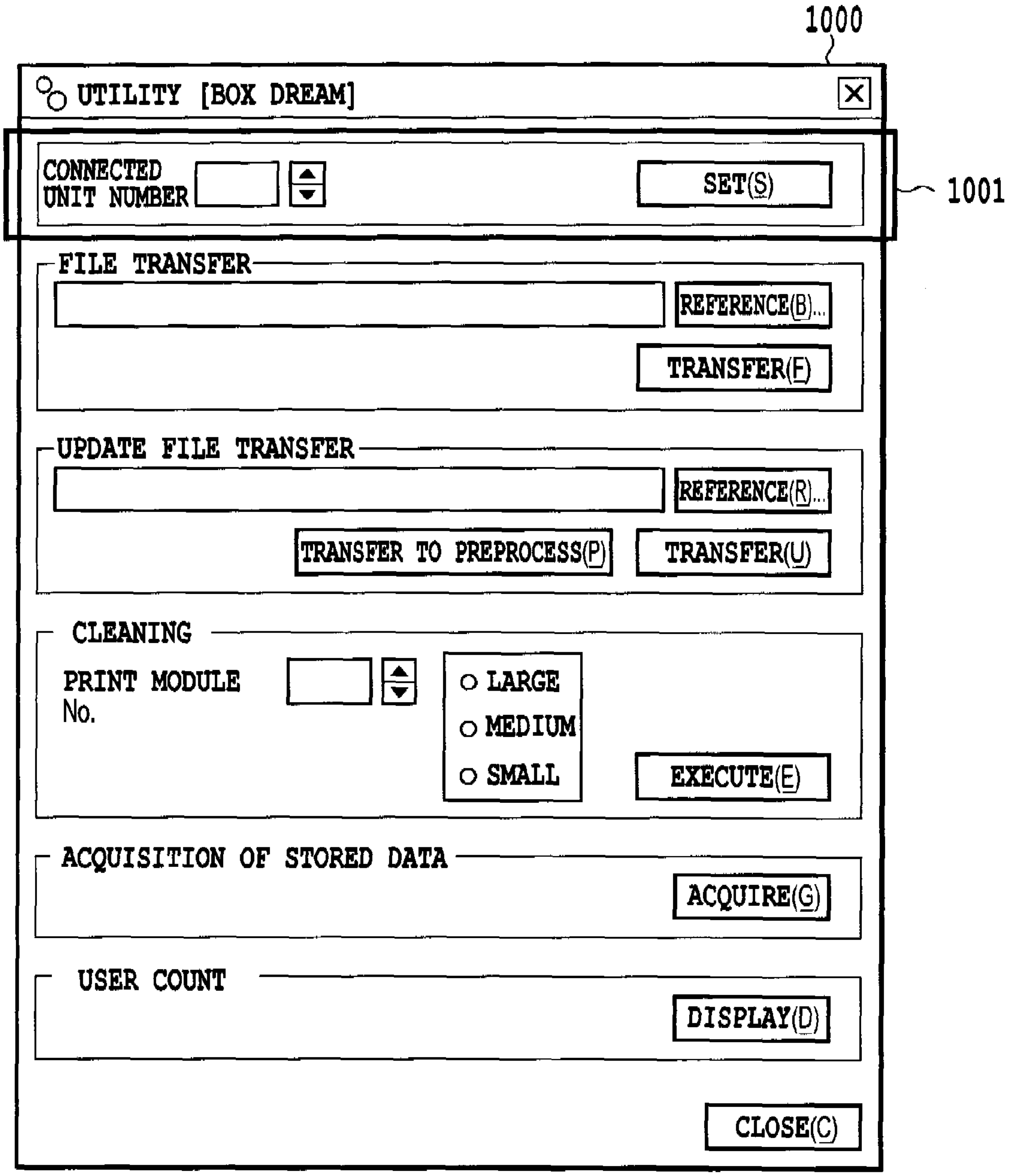
FIG. 50 is a diagram showing an example setting screen in the seventh embodiment of this invention.

Further, after the print modules have been mounted, a setting screen 1000 such as shown in FIG. 50 may be offered by the print program running on the information processing device 100. The setting screen 1000 has a setting field 1001 in which to set the number of connected print modules that are actually mounted.

The provision of such a setting screen 1000 enables the information processing device 100 to compare the number of connected print modules set through the setting screen 1000 and the number of connected print modules that are searched by step S201 of FIG. 42. Based on the result of comparison, the number of print modules actually recognizable by the information processing device 100 can be determined. Further, the information processing device 100 can detect the number of connected print modules and display errors.

In the print system of this embodiment in which the information processing device is connected via the communication interface to a plurality of print modules and in which these print modules cooperate to print on a common print medium (single sheet), the information on the position of each print module on the transport device is acquired. Then, based on the acquired position information, the image to be printed on the print medium is divided and allocated to appropriate print modules.

The divided print data are then transmitted to the associated print modules which in turn print the received print data. Based on the position information acquired from the individual print modules, the print modules are monitored for their status and the monitored status is displayed. This provides a printing environment with good operability and maintainability.

In this embodiment, the information processing device is provided with a plurality of communication ports, each of which is connected with one print module. Based on the identity information assigned to the individual print modules, the print modules are associated with the communication ports. Alternatively, the communication paths between the information processing device and the multiple print modules may be replaced with a common bus connection. In that case, too, the information processing device can recognize the individual print modules based on the identity information set in the print modules and therefore establish communication to and from each of the print modules. For example, by attaching data corresponding to the identity information of the print modules to the communication data (including print data) between the information processing device and the print modules, the communication data can be associated with the print modules. Each of the print modules can receive the communication data attached with data corresponding to its identity information.

[Eighth Embodiment]

Figure 51:
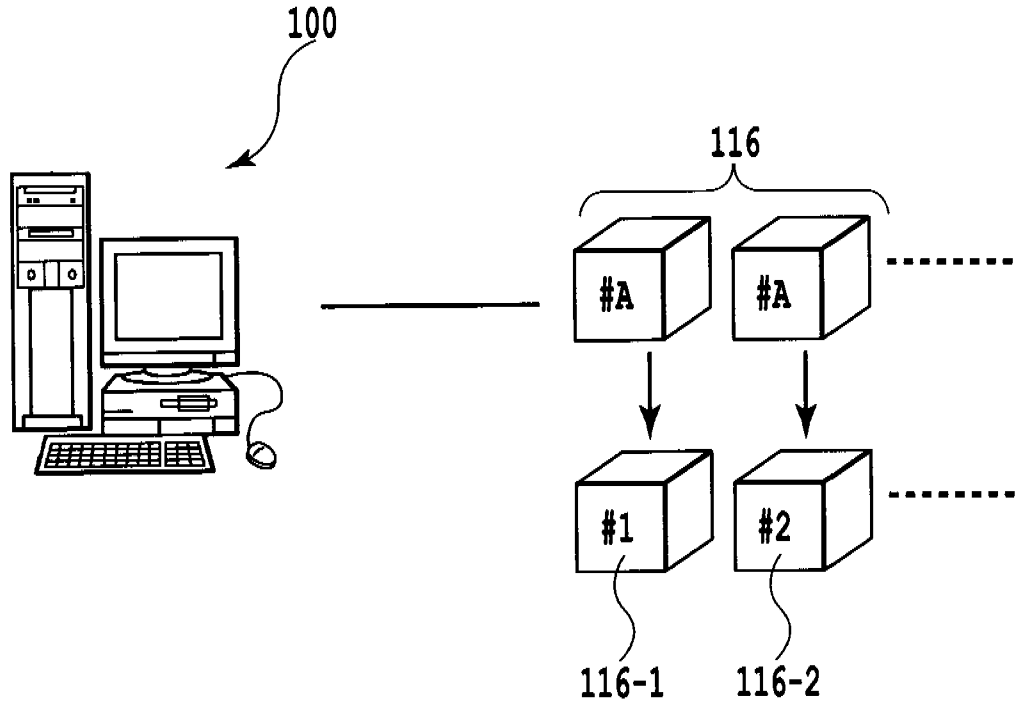
FIG. 51 is an explanatory diagram showing an essential part of the system in an eighth embodiment of this invention.

FIG. 51 illustrates an eighth embodiment of this invention. In this embodiment, a program running on the information processing device 100 sets the position information in the EEPROM in the print module 116. When a print module is constructed of the print unit Y1 and the ink supply unit Y2, as shown in FIG. 39, the EEPROM can be installed in one of these units Y1, Y2. For example, the EEPROM may be installed in the engine printed circuit board 1003 in the print unit Y1 of FIG. 40A.

First, at time of shipment of a print module 116, a type of the print module 116 is set as its identity information in an EEPROM in the print module 116 by using the information processing device 100 or other personal computer. In this example, identity information "type A" is set in the EEPROM of a type-A print module 116. Before or after the identity information setting, a print head recovery operation associated with the print module 116 may be performed. If, at time of the print module shipment, the mounted position of the print module when incorporated into the print system is already determined, the setting of the position information described later may be made.

Then, at a delivery site, a print system including the information processing device 100 and a plurality of print modules 116 is configured, after which a print program running on the information processing device 100 sets the position information of the print modules 116 as their identity information in the EEPROM of the print modules. Before or after the identity information setting, a print head recovery operation associated with the print modules 116 may be performed. As the position information, column information (column number) and row information (row number) can be set, as in the case of the seventh embodiment.

Further, the mounted position of the print module and a number may be matched so that the number can be set as the position information. For example, matching a staggered array pattern of print modules, such as shown in FIG. 49C, to a number (e.g., 1, 2, 3, . . . ) allows the number to be set as the position information. In that case, number 1 corresponds to a print module 116-1 located at row 0 of column 1, number 2 corresponds to a print module 116-2 located at row 1 of column 0, and number 3 corresponds to a print module 116-3 located at row 2 of column 1. If a plurality of print modules are arrayed in series in the transport direction of the print medium, these print modules can cooperate to speed up the printing operation. When a plurality of print modules are arrayed in series as described above, the matching of the arrangement pattern with the number (e.g., 1, 2, 3, . . . ) allows the number to be set as the position information. If the position information is set in this way, a position information setting screen can be used and displayed on a display of the information processing device 100.

The multiple print modules can be arranged arbitrarily, for example, into a staggered pattern or a series pattern. A provision may be made to allow the association between the print module and the number (e.g., 1, 2, 3, . . . ) to be changed according to the arrangement pattern.

As described above, the information processing device 100, after configuring the print system by incorporating a plurality of print modules, sets the position information in the print modules. So, when setting the position information, the print modules can be arranged at any desired positions. It is also possible, when setting the position information, to check whether a print module of interest is of a type that conforms to the print system (e.g., whether "type A" or not). After the position information has been set in a plurality of print modules, the print modules can be identified in connection with their mounted positions, as with the previous embodiment. That is, their position information can be used as identity information.

Therefore, as with the preceding embodiments, print data can be generated according to the number and positions of print modules connected to the information processing device 100 and sent to the corresponding print modules. The information processing device 100 can also exchange information with each of the print modules or monitor their actions.

Further, the print modules making up the print system can be replaced with new print modules, as required. In that case, position information corresponding to its mounted position need only be set in an EEPROM of the new print module. The print modules making up the print system can also be changed in position by setting again the position information in the EEPROM of the print modules.

[Ninth Embodiment]

FIG. 52 to FIG. 61 represent a ninth embodiment of this invention.

Figure 52:
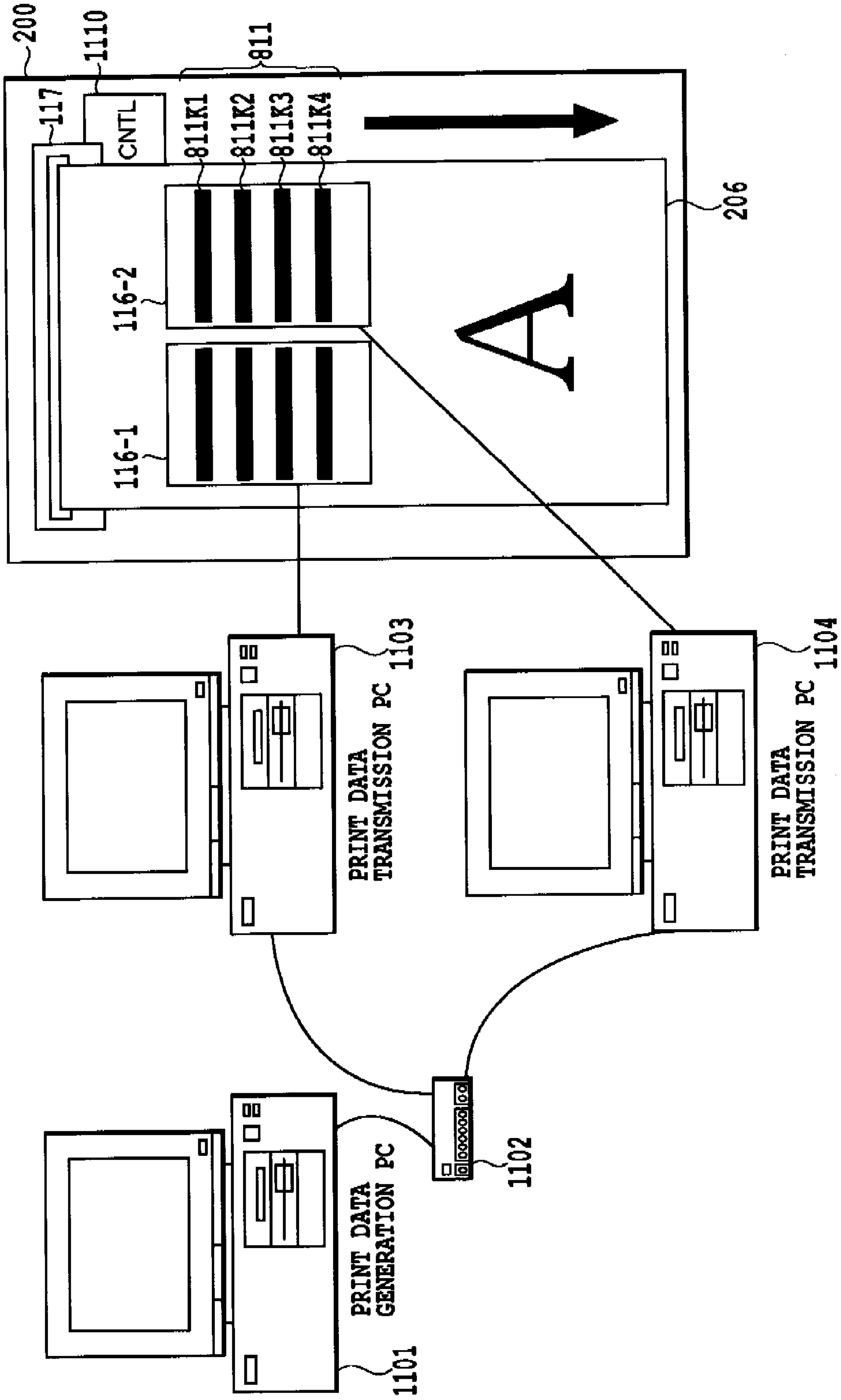
FIG. 52 is a block diagram showing an outline configuration of a print system according to a ninth embodiment of this invention.

FIG. 52 is a schematic configuration diagram of a print system including a plurality of host devices and a plurality of print modules.

The print system of this embodiment includes three personal computers 1101, 1103, 1104 functioning as host devices, a printing apparatus (image forming apparatus) 200 mounting two print modules 116-1, 116-2, and a network hub 1102 interconnecting the three personal computers 1101, 1103, 1104. The print modules 116-1, 116-2 of the printing apparatus 200 have the similar construction and, as in the preceding embodiments, are each provided with an ink jet print head 811.

Of the three PCs, the PC 1101 is used to create print data to be printed by the print modules 116-1, 116-2 and is also called a "print data generation PC". The PC 1103 and 1104 are used to transmit print data to the print modules 116-1, 116-2 and are also called "print data transmission PCs". A communication interface used in the network hub 1102 may include a network cable, a USB cable and a wireless LAN. In this print system, the print data generated by the print data generation PC 1101 is transferred to the print data transmission PC 1103, 1104.

Instead of being three separate PCs, they may be configured into a single PC with the functions of the three PCs. Further, the print system may include four or more PCs and three or more print modules. As with the preceding embodiments, the PC can establish communication with the individual print modules by reading the identity information set in the print modules to identify them.

The print data transmission PCs 1103, 1104 are each connected to the corresponding print modules 116-1, 116-2 through communication interfaces. The communication interface may include a network cable, a USB cable and an IEEE1284. In this example, USB cables are used to transmit print data from the print data transmission PCs 1103, 1104 to the associated print modules 116-1, 116-2. The print modules 116-1, 116-2 individually operate according to the print data received from the corresponding print data transmission PCs 1103, 1104. Therefore, the print modules 116-1, 116-2 are each provided with a communication interface to receive print data from the associated print data transmission PCs 1103, 1104.

The print data generation PC 1101 creates print data to be printed by the print module 116-1 and print data to be printed by the print module 116-2 and sends these print data to the print data transmission PCs 1103, 1104. That is, as with the preceding embodiment, the print data to be printed on a print medium is generated separately for the print module 116-1 and for the print module 116-2.

The print modules 116-1, 116-2, as with the preceding embodiments, can be controlled independently of each other based on the image data received from the corresponding print data transmission PCs 1103, 1104.

The printing apparatus 200, as with the preceding embodiments, is provided with a recovery unit (not shown) to assure a stable ink ejection from the print modules 116-1, 116-2. As in the preceding embodiments, the print medium 206 such as print paper is fed to a recording position of the print modules and transported in an arrow direction by the transport unit (transport device) 117.

The operation of the transport unit 117 is controlled by a controller (CNTL) 1110.

In this example, a plurality of independent engines or print modules 116-1, 116-2 are arranged side by side in a direction perpendicular to the transport direction of the print medium 206 (hereinafter referred to as a width direction). The print modules 116-1, 116-2, as in the preceding embodiments, are provided with an ink jet print head (simply referred to as a print head) extending in the width direction of the print medium 206. The print head ejects ink according to image data received from the corresponding print data transmission PCs 1103, 1104. The print data transmission PCs 1103, 1104 send print data to the print modules 116-1, 116-2 according to the transport position of the print medium 206 in synchronism with the operation of the transport unit 117.

Each of the print modules 116-1, 116-2 of this example has four print heads 811K1, 811K2, 811K3, 811K4 (generally referred to as a print head) to eject black inks to form monochromatic images. These four print heads as a whole are generally referred to as a print head 811. As can be seen from FIG. 52, the four print heads installed in each of the print modules 116-1, 116-2 are arranged in the transport direction of the print medium 206. As in the preceding embodiments, each of the print heads has a plurality of nozzles arrayed in the width direction of the print medium 206. These nozzles eject ink according to the print data to form ink dots on the print medium 206.

In this example, the print module 116-1 prints an image in a left-side print area of the print medium 206 in FIG. 52 and the print module 116-2 prints an image in a right-side area of the print medium 206.

Figure 53:
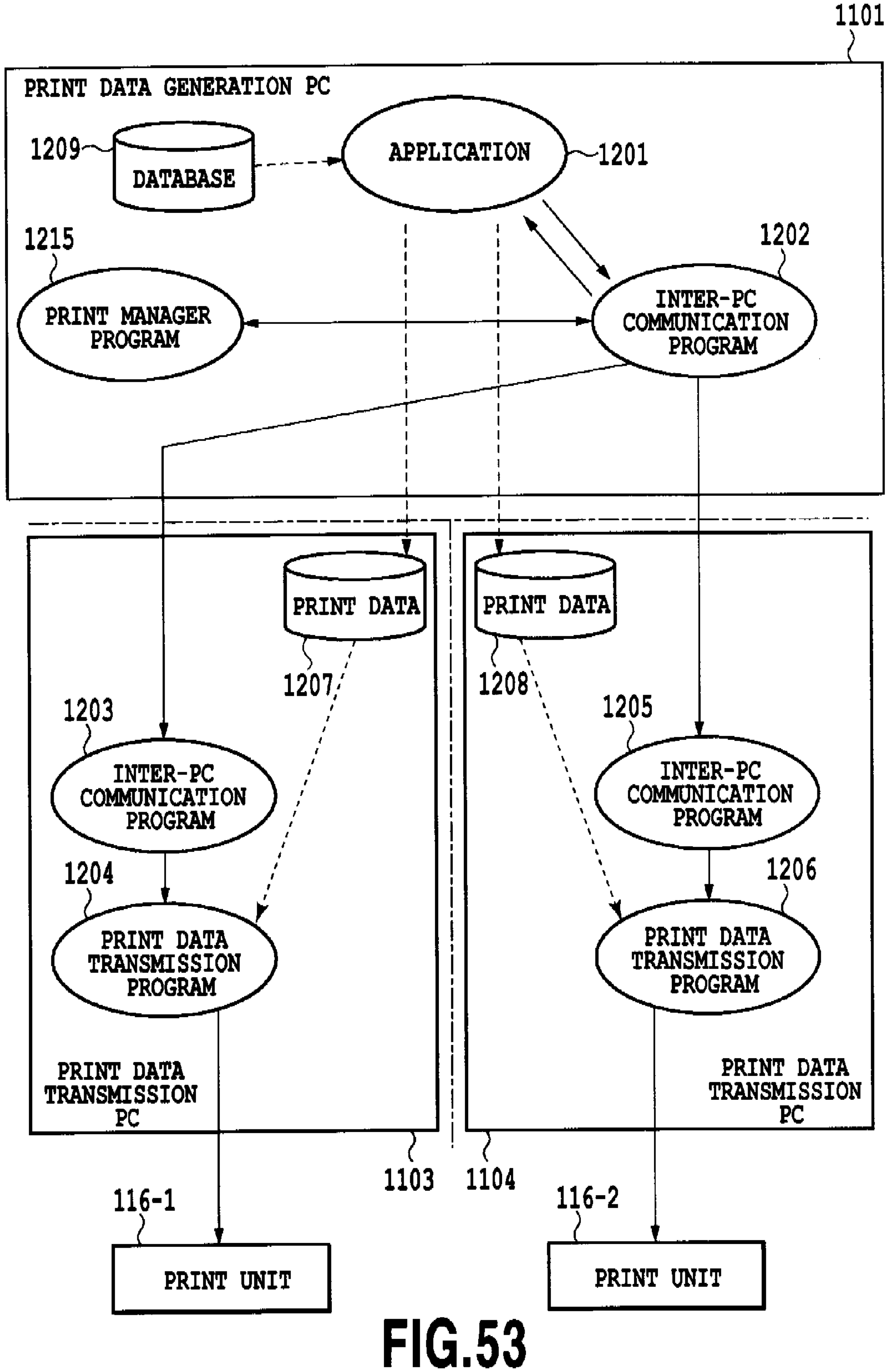
FIG. 53 is a diagram showing a relation among programs when generation and transmission of print data are executed in real time (realtime RIP mode) in a print data generation PC and a print data transmission PC of FIG. 52.

FIG. 53 is a block diagram showing a relationship among programs in the PCs 1101, 1103, 1104 when the generation and transmission of print data are performed in parallel. Parallel execution of the generation and transmission of print data is called a "realtime RIP" operation.

The print data generation PC 1101 runs an application (program) 1201 to lay out the print data, an inter-PC communication program 1202 to establish communication to and from the print data transmission PCs 1103, 1104, and a print manager program 1215 to display the status of the printing apparatus. The print data generation PC 1101 has a database 1209 storing a variety of parameters required to generate print data.

The print data transmission PCs 1103, 1104 run inter-PC communication programs 1203, 1205 and print data transmission programs 1204, 1206. In this example, two print data transmission PCs are used. When three or more print data transmission PCs are used, the similar configuration also applies.

Once the print data generation is started by the application 1201, the application reads parameters necessary for data generation from the database 1209 and begins creating print data in specified areas 1207, 1208 in a memory of the print data transmission PC. The application 1201, after a predetermined volume of print data has been generated, notifies a print data generation end message to the inter-PC communication program 1202. Upon reception of the print data generation end message, the inter-PC communication program 1202 notifies a print data transmission program 1204 that the print data generation is finished. The print data transmission program 1204 transmits the print data stored in a predetermined area 1207 to the print module 116-1.

Similarly, when notified by the inter-PC communication program 1202 of the print data generation end message, the inter-PC communication program 1205 informs the print data transmission program 1206 that the print data generation has ended. The print data transmission program 1206 sends the print data generated by the application 1201 to the print module 116-2.

Thus, the print modules 116-1, 116-2 control the print head according to the print data successively transmitted in the realtime RIP mode.

Figure 54:
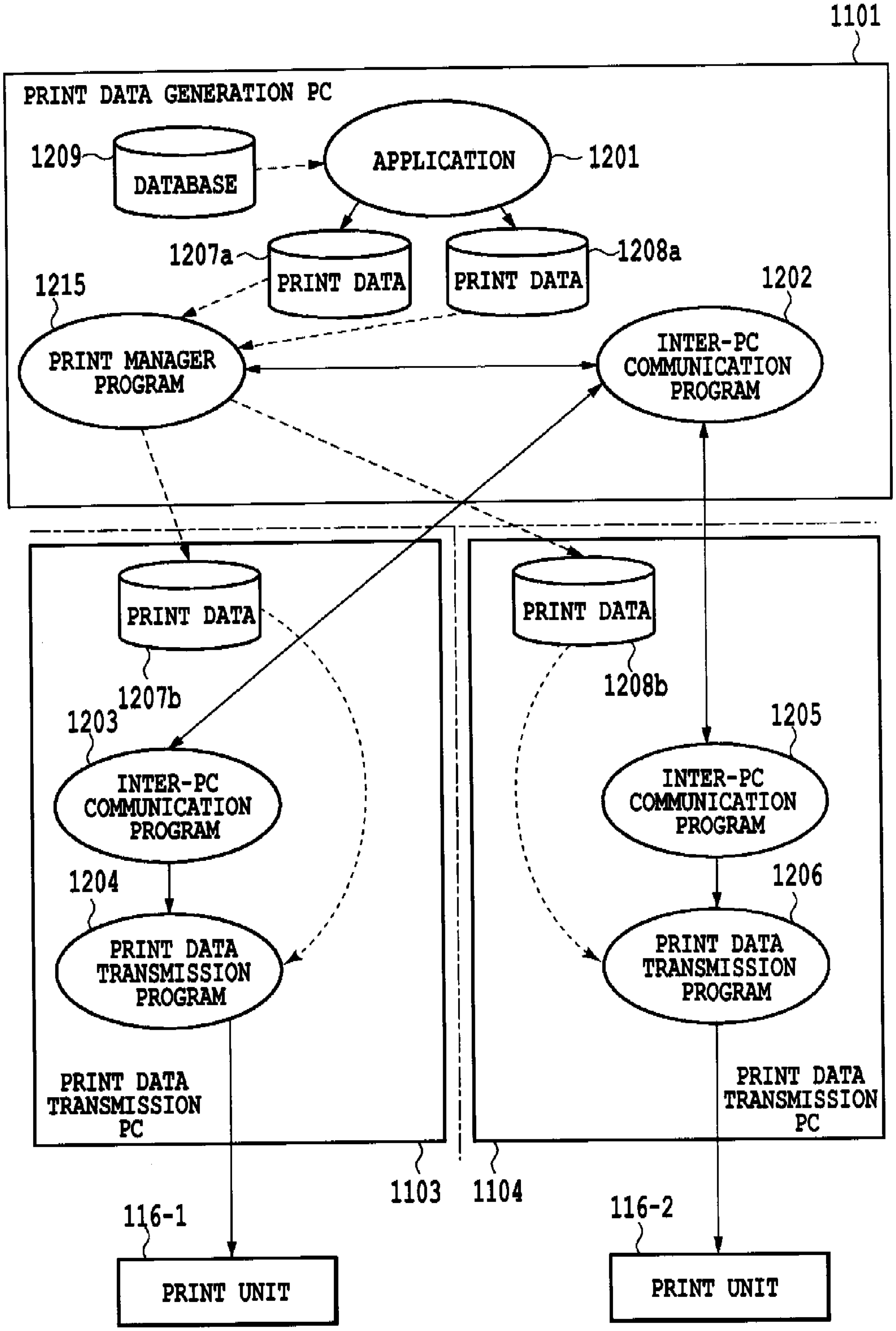
FIG. 54 is a diagram showing relation among programs when generation and transmission of print data are executed in non-real time (pre-RIP mode) in the print data generation PC and the print data transmission PC of FIG. 52.

FIG. 54 is a block diagram showing a relationship among programs in PCs 1101, 1103, 1104 that are run to start sending the print data after the print data has been generated. Transmitting the print data after it has been generated is called a "pre-RIP" operation.

In executing the pre-RIP operation, the application 1201 reads parameters necessary for print data generation from the database 1209, generates all print data to be printed, and stores the print data in predetermined areas 1207*a*, 1208*a* of the memory of the print data generation PC 1101.

Then, the print manager program 1215 reads the print data from the predetermined areas 1207*a*, 1208*a* and copies them to predetermined areas 1207*b*, 1208*b* in the memory of the print data transmission PCs 1103, 1104. With all the copies complete, the print manager program 1215 notifies the inter-PC communication program 1202 that the print data generation is completed.

The inter-PC communication program 1202 notifies each of inter-PC communication programs 1203, 1205 that the print data generation is completed. In response to this notification, the inter-PC communication programs 1203, 1205 each instruct the print data transmission programs 1204, 1206 to start sending the print data. The print data transmission programs 1204, 1206 according to this instruction read the print data from the predetermined areas 1207*b*, 1208*b* and start sending the print data to the print modules 116-1, 116-2.

Therefore, the print modules 116-1, 116-2 control the print head according to the print data transmitted en masse in the pre-RIP mode.

Details of the realtime RIP and pre-RIP operations will be explained by referring to the flow chart.

Print Data Generation Processing

Figure 55:
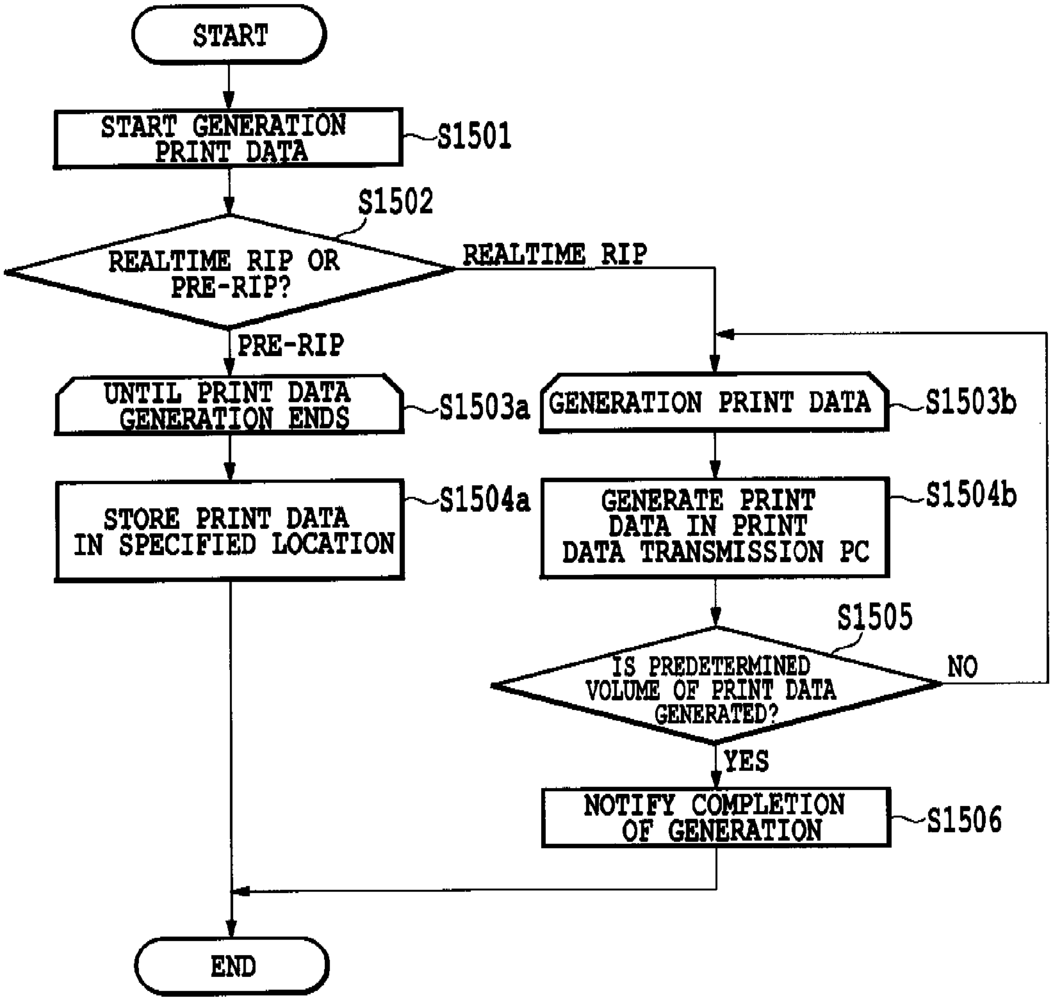
FIG. 55 is a flow chart showing print data generation processing when the application of FIG. 52 is executed.

FIG. 55 is a flow chart showing print data generation processing when the application 1201 is executed.

First, in sep S1501 the generation of print data is started and in step S1502 a check is made as to whether the print data generation is in the realtime RIP or pre-RIP mode. If the pre-RIP mode is selected, the program proceeds to step S1503*a* where it generates all print data required to be printed, based on the information in the database 1209. Then in step S1504*a*, the program stores the generated print data in the predetermined areas 1207*a*, 1208*a* in the memory of the print data generation PC 1101.

If the realtime RIP is found selected, the program proceeds to step S1503*b* where it starts generating the print data according to the information in the database 1209. And then in step S1504*b*, the generated print data is stored in predetermined areas 1207, 1208 of the memory of the print data transmission PCs. Step 1505 checks whether the generated print data has reached a predetermined amount. If the amount of the generated data is less than a predetermined level, the program returns to step S1503*b* where it continues the print data generation. If on the other hand it is decided that the volume of the print data generated has reached the predetermined level, the program proceeds to step S1506, where it notifies the completion of the print data generation to the inter-PC communication program 1202.

Transmission and Reception of Print Data in Realtime RIP Mode

Figure 56:
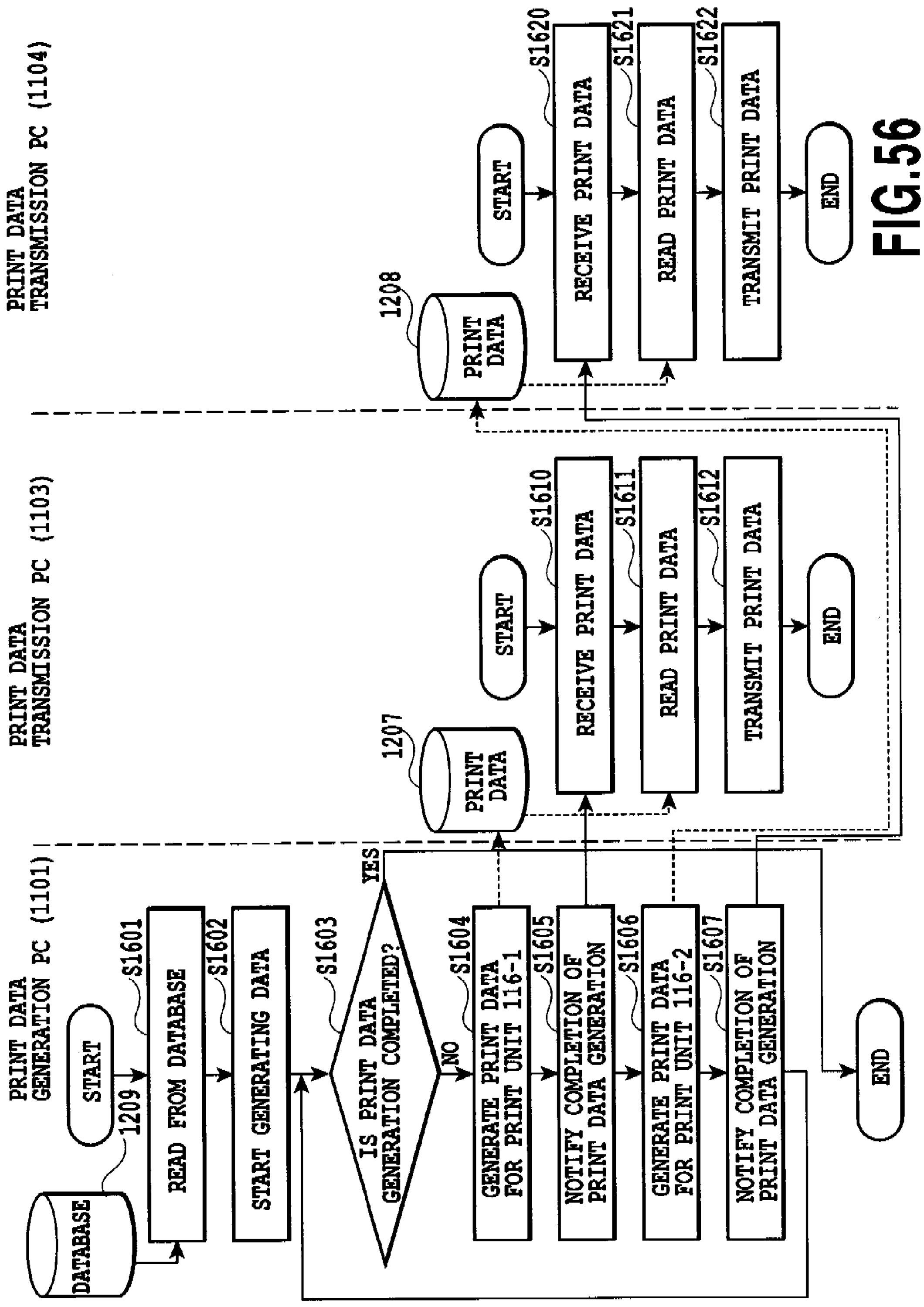
FIG. 56 is a flow chart showing transmission/reception processing executed between the print data generation PC and the print data transmission PC in the realtime RIP mode in the ninth embodiment of this invention.

FIG. 56 is a flow chart showing a transmission and reception operation between the print data generation PC 1101 and the print data transmission PCs 1103, 1104 during the realtime RIP.

As described above, the application 1201 reads information from the database 1209 (step S1601) and, in response to the user instruction, starts generating print data (step S1602).

Unless the print data generation PC 1101 decides at step S1603 that the print data generation is completed, the program proceeds to step S1604. Then, the program generates print data for the print module 116-1 in the predetermined area 1207 used as a work area in the print data transmission PC 1103. After the print data generation ends, step S1605 sends a print data generation completion message to the print data transmission PC 1103. At this time, the application 1201 notifies the print data generation completion to the inter-PC communication program 1202 in the print data generation PC 1101. The inter-PC communication program 1202 notifies the print data transmission PC 1103 of the print data generation completion by a message.

In step S1610 the inter-PC communication program 1203 in the print data transmission PC 1103 receives the print data generation completion message. Then, the inter-PC communication program 1203 notifies the print data transmission program 1204 that the print data generation has ended. The print data transmission program 1204 at step S1611 now reads the print data from the predetermined area 1207 and at step S1612 transmits the print data to the print module 116-1.

Similarly, the print data generation PC 1101 at step S1606 generates print data for the print module 116-2 in the predetermined area 1208 used as a work area in the print data transmission PC 1104. After the print data is generated, the program at step S1607 notifies the print data transmission PC 1104 of the print data generation completion by sending a message. At this time, the application 1201 of the print data generation PC 1101 notifies the print data generation completion to the inter-PC communication program 1202 in the print data generation PC 1101. The inter-PC communication program 1202 then sends a print data generation completion message to the print data transmission PC 1104.

The inter-PC communication program 1205 in the print data transmission PC 1104 at step S1620 receives the print data generation completion message. The inter-PC communication program 1205 then notifies the print data transmission program 1206 of the print data generation completion. The print data transmission program 1206 in step S1621 reads the print data from the predetermined area 1208 and in step S1622 sends the print data to the print module 116-2.

In this process, if the print data generation PC 1101 decides in step S1603 that the print data generation is completed, the processing is ended.

Transmission and Reception of Print Data in Pre-RIP Mode

Figure 57:
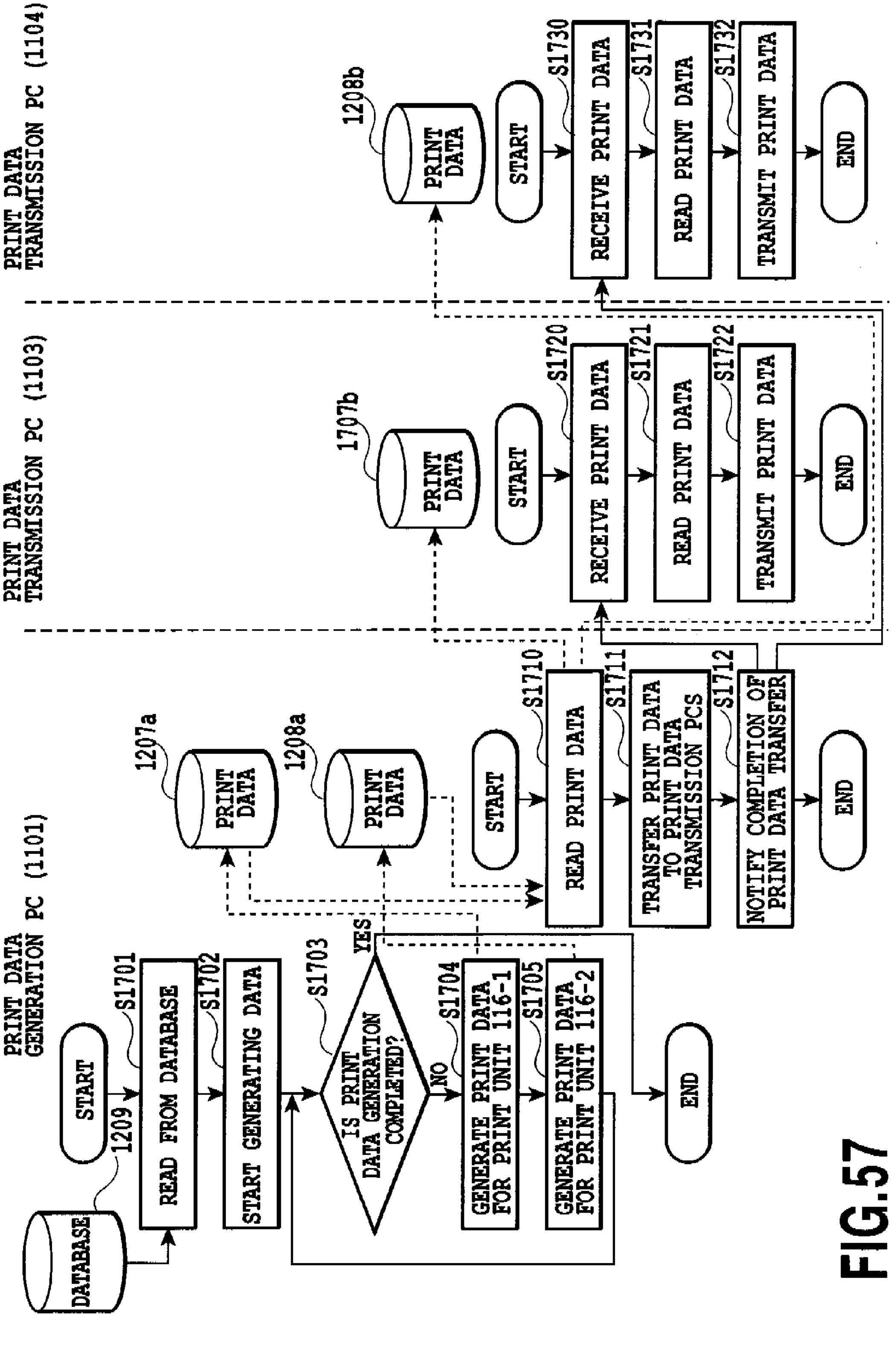
FIG. 57 is a flow chart showing transmission/reception processing executed between the print data generation PC and the print data transmission PC in the pre-RIP mode in the ninth embodiment of this invention.
Figure 58:
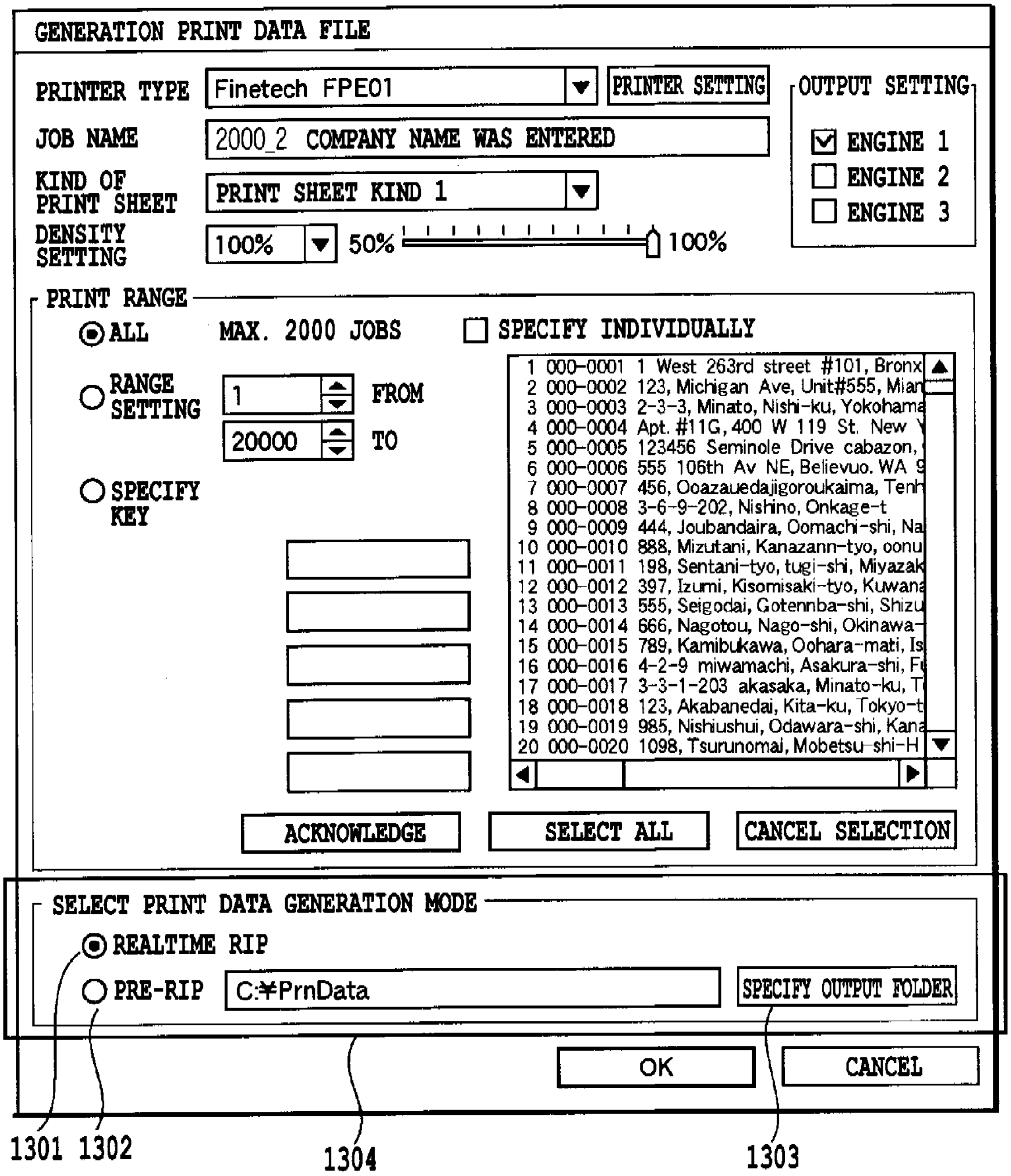
FIG. 58 is a diagram showing a screen for choosing between the realtime RIP mode and the pre-RIP mode in the ninth embodiment of this invention.

FIG. 57 is a flow chart showing a transmission and reception operation between the print data generation PC 1101 and the print data transmission PCs 1103, 1104 during the pre-RIP.

As described above, the application 1201 reads information from the database 1209 (step S1701) and, in response to a user instruction, starts generating print data (step S1702).

Unless the print data generation PC 1101 decides in step S1703 that the print data generation is completed, the program proceeds to step S1704. Then, the program generates print data for the print module 116-1 in a predetermined area 1207*a* used as a work area in the print data generation PC 1101. After the print data is generated, the program in step S1705 generates print data for the print module 116-2 in a predetermined area 1208*a*.

Now, the print data generation by the application 1201 is ended.

The print manager program 1215 monitors the execution of the application 1201. When the print data generation is finished, the application program at step S1710 reads print data from the predetermined areas 1207*a*, 1208*a*. Then, at step S1711 the program transfers the print data to predetermined areas (folders) 1207*b*, 1208*b* used as work areas in the print data transmission PC 1103 and the print data transmission PC 1104.

When the print data transfer is completed, the program moves to step S1712 where it notifies the inter-PC communication program 1203 in the print data transmission PC 1103 and the inter-PC communication program 1205 in the print data transmission PC 1104 that the print data transfer is completed.

The inter-PC communication programs 1203, 1205 each receive a print data transfer completion notification at step S1720, 1730 and instruct the print data transmission programs 1204, 1206 to receive the print data. The print data transmission programs 1204, 1206 each read the print data from the predetermined areas (folders) 1207*b*, 1208*b* and at step S1722, 1732 transfer the print data to the print modules 116-1, 116-2.

Selection of Realtime RIP and Pre-RIP (1) Manual Selection

Selection between the realtime RIP and the pre-RIP is done by the user specifying from a window menu displayed on the display of the print data generation PC 1101.

FIG. 56 shows a realtime RIP/pre-RIP selection screen, which is displayed on the display of the print data generation PC 1101.

In the process of generating print data, a print data generation mode selection screen 1304 appears in a print data file generation window. With this screen displayed, the user can specify either of the realtime RIP 1301 or the pre-RIP 1302 using a pointing device or keyboard.

If the pre-RIP 1302 is selected, an output folder 1303 to which the print data is output is determined. The output folder corresponds to the predetermined areas 1207*a*, 1208*a* of FIG. 54 and is determined by the user selecting a user-defined folder in the print data generation PC 1101. In the print system of this example, if the print data transmission PCs 1103, 1104 are unable to communicate with the print modules 116-1, 116-2, or if the print modules 116-1, 116-2 are unable to print as when an error occurs, only the pre-RIP can be selected.

(2) Automatic Selection

Here, the automatic selection between the realtime RIP and the pre-RIP will be explained by taking a detailed image printing as an example.

Figure 59A:
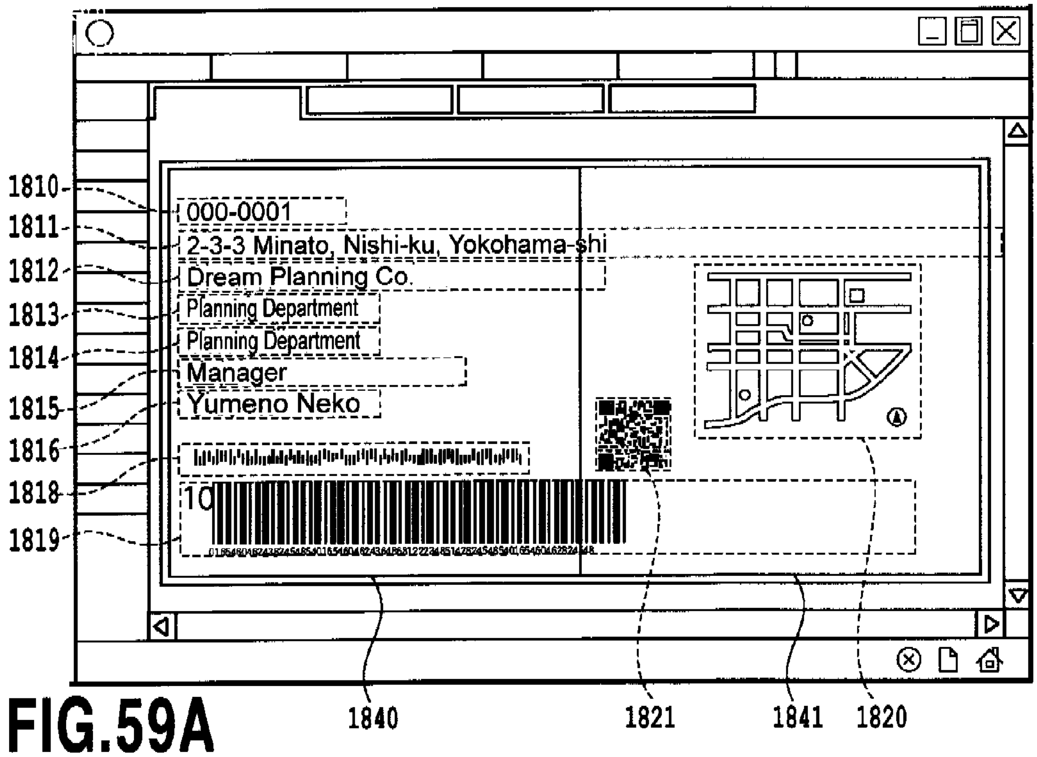
FIG. 59A is a diagram showing a layout screen for an image to be printed in the ninth embodiment of this invention.
Figure 59B:
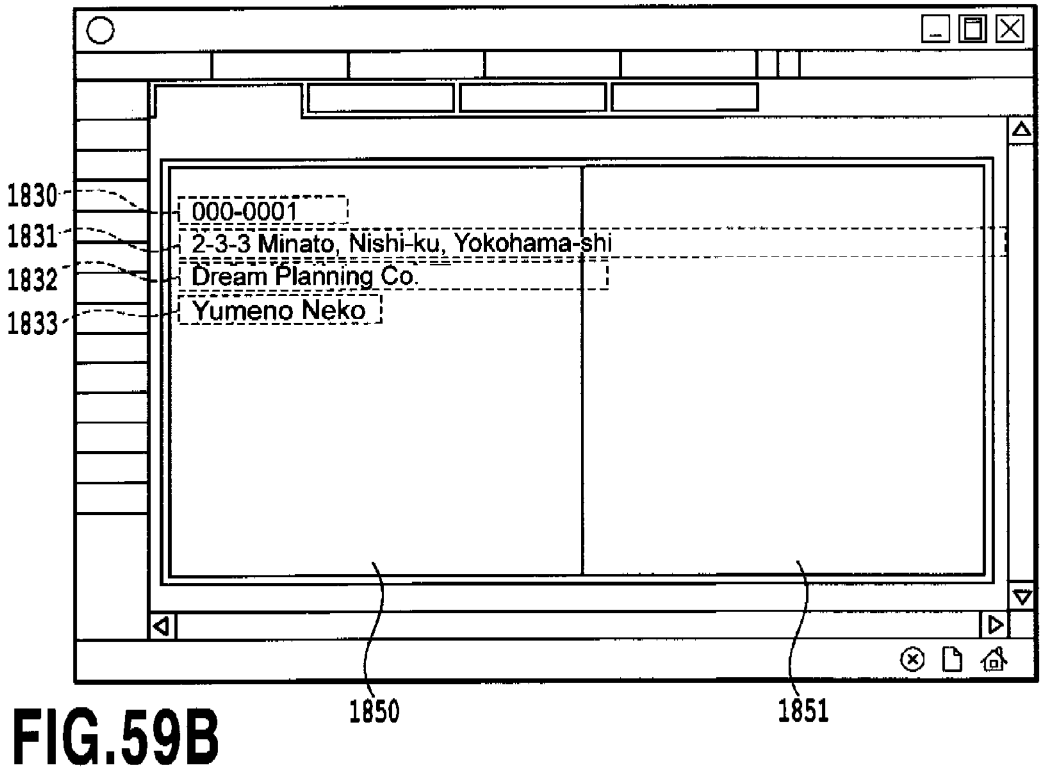
FIG. 59B is a diagram showing a layout screen for an image to be printed in the ninth embodiment of this invention.

FIG. 59A and FIG. 59B show example screens for laying out an image to be printed by the print system.

FIG. 59A shows a layout screen with many objects and FIG. 59B shows one with few objects. Both of the layout screens show images to be printed by the print modules 116-1, 116-2.

The layout shown in FIG. 59A is comprised of layout data 1840 for the print module 116-1 and layout data 1841 for the print module 116-2. The layout data 1840 comprises text data 1810-1816, a customer bar code 1818 and a bar code 1819. The layout data 1841 comprises a part of the bar code 1819, geographic data 1820 and a two-dimensional bar code 1821.

The layout shown in FIG. 59B comprises layout data 1850 for the print module 116-1 and layout data 1851 for the print module 116-2. The layout data 1850 is made up of text data 1830-1833. The layout data 1851, although it is an output area of the text data 1831, actually has no object to print in this example.

FIG. 60 shows a list of print data generation time for each object.

A field 1901 in FIG. 60 represents a print data generation time when there is no data in the layout. Fields 1902-1906 represent print data generation time for each object arranged on the layout screen as shown in FIG. 59A and FIG. 59B. By adding up the print data generation times for the objects of print data, the time required to generate the print data can be estimated. When there is no data in the layout, it is necessary to inform the print module of the absence of the data. So some processing time is required as shown in the field 1901.

First, for the image shown in FIG. 59A, i.e., an image corresponding to a layout screen with many objects, a time (T) required to generate the print data is calculated.

If we let the print data generation time for the print module 116-1 be T105 and the print data generation time for the print module 116-2 be T106, then the generation times T105, T106 are calculated as follows. In a formula shown below, (no data), (text data), (customer bar code), (bar code), (2-dimensional bar code) and (bit map) signify print data generation times for their objects.

$$T105=(\text{no data})+\{(\text{text data})\times 7\}+(\text{customer bar code})+(\text{bar code})$$

$$T106=(\text{no data})+(\text{bar code})+(\text{2-dimensional bar code})+(\text{bit map})$$

Substituting into the formula the times shown in FIG. 60 as the print data generation time for each object can estimate the print data generation times T105 and T106 for the print modules 166-1 and 116-2.

$$T105=15+(30\times 7)+40+40=605(\text{ms})$$

$$T106=15+40+60+50=165(\text{ms})$$

Therefore, the print data generation time (T) for one page of image corresponding to the layout (with many objects) in FIG. 8A can be estimated as follows:

$$T=T105+T106=605+165=770(\text{ms})$$

Similarly, for an image corresponding to the layout of FIG. 8B (with few objects), the print data generation time (T) is calculated.

$$T105=(\text{no data})+\{(\text{text data})\times 4\}$$

$$T106=(\text{no data})$$

By substituting into the equations the times of FIG. 60 as the print data generation time for each object, the print data generation times T105 and T106 for print modules 116-1, 116-2 can be estimated as follows.

$$T105=15+(30\times 4)=135(\text{ms})$$

$$T106=15(\text{ms})$$

Therefore, the print data generation time (T) for one page of image corresponding to the layout of FIG. 8B (with few objects) can be estimated as $$T=T105+T106=135+15=150(\text{ms})$$

After the print data generation time is estimated as described above, an image print speed of the print module is determined.

In both of the layout of FIG. 8A with many objects and the layout of FIG. 8B with few objects, it is assumed that the length of the printable area is 102 mm.

For the layout of FIG. 8A, since one page of print data can be generated in 770 (ms), it follows from the equation below that the print data that can be generated in one minute is 78 pages.

$$60,000(ms)+770(ms)=78(pages)$$

The print data that can be generated in one minute therefore is 7,948 mm in the print area length as follows.

$$78(pages/minute)\times102(mm)=7,948(mm/minute)$$

Similarly, for the layout of FIG. 8B with few objects, since one page of print data can be generated in 135 (ms), the print data that can be generated in one minute is determined from the following equation to be 400 pages.

$$60,000(ms)+150(ms)=400(pages)$$

Therefore, the print data that can be generated in one minute is calculated from the equation below to be 40,800 mm in the print area length.

$$400(pages/minute)\times102(mm)=40,800(mm/minute)$$

As described above, the print data generation time and the print data generation speed can be estimated from objects contained in the layout corresponding to the image to be printed.

Figure 61:
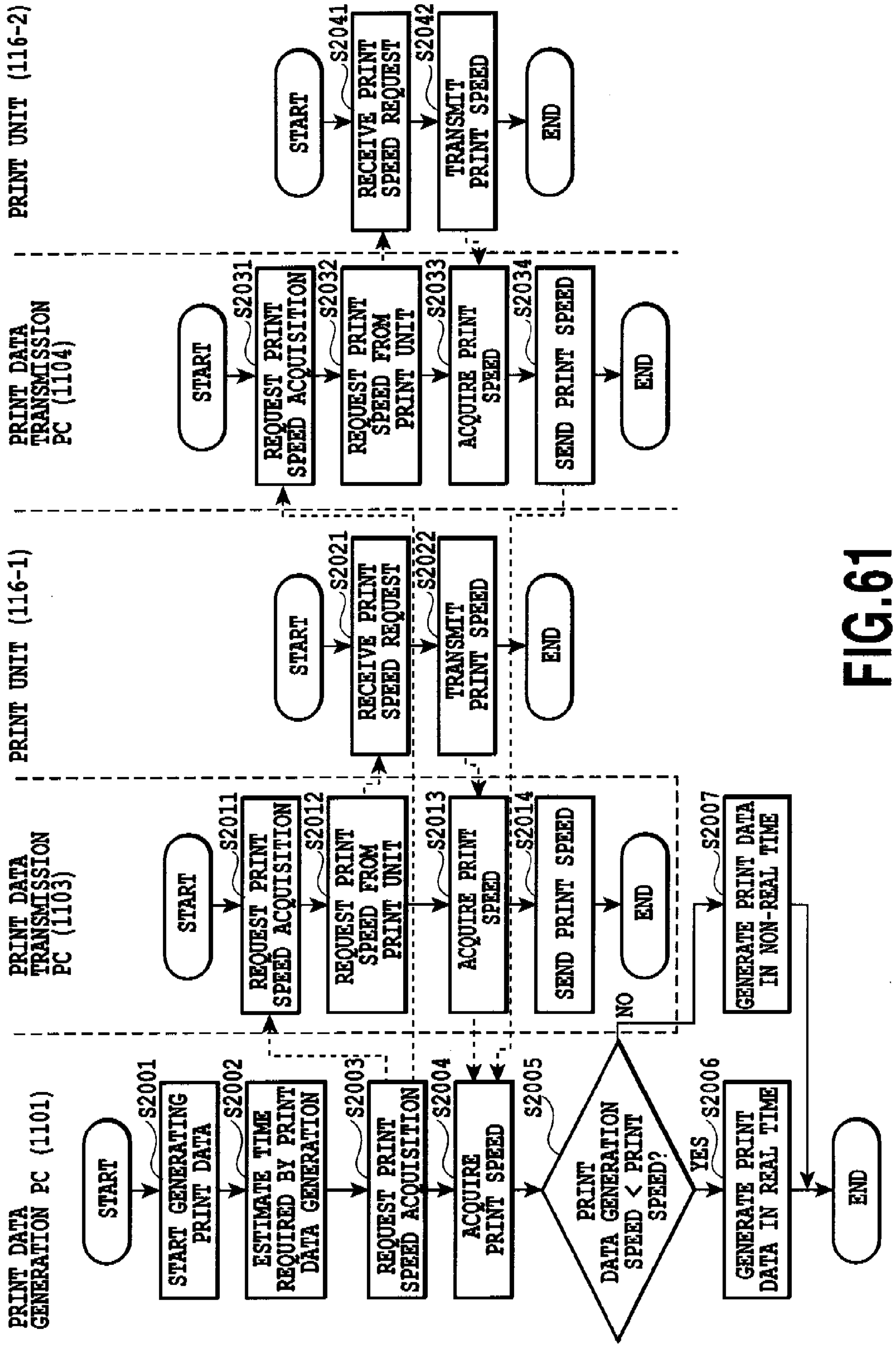
FIG. 61 is a flow chart showing realtime RIP/pre-RIP switching processing in the ninth embodiment of this invention.

Next, the automatic selection between the realtime print data generation operation (realtime RIP) and the non-realtime print data generation operation (pre-RIP) will be explained by referring to the flow chart of FIG. 61.

In step S2001 the print data generation PC 1101 starts generating print data according to an instruction from the user. In next step S2002 the PC estimates the print data generation time as described earlier.

In next step S2003, the program sends a request for acquiring the print module print speed to the print data transmission PCs 1103, 1104. The print data transmission PCs 1103, 1104 in step S2011 and step S2031 receive the print speed request from the print data generation PC 1101.

The print data transmission PCs 1103, 1104 in step S2012 and step S2032 send a print speed acquisition request to the print modules 116-1, 116-2 connected to them. The print modules 116-1, 116-2 in step S2021 and step S2041 receive the print speed acquisition request and in step S2022 and step S2042 send the print speeds stored in the print modules 116-1, 116-2 to the print data transmission PCs 1103, 1104.

The print data transmission PCs 1103, 1104 in step S2013 and step S2033 acquire the print speeds from the associated print modules and in step S2014 and step S2034 transmit the print speeds to the print data generation PC 1101.

In step S2004 the print data generation PC 1101 receives the print speeds of the print modules 116-1, 116-2 from the print data transmission PCs 1103, 1104. Further in step S2005 the print data generation PC 1101 compares the print data generation speed with the print module print speed. If the print data generation speed is equal to or greater than the print speed, the generation of print data can follow the print module performance, so the program moves to step S2006 where it selects the real time RIP by which the print data is generated in real time. However, if the print data generation speed is smaller than the print speed, this means that the print data generation cannot follow the print module performance and thus the program moves to step S2007 where it selects the pre-RIP by which the print data is generated in non-real time.

In the above processing, we have explained a case where the print speed is acquired from the print modules. However, if the print speed of the print modules is constant, the information of the print speed may be stored in the print data generation PC.

In this embodiment, as described above, the user can manually select either the realtime RIP by which the print data generation and the print data transmission are executed parallelly or the pre-RIP by which the print data begins to be transmitted only after the print data is generated in advance. This allows the user to determine the capability of the print modules and put their printing performance to effective use.

The selection between the realtime RIP and the pre-RIP can also be made automatically by comparing the print data generation speed estimated from the layout of an image to be printed and the print speeds of the two print modules. This prevents troubles, such as errors and an output of a blank sheet, that could otherwise be caused by an imbalance in print data volume between the two print modules or an imbalance between the print module performance and the print data generation speed.

[Tenth Embodiment]

FIG. 62 to FIG. 70 represent a tenth embodiment of this invention.

Figure 62:
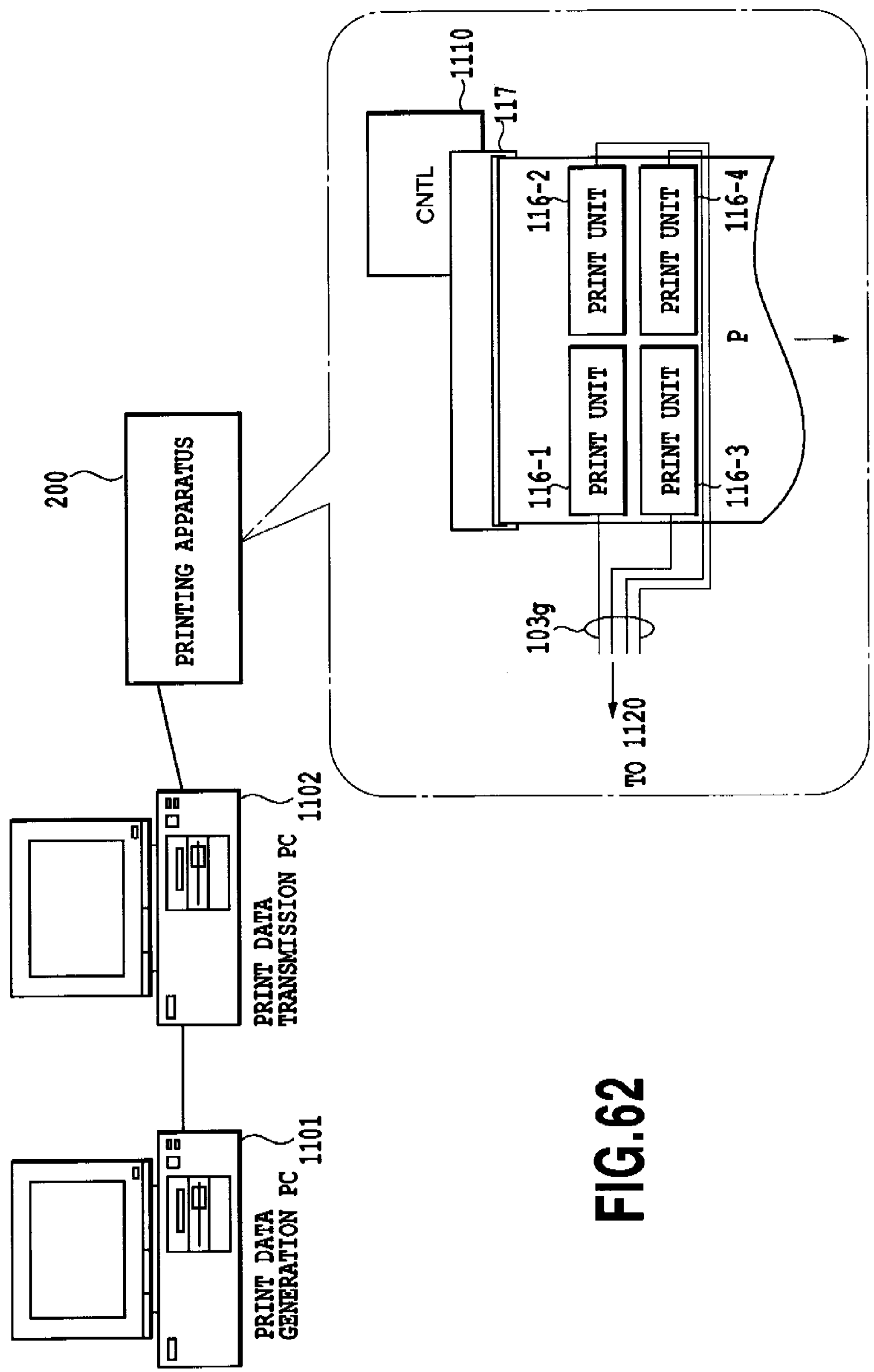
FIG. 62 is a diagram showing an outline configuration of a print system according to a tenth embodiment of this invention.

FIG. 62 illustrates a schematic configuration of a print system having two host devices and four print modules. As in the previous embodiments, the PC establishes communication to and from the individual print modules by reading identity information set in the print modules to identify them.

In FIG. 62 the print data generation PC 1101 is a personal computer (PC) to generate print data for one or more print modules. The print data generation PC 1101 is connected to the print data transmission PC 1102 through a communication interface. The communication interface may include a network cable, a USB cable and a wireless LAN. In this example, the print data generated by the print data generation PC 1101 is transferred to the print data transmission PC 1102 through the network cable.

The print data transmission PC 1102 is connected to a printing apparatus (image forming apparatus) 200 through a communication interface. The communication interface may include a network cable, a USB cable and an IEEE1284. In this example, the print data is transferred to the print module 116 of the printing apparatus 200 through the USB cable.

The print data generation PC 1101 under the control of an operating system executes an image data generation application and a print control program (simply referred to as a printer driver). In this example, the operating system is Windows (registered trademark).

The print data transmission PC 1102 transmits print data generated by the print data generation PC 1101 to the print module 116 of the printing apparatus 200 and at the same time monitors the status of the printing apparatus 200.

In this example the host device comprises the print data generation PC 1101 and the print data transmission PC 1102. However, if the computer as the host device has high performance, a single PC may be used, instead of two as in this example, to execute the print data generation function, the print data transmission function and the printing apparatus monitoring function.

The printing apparatus 200 of this example is mounted with four print modules 166-1 to 116-4. As in the preceding embodiments, these print modules have the same construction and are each provided with an ink jet print head. The print data transmission PC 1102 is connected to the print modules 166-1 to 116-4 via a USB interface and a USB cable 103*g*. Through the USB cable 103*g*, the print data is transmitted from the print data transmission PC 1102 to the four print modules 166-1 to 116-4. The four print modules 166-1 to 116-4, as in the preceding embodiments, can be operated and controlled independently of each other according to the print data received. Therefore, the print modules 166-1 to 116-4 are each provided with a USB interface to receive the print data from the print data transmission PC 1102.

In the configuration shown in FIG. 62, one print data transmission PC controls four print modules independently. Another configuration is also possible in which four print data transmission PCs control the four associated print modules. That is, the system configuration may adopt a one-to-one relation between the print data transmission PC and the print module.

The printing apparatus 200 has a recovery unit (not shown) to assure a stable ink ejection from the four print modules 166-1 to 116-4. A print medium P such as print paper is supplied to a print position of these print modules and then transported in a direction of arrow by the transport unit 117.

The operation of the transport unit 117 is controlled by a controller (CNTL) 103*f*.

In this example, a plurality of independent engines or print modules 166-1 to 116-4 are arranged in blocks of two in a direction perpendicular to the transport direction of the print medium P (arrow direction of FIG. 62) (hereinafter referred to as a width direction) and in the transport direction. The print modules 166-1 to 116-4, as in the preceding embodiments, are each provided with an ink jet print head (hereinafter referred to as a print head) extending in the width direction of the print medium P which ejects ink according to the print data received from the print data transmission PC 1102. The print data transmission PC 1102 transmits the print data to the print modules 166-1 to 116-4 according to the transport position of the print medium P in synchronism with the operation of the transport unit 117.

In this example, the print modules 116-1, 116-3 print an image in a left-hand side print area of the print medium P in FIG. 1 and the print modules 116-2, 116-4 print an image in a right-hand side print area of the print medium P in FIG. 1.

This example employs a printing apparatus equipped with four print modules. The number of print modules mounted in the printing apparatus is not limited to "four" and any desired number of modules may be used. For example, a system configuration is possible which uses N print modules (N is a natural number) and N print data transmission PCs and connects them in an N-to-N relationship.

Figure 63:
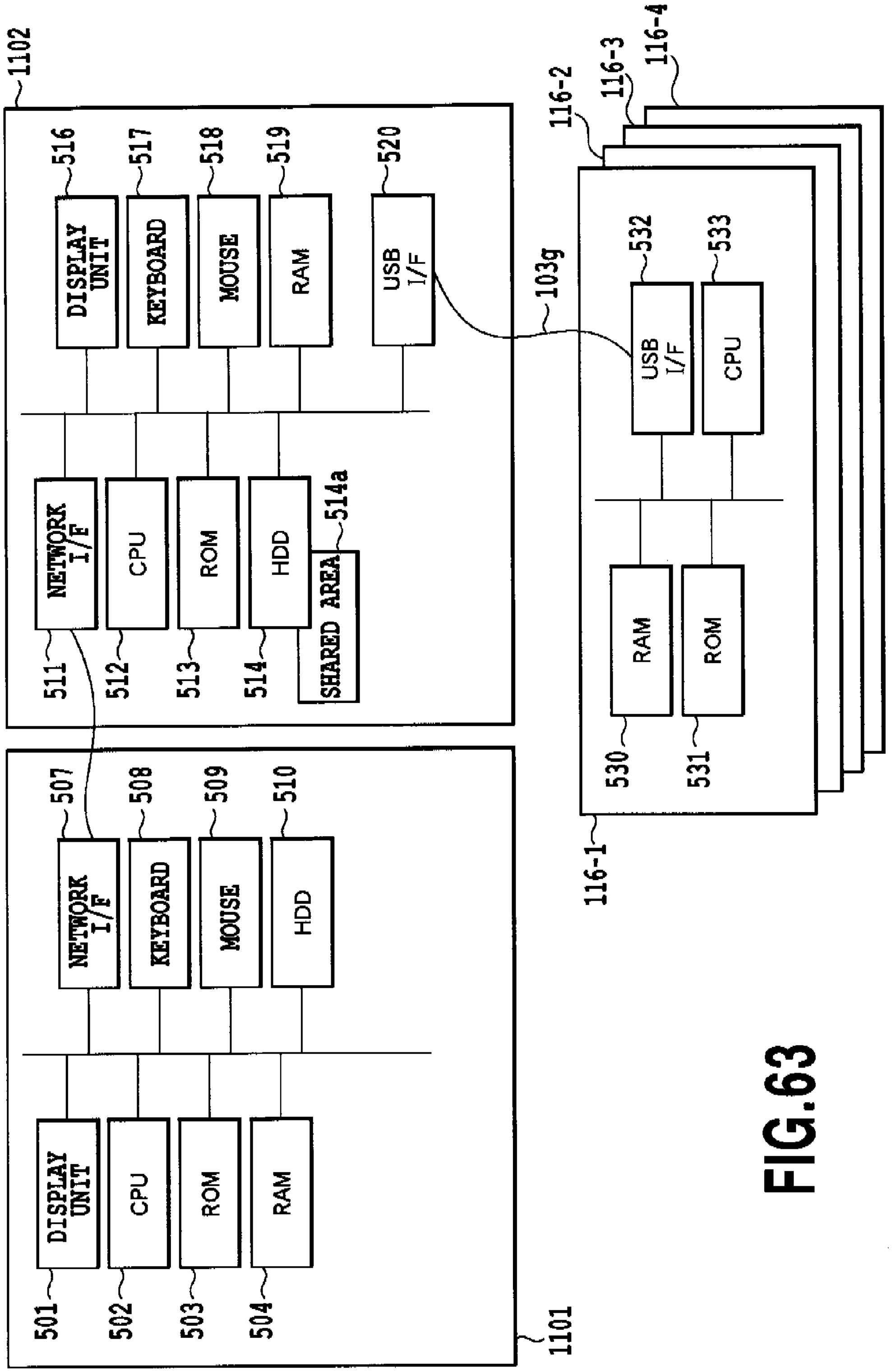
FIG. 63 is a block configuration diagram of the print system of FIG. 62.

FIG. 63 is a block configuration diagram showing a control system of the print system of FIG. 62.

The print data generation PC 1101 and the print data transmission PC 1102 can basically be of the same construction. These PCs 1101, 1102 each have a CPU 502, 512, a ROM 503, 513 in which to store programs, a RAM 504, 519 used as a work area in which to execute programs, and a display unit 501, 516 such as LCD and CRT. The PCs also have a keyboard 508, 517 and a mouse (registered trademark) 509, 518 for the user to operate devices and enter information, and a network interface (I/F) 507, 511 for data communication between them. Further, they have a hard disk drive (HDD) 510, 514 to store a large volume of data and programs.

The print data transmission PC 1102 also has a USB interface (I/F) 520 for communication with the four print modules 166-1 to 116-4.

A part of the HDD 514 of the print data transmission PC 1102 is set aside as a shared area 514*a* shared also by the print data generation PC 1101.

The print modules 166-1 to 116-4 have the same control system construction and each of the print modules has a CPU 533, a ROM 531 to store a control program and a RAM 530. The RAM 530 is used as a work area for the control program to execute a print control according to the print data received. Further, each of the print modules has a USB interface (I/F) 532 for data communication with the print data transmission PC 1102.

The print data generation PC 1101 has programs, such as applications to lay out an image to be printed, a print data generation program and a printer driver to convert image data into data that can be handled by the print modules. These programs are executed by the CPU 502. The print data generation PC 1101 stores the generated print data in the shared area 514*a* of HDD in the print data transmission PC 1102.

In this example, after 1,000 jobs of print data have been stored in the shared area 514*a*, the print data transmission program of the print data transmission PC 1102 transmits the 1,000 jobs of print data to the print modules 166-1 to 116-4 through the USB interface 520. That is, only after 1,000 jobs of print data have been generated, are these print data sent to the print modules 166-1 to 116-4. In the similar manner, each time 1,000 jobs of print data are created, they are sent en masse to the print modules 166-1 to 116-4. The "1,000 jobs" are set as the number of print jobs, as described later. The print data transmission program is installed in the HDD 514. The print modules 166-1 to 116-4 print an image on the print medium P according to the print data received through the USB interface 532.

Figure 64:
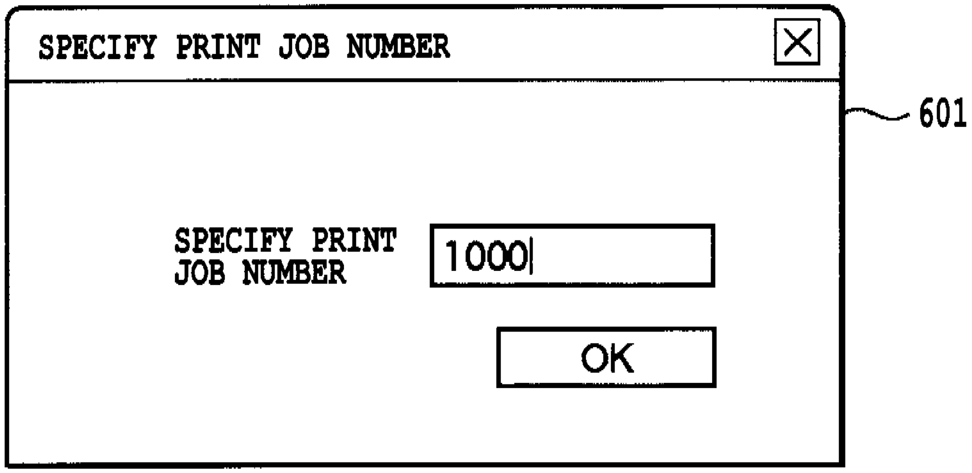
FIG. 64 is a diagram showing a print job number specifying screen in the tenth embodiment of this invention.

FIG. 64 shows a display screen to set the number of print jobs.

Once the print data generation PC 1101 starts the application, a print job number specification screen 601 of FIG. 64 appears on the display unit 501. The user can specify a desired number of print jobs using the screen 601 and the keyboard 508. In FIG. 64 "1,000 jobs" is specified as the print job number. The application, as described above, generates the print data in an amount equivalent to the specified number of print jobs as a unit of processing.

Figure 65:
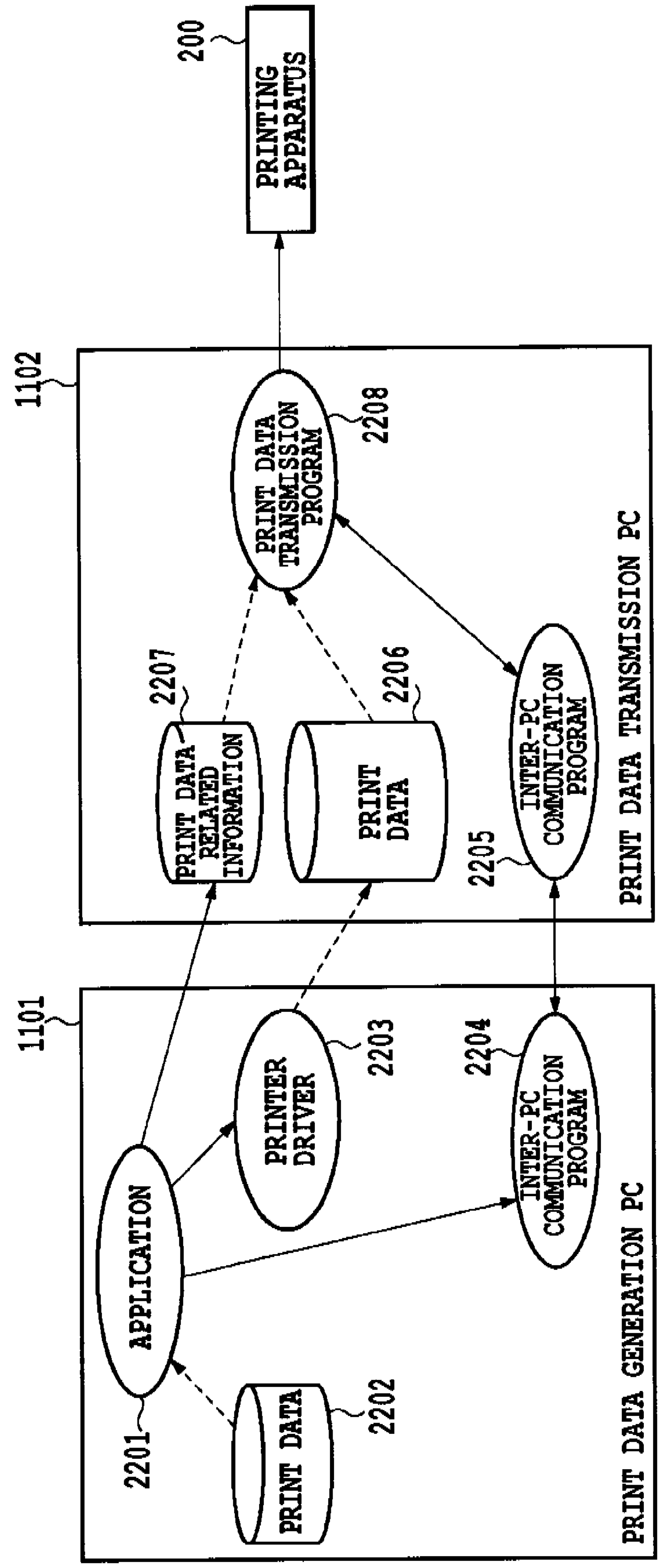
FIG. 65 is a block diagram showing a relation between software running on the print data generation PC and the print data transmission PC of FIG. 62.

FIG. 65 is a block diagram showing a relation among programs running on the print data generation PC and the print data transmission PC.

The application 2201 in the print data generation PC 1101 first reads information necessary for image printing from the database 2202, lays out the content to be printed, and generates the print data through the printer driver 2203.

Then the application 2201 outputs the print data to a file 2206 in the print data transmission PC 1102 through the printer driver 2203. A possible format for the database 2202 may include a CSV file format, an XML format and Access (registered trademark) format. The file 2206 is defined in advance in the shared area 514*a*. The shared area 514*a*, as described above, is shared by the print data transmission PC 1102 and the print data generation PC 1101 and thus can be referenced by these PCs.

When the start of the print data is chosen by the user, the application 2201 outputs to a file 2207 information about how many jobs of print data need to be transmitted in the end, i.e., information on the total number of jobs (a total volume of print data). In FIG. 65, this information is represented as print data related information. The file 2207, as with the file 2206, is defined in the shared area 514*a* of the print data transmission PC 1102.

When the generation of the print data related information is completed, the application 2201 notifies an inter-PC communication program 2204 in the print data generation PC 1101 that the print data related information has been generated. The inter-PC communication program 2204 then notifies an inter-PC communication program 2205 in the print data transmission PC 1102 of the completion of generation of the print data related information. The inter-PC communication program 2205 in turn informs a print data transmission program 2208 of the completion of generation of the print data related information.

Having been notified of the completion of generation of the print data related information, the print data transmission program 2208 accesses the file 2207 to read the print data related information and sends the information about the total number of print jobs (total volume of print data) to the print modules 166-1 to 116-4.

Figure 66:
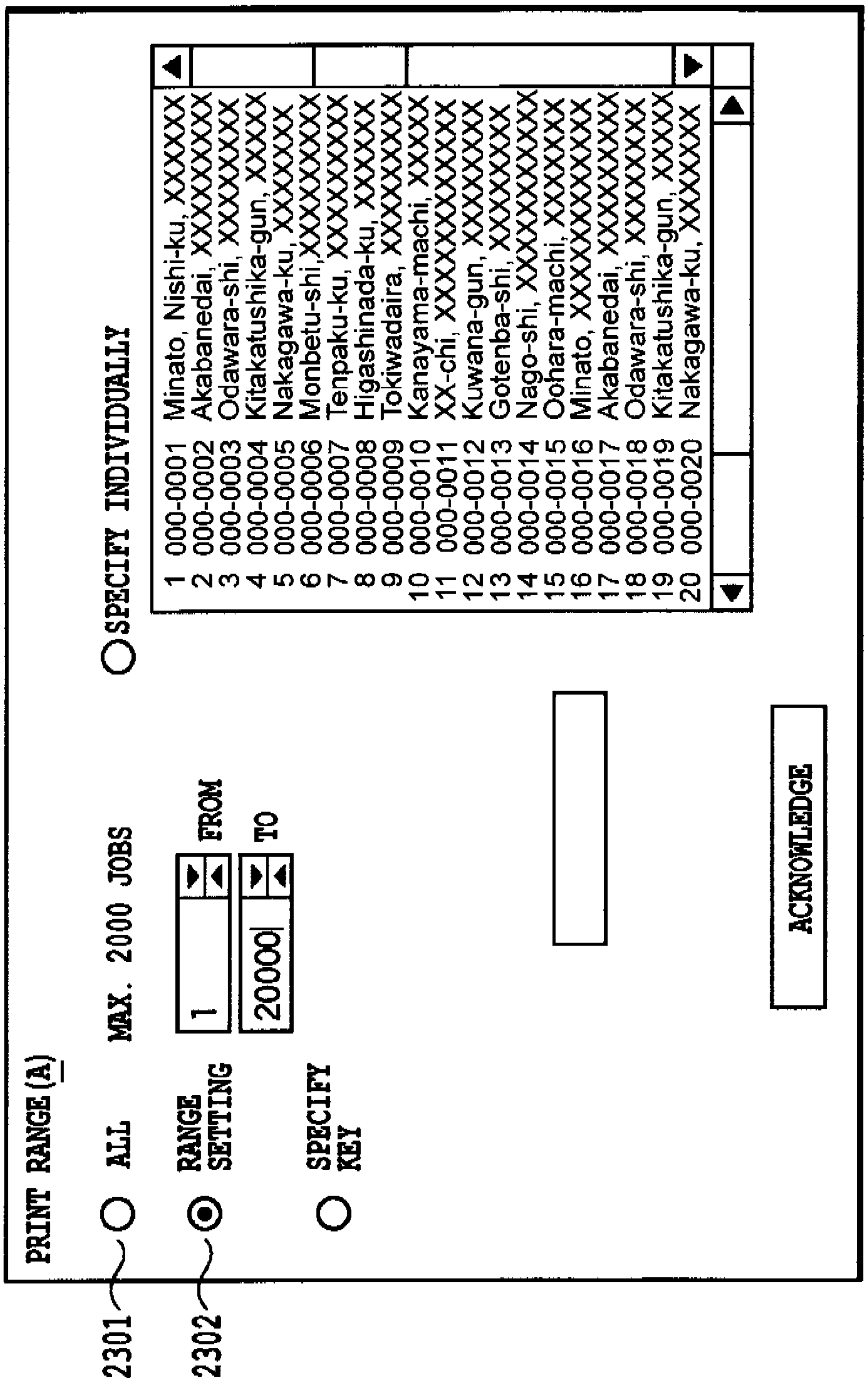
FIG. 66 is a diagram showing a screen used to specify a total number of print jobs in the tenth embodiment of this invention.

FIG. 66 shows a screen used to specify the total number of jobs of printing print data. This screen is also displayed on the display unit 501 of the print data generation PC 1101.

In FIG. 66, denoted 2301 is a box that the user checks when he or she wishes to perform printing using all the information acquired from the database. Designated 2302 is a box that the user checks when he wants to specify a desired range of printing. When the user has specified the total number of print jobs using this screen of FIG. 66, the application 2201 writes the total number of print jobs as the print data related information into the file 2207. In FIG. 66, 20 print jobs (1-20) are displayed on the screen.

Figure 67:
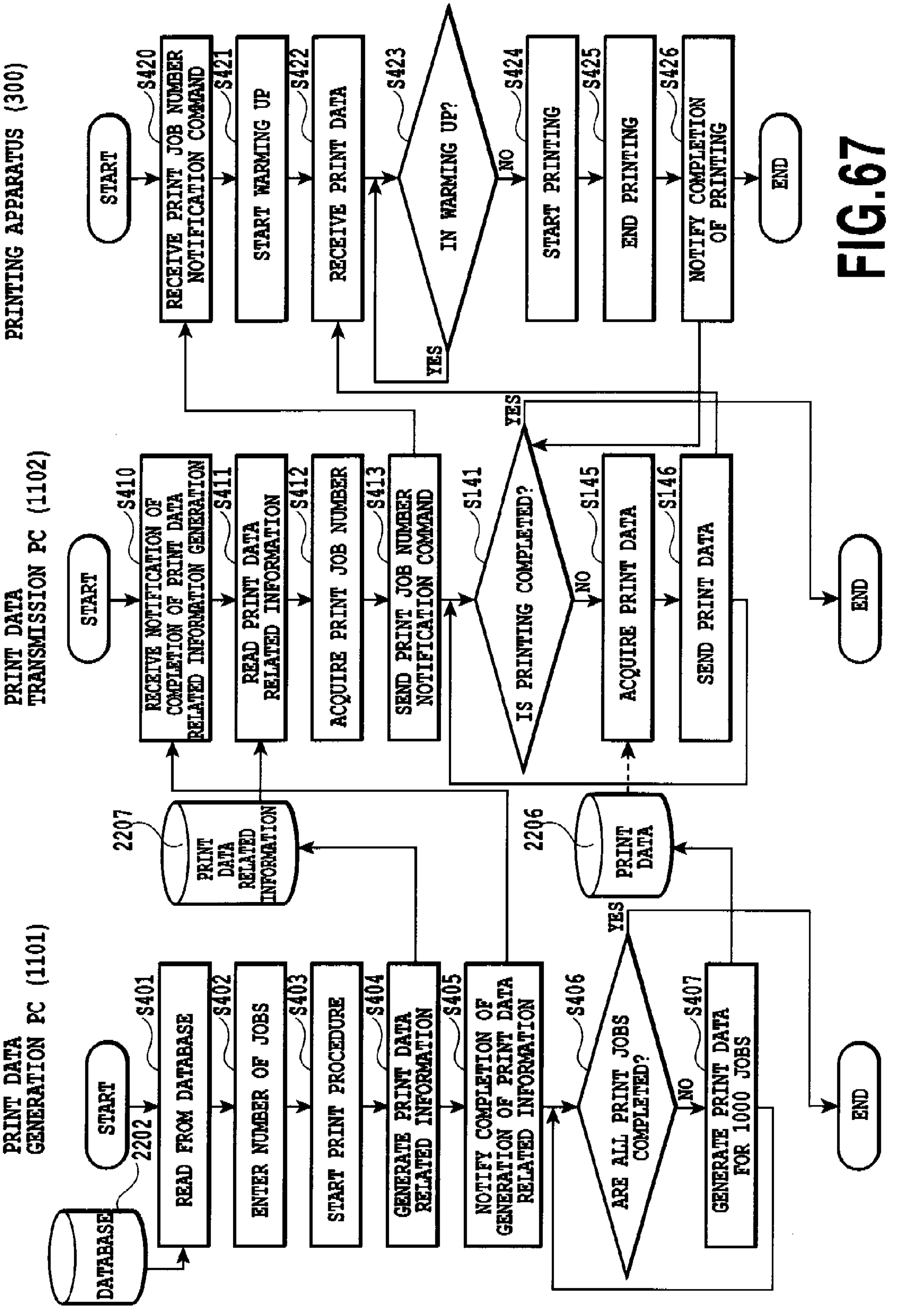
FIG. 67 is a flow chart showing print processing performed by the print system of FIG. 62.

FIG. 67 is a flow chart showing a print operation that is performed by the print data generation PC and the print data transmission PC cooperating with each other. Here let us take for example a case where the number of print jobs is set to “1,000 jobs” and a manual-feed printing is done.

First, the print data generation PC 1101 in step S401 reads information necessary for printing from the database 2202. Next, in step S402 it takes in the total number of print jobs from the screen of FIG. 64 and in step S403 starts the printing operation.

In step S404 the print data generation PC 1101 generates print data related information in the file 2207 of the print data transmission PC 1102. After the print data related information has been generated, the print data generation PC 1101 notifies the print data transmission PC 1102 of the completion of generation of the print data related information.

The print data transmission PC 1102 in step S410 receives the notification on the completion of generation of the print data related information and in step S411 reads the print data related information from the file 2207. Then, in step S412 the print data transmission PC 1102 retrieves the total number of print jobs from the print data related information and in step S413 issues a total print job number notification command based on the retrieved value to the printing apparatus 300.

The print modules 166-1 to 116-4 of the printing apparatus 300 in step S420 receives the total print job number notification command and in step S421 starts a warm-up operation according to the total number of print jobs contained in the received command. The warm-up operation is a preparatory operation required before the print modules 166-1 to 116-4 execute the printing operation and includes, for example, a print head recovery operation.

While the printing apparatus 300 is performing a warm-up operation, the print data generation PC 1101 in step S406-S407 generates print data in a volume corresponding to the number of print jobs. In this example, it generates print data for the specified 1,000 print jobs. With the generation of print data for 1,000 print jobs complete, the print data generation PC 1101 outputs it to the print data file 2206.

The print data transmission PC 1102 is monitoring the status of the data generation by the print data generation PC 1101 at all times. This is done by checking the file 2206 in the shared area 514*a*. When it is confirmed that the print data has been output to the file 2206, the print data transmission PC 1102 in step S414-S416 retrieves the print data from the file 2206 and send them to the print modules 166-1 to 116-4 of the printing apparatus 300.

The print modules 166-1 to 116-4 of the printing apparatus 300 in step S422 receive the print data and, in step S423, check if the warm-up operation is completed. If the warm-up operation is found to be completed, the print modules start the print operation at step S424.

When the print operation is completed at step S425, the print modules 166-1 to 116-4 of the printing apparatus 300 notify in step S426 the print data transmission PC 1102 of the completion of the print operation.

The print data transmission PC 1102 in step S141 receives the notification on the completion of the print operation and completes monitoring the print data.

In this embodiment, as described above, once the print procedure has started, the print data related information is generated (step S404) and the total number of print jobs contained in the information is transmitted to the printing apparatus prior to the actual transmission of the print data. In response to this transmission, each of the print modules 166-1 to 116-4 starts the warm-up operation (step S421) and waits for the print data. Then, the print modules 166-1 to 116-4, after the completion of the warm-up operation, start printing the received print data (step S424). Performing the warm-up operation prior to the actual reception of the print data as described above can shorten the time it takes for the warm-up operation to be completed before the printing can be started (waiting time), allowing the print operation to start early.

As described above, when they receive the print data related information, the print modules 166-1 to 116-4 start the warm-up operation prior to the reception of the print data. Therefore, by the time the print data is received, at least a part of the warm-up operation is finished. So the time to wait for the warm-up operation to be finished is reduced, enabling the print operation to be started that much early. If the warm-up operation is started after the print data is received, the print operation must wait until the warm-up operation is finished, delaying the start of the print operation.

Taking advantage of the warm-up time of the print modules 166-1 to 116-4, the print data generation PC 1101 generates print data for the specified number of print jobs (in this example, 1,000 jobs). Therefore, if the warm-up is finished during the time from when the print data related information has been transmitted to the print modules 166-1 to 116-4 until the print data for the print jobs (in this example, 1,000 jobs) is received, the warm-up waiting time is eliminated.

If the print data generation speed in the print data generation PC 1101 is relatively slow and the print data print speed of the print modules 166-1 to 116-4 is relatively fast, it is desired that the print data generation PC 1101 use the warm-up time to generate as much print data as possible. Namely, by using the warm-up time as part of the print data generation time, it is possible to avoid a situation where the print operation would have to be interrupted by the slow generation of print data.

Instead of the print data related information, other data may be transmitted to the print modules 166-1 to 116-4 prior to the transmission of print data so that the print modules 166-1 to 116-4 can start the warm-up when they receive that data. If the warm-up is started when the print data related information is received, as in this example, it is possible to change the content of the warm-up operation according to the total number of print jobs contained in the print data related information. For example, when the print data generation speed of the print data generation PC 1101 is slow relative to the print speed of the print modules 166-1 to 116-4, if the total number of print jobs is relatively large, the number of recovery operations on the print head may be increased to prolong the time of the warm-up operation. In that case, the print data generation is allowed an additional time provided by the warm-up operation.

In this example, the number of print jobs is set to 1,000 and each time print data for the 1,000 print jobs is generated, it is transmitted to the print modules 166-1 to 116-4. The number of print jobs can of course be other than 1,000. For instance, if the print data takes only a short time to generate, the number of print jobs may be set smaller to advance the transmission timing of the print data to the print modules 166-1 to 116-4 to start the print operation earlier than it would otherwise. If on the other hand the print data takes longer to generate, the number of print jobs may be increased to delay the timing of print data transmission to the print modules 166-1 to 116-4 and therefore the start of the print operation, thereby preventing a possible interruption of printing that could be caused when the generation of print data fails to catch up the printing. As described above, the number of print jobs set during the process of generating the print data can be changed according to the time required by the generation of the print data.

Needless to say, if the total number of print jobs is smaller than the number of print jobs, the total number becomes the number of print jobs.

The warm-up operation may be changed according to the number of print jobs or the same warm-up operation be performed irrespective of the number of print jobs.

[11th Embodiment]

Figure 68:
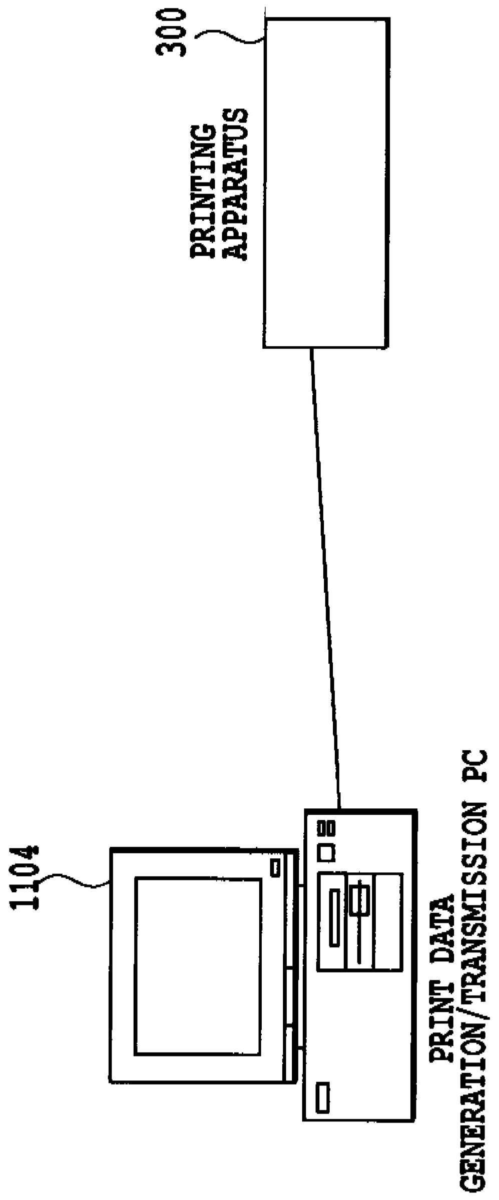
FIG. 68 is an outline configuration diagram of a print system in an eleventh embodiment of this invention.
Figure 69:
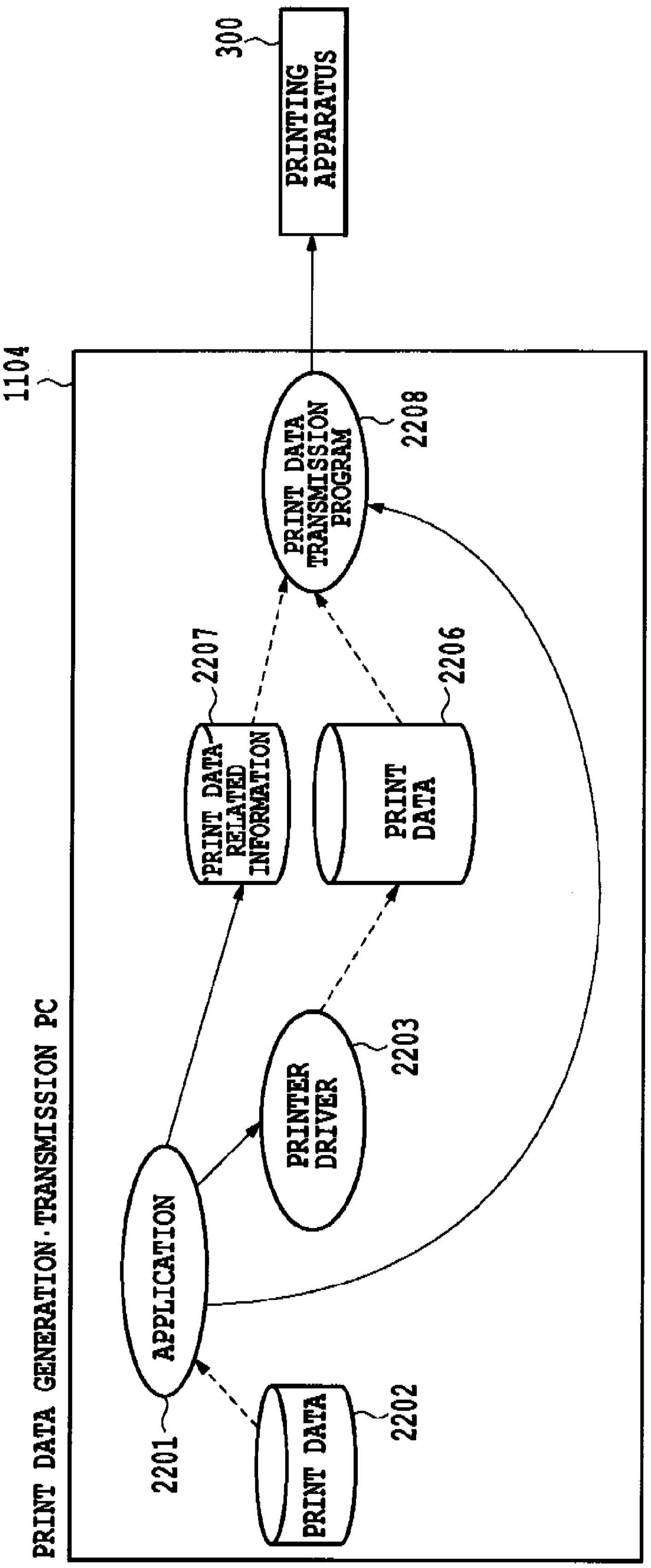
FIG. 69 is a block diagram showing a relation among software running on the print data generation PC and the print data transmission PC of FIG. 68.
Figure 70:
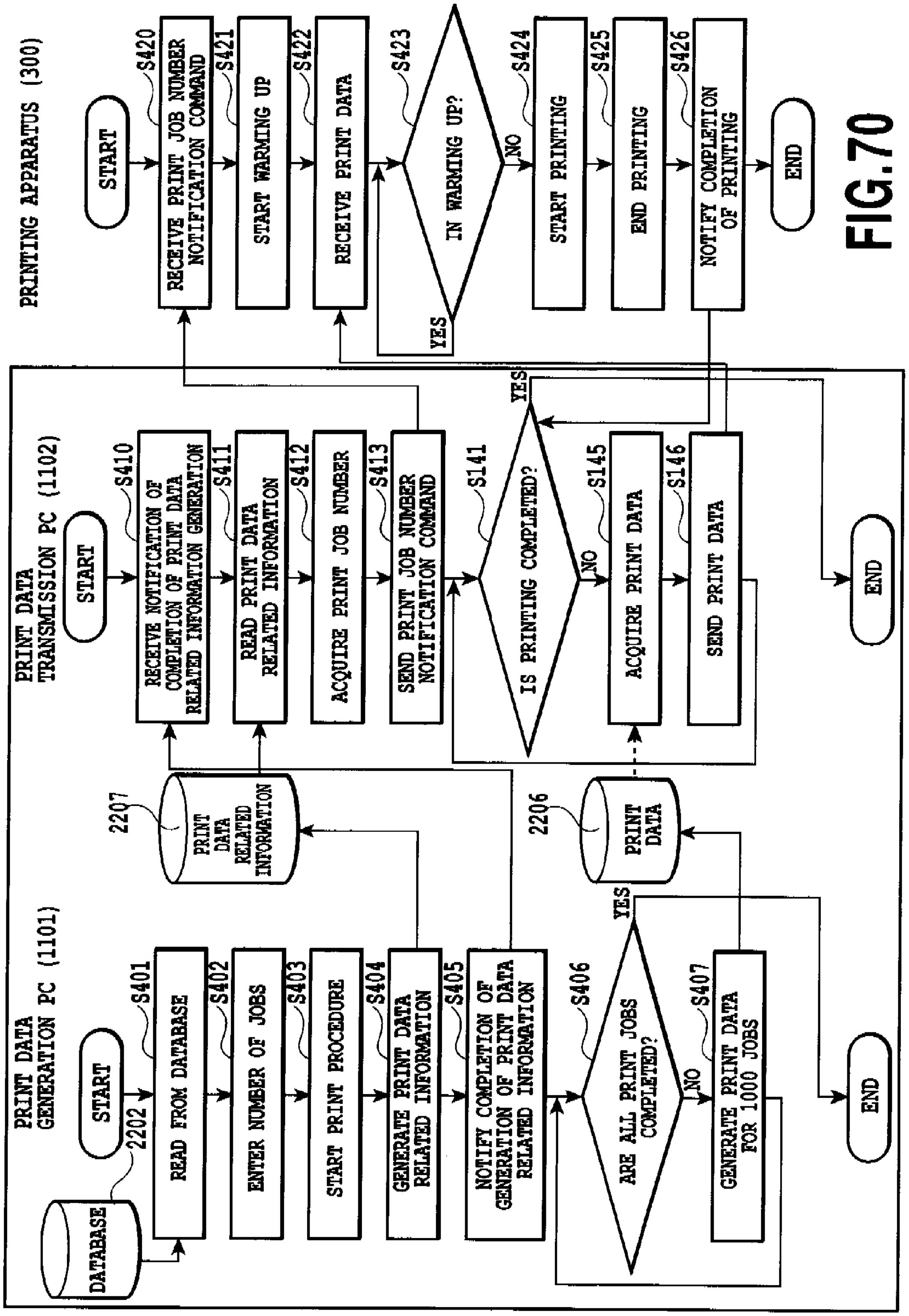
FIG. 70 is a flow chart showing print processing executed by the print system of FIG. 68.

FIG. 68 to FIG. 70 represent an eleventh embodiment of this invention. In this embodiment, the print data generation PC and the print data transmission PC in the preceding 10th embodiment are constructed of a single personal computer (PC). This PC and a printing apparatus combine to form a print system of FIG. 68.

In FIG. 68, the print data generation/transmission PC 1104 integrates the functions of the print data generation PC 1101 and the print data transmission PC 1102 of the 10th embodiment. This single PC 1104 performs the generation and transmission of print data. The PC 1104 has the same construction as the PC 1101, 1102 of FIG. 63.

In this example, however, since one PC 1104 performs the generation and transmission of print data, no shared area 514*a* (see FIG. 68) accessed by two PCs are not provided. In this PC 1104 it is preferred that the CPU be higher in performance and that RAM and HDD be faster and larger in capacity.

The print data generation/transmission PC 1104 is connected to the printing apparatus 300 through a communication interface, such as a network cable, a USB cable and an IEEE 1284. In this example, a USB cable is used to transmit the print data to the printing apparatus 300.

FIG. 62 is a block diagram showing a relationship among programs running on the print data generation/transmission PC 1104.

In FIG. 69, software, data files and databases identical to those of FIG. 65 are given like reference numbers and their explanations omitted.

As can be seen from comparison between FIG. 69 and FIG. 65, since this example performs both the generation and transmission of print data by a single PC, an inter-PC communication program is not necessary. As to the file format of the database, the one used in the preceding 10th embodiment is used.

FIG. 70 is a flow chart showing a print procedure executed by the print data generation/transmission PC 1104 and the printing apparatus 300 cooperating with each other. In this example, as with the preceding embodiments, a manual-feed printing is done using 1,000 jobs of print data. In FIG. 70, steps identical with those of FIG. 67 of the preceding embodiment are given like step reference numbers and their explanations omitted.

As can be seen from comparison between FIG. 70 and FIG. 67, the steps are the same. The only difference between the two figures is whether the print data generation program and the print data transmission program are executed by one PC or two separate PCs. In this example the print data generation program in step S404 generates print data related information to be stored in a shared area accessible by both the print data generation program and the print data transmission program. Then, in step S405 the print data generation program notifies the print data transmission program of the completion of generation of the print data related information through a direct inter-program communication without using the inter-PC communication program.

Thus, since this example can perform both the generation and transmission of the print data by a single PC, there is no need to have a complex system configuration such as the inter-PC communication program, producing the similar effect to that of the preceding embodiments with a simple configuration.

In the 10th and 11th embodiment, the manual-feed printing has been described as an example. It is noted, however, that the present invention is not limited to this application but can be used in other printing than the manual-feed printing.

(Others)

A plurality of print modules employed in the above embodiment are independent of each other. That is, the print modules are spatially independent (or in terms of location) and also independent in terms of a signal system and an ink system. Therefore, a supply of an appropriate amount of ink and a recovery operation can be performed according to the operation state of the print modules, i.e., the volume of print data. Further, the print modules can be controlled under various conditions separately from an image forming system and an image forming apparatus or independently of other print modules. Single print modules can also be purchased or handled.

The present invention is not limited only to the above embodiments but can be appropriately modified within the concept of the present invention.

For example, a structure for supplying ink to one or more print heads used in one print module can be employed. The print module may be a serial type print module that performs a printing with moving of the print head in a main scan direction in addition to a full line type print module that performs a printing without moving of the print head. Printing system and configuration of the print module is optional and not any limited. The present invention have only need to actively control a negative pressure of ink to be applied to the print head by using a pump and a valve so as to stabilize the negative pressure.

In the above embodiments, a full line type ink jet printing apparatus has been described as an example of the printing apparatus making up the print system. It is noted, however, that the printing apparatus may be a serial type ink jet printing apparatus. It is also possible to use other than the ink jet printing apparatus, i.e., ones that employ other printing methods such as thermosensitive printing, heat transfer printing and electrophotographic printing. Further, as to the means to move the print head relative to the print medium, it need only be able to move at least one of them.

As to the configuration of the printing apparatus making up the print system, the printing apparatus may be provided as an image output terminal integral with or separate from an information processing device such as computer. It may also take the form of a copying machine in combination with a reader or of a facsimile device with a transmission and reception function.

The present invention can also be implemented in the form of a system, device, method, program or memory media. More specifically, it may be applied to a system comprised of a plurality of devices or a system having only one device.

Programs to realize the aforementioned functions of the preceding embodiments (programs corresponding to the flow charts shown in the accompanying drawings) can be supplied to the system or device directly or remotely. This invention includes a case where a computer of the system or device reads the supplied program codes and executes them.

Therefore, the program codes themselves that are installed in the computer to realize the functions of this invention also implement the invention. That is, this invention includes computer programs that realize the functions of the invention.

In that case, the computer programs may be in the form of object codes, programs executed by an interpreter or script data to be supplied to the operating system, as long as they have the program functions.

Recording media through which the programs are supplied to the computer include, for example, floppy (registered trademark) disks, hard disks and optical discs. Other recording media include magnetooptical discs, MOs, CD-ROMs, CD-Rs, CD-RWs, magnetic tapes, nonvolatile memory cards, ROMs, and DVDs (DVD-ROMs and DVD-Rs).

For the supply of programs, Internet home pages may be accessed using a client computer's browser. In that case, a computer program itself of this invention or a compressed file with an automatic install function may be downloaded into recording media such as hard disks. It is also possible to divide program codes making up the program of this invention into a plurality of files and allow these individual files to be downloaded from different home pages. In other words, this invention also includes WWW servers that allow the program files which realize the functions of this invention with a computer to be downloaded by a plurality of users.

Further, the programs of this invention may be encrypted, stored in recording media, such as CD-ROMs, and distributed to the users so that those users who have cleared a predetermined condition are authorized to download decryption key information from home pages via Internet. In that case, the user can execute the encrypted program by using the downloaded decryption key information to install the program in the computer.

The computer can realize the functions of the aforementioned embodiments by executing the programs. According to instructions of the programs, the operating system on the computer may execute a part or all of the actual processing to realize the aforementioned functions of the preceding embodiments.

Further, the programs read from the recording media may be written into a memory of a function expansion board inserted in the computer or of a function expansion unit connected to the computer. Then, according to instructions of the programs, the CPU in the function expansion board or function expansion unit may execute a part or all of the actual processing to realize the aforementioned functions of the preceding embodiments.

This application claims the benefit of Japanese Patent Application Nos. 2005-161174, filed Jun. 1, 2005, 2005-328917, filed Nov. 14, 2005, 2005-328918, filed Nov. 14, 2005, 2005-330611, filed Nov. 15, 2005, and 2006-147445, filed May 26, 2006, which are hereby incorporated by reference herein in their entirety.

The invention claimed is:

1. A print system comprising:

a plurality of print modules, each print module holding a print head capable of applying ink, on the basis of print data, onto a print medium;

an information processing device configured to supply the print data to the plurality of print modules connected to a communication port; and a signal outputting portion configured to output a print start signal to each of the plurality of print modules by receiving a predetermined signal, wherein the plurality of the print modules can be arranged at any desired position in a print module mounting area facing the print medium, wherein each print module includes:

an information holding portion configured to hold identity information of the print module, the identity information including position information about an arranged position that is a desired position, in the print module mounting area, at which the print module can be arranged; and a receiving portion configured to receive, in order to print on the print medium, the print data supplied through the communication port, wherein the information processing device includes:

a reading portion which reads, through the communication port, the identity information held in the information holding portion of each print module;

a print data generating portion which generates divided print data corresponding to each of the plurality of print modules by dividing, according to the identity information of each of the plurality of print modules read by the reading portion, the print data to be printed in the print module mounting area; and a sending portion, which sends the divided print data generated by the print data generating portion to each print module corresponding to the divided print data through the communication port, wherein the signal outputting portion outputs, by receiving the predetermined signal, the print start signal to each print module at a drive timing corresponding to the arranged position of each print module in the print module mounting area, wherein each print module executes, by receiving the print start signal outputted from the signal outputting portion, a printing operation to print on the print medium in the print module mounting area on the basis of the divided print data corresponding to each print module.

2. A print system according to claim 1, wherein the predetermined signal received by the signal outputting portion is a signal outputted from a sensor configured to detect the print medium being transported.

3. A print system according to claim 1, wherein the position information includes information about the arranged position of the print module in a first direction in which the print medium is transported and information about the arranged position of the print module in a second direction perpendicular to the first direction.

4. A print system according to claim 1, wherein the position information includes information about the arranged position of the print module defined by XY coordinates.

5. A print system according to claim 1, wherein the print module mounting area is divided into a plurality of areas in which the print module can be arranged.

6. A plurality of print modules for use in a print system having an information processing device configured to supply print data to the plurality of print modules connected to a communication port, a signal outputting portion configured to output a print start signal to each of the plurality of print modules by receiving a predetermined signal, wherein the plurality of print modules can be arranged at any desired position in a print module mounting area facing a print medium, each print module comprising:

a print head capable of applying ink, on the basis of print data, onto the print medium;

an information holding portion configured to hold identity information of the print module, the identity information including position information about an arranged position that is a desired position, in the print module mounting area, at which the print module can be arranged;

a receiving portion configured to receive, in order to print on the print medium, the print data supplied through the communication port; and a control portion configured to control the print head, wherein the print module executes, by receiving the print start signal, a printing operation to print on the print medium in the print module mounting area on the basis of divided print data corresponding to the print module generated by the information processing device, the print start signal being outputted from the signal outputting portion at a drive timing corresponding to the arranged position of the print module in the print module mounting area, the divided print data being generated by dividing, according to the identity information read from the information holding portion of the print module through the communication port, the print data to be printed in the print module mounting area, the divided print data being received by the receiving portion through the communication port, and wherein the receiving portion receives a control signal including the print start signal for defining a print start timing of the print head, and a drive timing signal for defining a drive timing of the print head, so that the printing operation is executed, and wherein the control portion controls, when the print start signal is received, the print head on the basis of the divided print data at the drive timing defined by the drive timing signal.

7. A plurality of print modules for use in a print system having an information processing device configured to supply print data to the plurality of print modules connected to a communication port, a signal outputting portion configured to output a print start signal to each of the plurality of print modules by receiving a predetermined signal, wherein the plurality of the print modules can be arranged at any desired position in a print module mounting area facing a print medium, each print module comprising:

a print head capable of applying ink, on the basis of print data, onto the print medium;

an information holding portion configured to hold identity information of the print module, the identity information including position information about an arranged position that is a desired position, in the print module mounting area, at which the print module can be arranged; and a receiving portion configured to receive, in order to print on the print medium, the print data supplied through the communication port, wherein the print module executes, by receiving the print start signal, a printing operation to print on the print medium in the print module mounting area on the basis of divided print data corresponding to the print module generated by the information processing device, the print start signal being outputted from the signal outputting portion at a drive timing corresponding to the arranged position of the print module in the print module mounting area, the divided print data being generated by dividing, according to the identity information read from the information holding portion of the print module through the communication port, the print data to be printed in the print module mounting area, the divided print data being received by the receiving portion through the communication port, and wherein the information holding portion of the print module includes an information setting portion for setting the identity information.

8. A plurality of print modules according to claim 7, wherein the information setting portion includes a switch.

9. A plurality of print modules for use in a print system having an information processing device configured to supply print data to the plurality of print modules connected to a communication port, a signal outputting portion configured to output a print start signal to each of the plurality of print modules by receiving a predetermined signal, wherein the plurality of the print modules can be arranged at any desired position in a print module mounting area facing a print medium, each print module comprising:

a print head capable of applying ink, on the basis of print data, onto the print medium;

an information holding portion configured to hold identity information of the print module, the identity information including position information about an arranged position that is a desired position, in the print module mounting area, at which the print module can be arranged; and a receiving portion configured to receive, in order to print on the print medium, the print data supplied through the communication port, wherein the print module executes, by receiving the print start signal, a printing operation to print on the print medium in the print module mounting area on the basis of divided print data corresponding to the print module generated by the information processing device, the print start signal being outputted from the signal outputting portion at a drive timing corresponding to the arranged position of the print module in the print module mounting area, the divided print data being generated by dividing, according to the identity information read from the information holding portion of the print module through the communication port, the print data to be printed in the print module mounting area, the divided print data being received by the receiving portion through the communication port, and wherein the print system includes a plurality of communication ports, and the print module connects to any of the plurality of communication ports, and wherein the receiving portion of the print module receives the divided print data, corresponding to the print module, through the communication port corresponding to the identity information of the print module.

10. A plurality of print modules for use in a print system having an information processing device configured to supply print data to the plurality of print modules connected to a communication port, a signal outputting portion configured to output a print start signal to each of the plurality of print modules by receiving a predetermined signal, wherein the plurality of the print modules can be arranged at any desired position in a print module mounting area facing a print medium, and the print module can be mounted at any desired position in the print module mounting area, each print module comprising:

a print head capable of applying ink, on the basis of print data, onto the print medium;

an information holding portion configured to hold identity information of the print module, the identity information including position information about an arranged position that is a desired position, in the print module mounting area, at which the print module can be arranged; and a receiving portion configured to receive, in order to print on the print medium, the print data supplied through the communication port;

a cap to receive ink discharged from the print head, the discharged ink not contributing to the printing of an image; and a unit configured to move the cap relative to the print head, wherein the print module executes, by receiving the print start signal, a printing operation to print on the print medium in the print module mounting area on the basis of divided print data corresponding to the print module generated by the information processing device, the print start signal being outputted from the signal outputting portion at a drive timing corresponding to the arranged position of the print module in the print module mounting area, the divided print data being generated by dividing, according to the identity information read from the information holding portion of the print module through the communication port, the print data to be printed in the print module mounting area, the divided print data being received by the receiving portion through the communication port.

11. A plurality of print modules for use in a print system having an information processing device configured to supply print data to the plurality of print modules connected to a communication port, a signal outputting portion configured to output a print start signal to each of the plurality of print modules by receiving a predetermined signal, wherein the plurality of the print modules can be arranged at any desired position in a print module mounting area, each print module comprising:

a print head capable of applying ink, on the basis of print data, onto the print medium;

an information holding portion configured to hold identity information of the print module, the identity information including position information about an arranged position that is a desired position, in the print module mounting area, at which the print module can be arranged; and a receiving portion configured to receive, in order to print on the print medium, the print data supplied through the communication port, wherein the print module executes, by receiving the print start signal, a printing operation to print on the print medium in the print module mounting area on the basis of divided print data corresponding to the print module generated by the information processing device, the print start signal being outputted from the signal outputting portion at a drive timing corresponding to the arranged position of the print module in the print module mounting area, the divided print data being generated by dividing, according to the identity information read from the information holding portion of the print module through the communication port, the print data to be printed in the print module mounting area, the divided print data being received by the receiving portion through the communication port, wherein the print head is configured to eject a plurality of color inks supplied from an ink tank.

12. A print method for printing an image on a print medium using a print system which includes:

a plurality of print modules being able to be arranged at any desired position in a print module mounting area of the print system facing the print medium, each print module comprising: a print head, an information holding portion, and a receiving portion;

an information processing device, comprising: a reading portion, a print data generation portion, and a sending portion; and a signal outputting portion, the method comprising the steps of:

reading, by the reading portion of the information processing device, identity information held in the information holding portion of each of the plurality of print modules through a communication port, the identity information including position information about an arranged position that is a desired position, in the print module mounting area, at which the print module can be arranged;

generating, by the print data generation portion of the information processing device, divided print data by dividing print data to be printed in the print module mounting area, the print data being divided according to the identity information of each of the print modules read in the reading step so that the divided print data corresponds to the plurality of print modules, respectively;

sending, by the sending portion of the information processing device, the divided print data to the plurality of print modules, respectively, through the communication port;

outputting, by the signal outputting portion, a print start signal to each print module at a timing corresponding to the arranged position of the print module; and executing, by the print head of each print module receiving the print start signal by the receiving portion, a printing operation to print on the print medium in the print module mounting area on the basis of the divided print data.

13. A print system comprising:

a plurality of print modules, each print module holding a print head capable of applying ink, on the basis of print data, onto a print medium;

an information processing device configured to output a print start signal to each of the plurality of print modules by receiving a predetermined signal, wherein the print system can arrange the plurality of the print modules at any desired position in a print module mounting area facing the print medium, wherein each print module includes:

an information holding portion configured to hold identity information of the print module, a receiving portion configured to receive, in order to print on the print medium, the print data supplied through a communication port, wherein the information processing device includes:

a reading portion which reads, through the communication port, the identity information held in the information holding portion of each print module;

a print data generating portion which generates divided print data corresponding to each of the plurality of print modules by dividing, according to the identity information of each of the plurality of print modules read by the reading portion, the print data to be printed in the print module mounting area; and a sending portion, which sends the divided print data generated by the print data generating portion to each print module corresponding to the divided print data through the communication port, wherein the signal outputting portion outputs, by receiving the predetermined signal, the print start signal to each print module at a drive timing corresponding to an arranged position that is a desired position, in the print module mounting area, at which each print module can be arranged, wherein each print module executes, by receiving the print start signal outputted from the signal outputting portion, a printing operation to print on the print medium in the print module mounting area on the basis of the divided print data corresponding to each print module.

14. A print system according to claim 1, further comprising a plurality of communication ports individually connectable to any desired print module arranged in the print module mounting area.

15. A print system according to claim 1, wherein the information processing device is capable of directly communicating with the plurality of print modules.

16. An information processing device for use in a print system having a plurality of print modules which are able to be arranged at any desired position in a print module mounting area facing a print medium, and a signal outputting portion configured to output a print start signal to each of the plurality of print modules by receiving a predetermined signal, wherein each print module includes a print head capable of applying ink, on the basis of print data, onto a print medium, the information processing device comprising:

a reading portion which reads, through a communication port, identity information held in each print module, the identity information including position information about an arranged position that is a desired position, in the print module mounting area, at which the print module can be arranged;

a print data generating portion which generates divided print data corresponding to each of the plurality of print modules by dividing, according to the identity information of each of the plurality of print modules read by the reading portion, the print data to be printed in the print module mounting area; and a sending portion, which sends respective parts of the divided print data generated by the print data generating portion to each print module through the communication port, wherein each print module executes, by receiving the print start signal outputted from the signal outputting portion at a drive timing corresponding to the arranged position of each print module in the print module mounting area, a printing operation to print on the print medium in the print module mounting area on the basis of the divided print data corresponding to each print module generated by the print data generating portion.

17. An information processing device according to claim 16, wherein the print system includes a plurality of communication ports individually connectable to any desired print module arranged in the print module mounting area.

18. An information processing device according to claim 16, wherein the information processing device is capable of directly communicating with the plurality of print modules.

* * * * *